US008037506B2

(12) United States Patent
Cooper et al.

(10) Patent No.: US 8,037,506 B2
(45) Date of Patent: Oct. 11, 2011

(54) MOVIE STUDIO-BASED NETWORK DISTRIBUTION SYSTEM AND METHOD

(75) Inventors: Robin Ross Cooper, La Mesa, CA (US);
Thomas A. Munro, La Jolla, CA (US);
Michael R. Beatty, Carlsbad, CA (US)

(73) Assignee: Verimatrix, Inc., San Diego, CA (US)

( * ) Notice: Subject to any disclaimer, the term of this patent is extended or adjusted under 35 U.S.C. 154(b) by 655 days.

(21) Appl. No.: 11/680,443

(22) Filed: Feb. 28, 2007

(65) Prior Publication Data
US 2007/0220575 A1      Sep. 20, 2007

Related U.S. Application Data

(60) Provisional application No. 60/779,003, filed on Mar. 3, 2006, provisional application No. 60/817,040, filed on Jun. 27, 2006, provisional application No. 60/807,788, filed on Jul. 19, 2006, provisional application No. 60/822,738, filed on Aug. 17, 2006, provisional application No. 60/824,002, filed on Aug. 30, 2006, provisional application No. 60/867,072, filed on Nov. 22, 2006, provisional application No. 60/870,798, filed on Dec. 19, 2006, provisional application No. 60/886,599, filed on Jan. 25, 2007.

(51) Int. Cl.
*H04N 7/173* (2011.01)
(52) U.S. Cl. ........................................................ 725/93
(58) Field of Classification Search .................. 725/1–5, 725/25, 32, 34–36, 63, 73, 86–104, 105, 725/109, 110, 114–120, 135, 143
See application file for complete search history.

(56) References Cited

U.S. PATENT DOCUMENTS

| 4,926,255 A | 5/1990 | Von Kohorn |
| 5,227,874 A | 7/1993 | Von Kohorn |
| 5,283,639 A | 2/1994 | Esch et al. |
| 5,754,939 A * | 5/1998 | Herz et al. .................... 455/3.04 |

(Continued)

FOREIGN PATENT DOCUMENTS

WO      WO0101586 A2      1/2001
(Continued)

OTHER PUBLICATIONS

Form/ISA/210—International Search Report, mailed Feb. 14, 2008.
(Continued)

*Primary Examiner* — Scott Beliveau
*Assistant Examiner* — Yassin Alata
(74) *Attorney, Agent, or Firm* — Procopio Cory Hargreaves and Savitch LLP

(57) ABSTRACT

Digital content files containing entertainment media such as movies, TV shows, and the like are distributed from at least one content source primarily responsible for the original creation of the media to subscribers over a network system. The content source is connected over at least one content source network to a plurality of distribution partners, and each distribution partner is connected with a selected group of subscribers over an access network. A requested digital content file is distributed from the content source to a subscriber in a network distribution path comprising at least the content source network, the distribution partner associated with the subscriber, and the second network. A profile information package containing subscriber preferences is transmitted from the subscriber to the content source by way of a proxy over the network distribution path, and the profile information package is stored at the content source.

33 Claims, 41 Drawing Sheets

U.S. PATENT DOCUMENTS

| | | | |
|---|---|---|---|
| 5,801,754 | A | 9/1998 | Ruybal et al. |
| 5,924,013 | A | 7/1999 | Guido et al. |
| 5,936,661 | A | 8/1999 | Trew |
| 6,047,327 | A * | 4/2000 | Tso et al. ............... 709/232 |
| 6,055,314 | A | 4/2000 | Spies et al. |
| 6,141,530 | A | 10/2000 | Rabowsky |
| 6,324,519 | B1 * | 11/2001 | Eldering ............... 705/14.66 |
| 6,366,914 | B1 | 4/2002 | Stern |
| 6,401,075 | B1 | 6/2002 | Mason et al. |
| 6,463,585 | B1 * | 10/2002 | Hendricks et al. ............ 725/35 |
| 6,505,174 | B1 | 1/2003 | Keiser et al. |
| 6,564,381 | B1 | 5/2003 | Hodge et al. |
| 6,567,986 | B2 | 5/2003 | Ward et al. |
| 6,947,966 | B1 | 9/2005 | Oko, Jr. et al. |
| 6,993,508 | B1 | 1/2006 | Major et al. |
| 7,079,176 | B1 | 7/2006 | Freeman et al. |
| 7,212,979 | B1 | 5/2007 | Matz et al |
| 7,243,362 | B2 | 7/2007 | Swix et al. |
| 7,536,308 | B2 * | 5/2009 | Hodges et al. ............ 705/1.1 |
| 2001/0049620 | A1 | 12/2001 | Blasko |
| 2002/0049968 | A1 | 4/2002 | Wilson et al. |
| 2002/0087967 | A1 | 7/2002 | Conkwright et al. |
| 2002/0115407 | A1 * | 8/2002 | Thompson et al. ......... 455/3.01 |
| 2002/0123928 | A1 | 9/2002 | Eldering et al. |
| 2002/0133405 | A1 | 9/2002 | Newnam et al. |
| 2002/0141584 | A1 | 10/2002 | Razdan et al. |
| 2002/0169700 | A1 | 11/2002 | Huffman et al. |
| 2002/0198843 | A1 | 12/2002 | Wang |
| 2003/0028889 | A1 | 2/2003 | McCosky et al. |
| 2003/0037333 | A1 | 2/2003 | Ghashghai et al. |
| 2003/0070167 | A1 | 4/2003 | Holtz et al. |
| 2003/0097664 | A1 | 5/2003 | Meyers et al. |
| 2003/0126294 | A1 | 7/2003 | Thorsteinson et al. |
| 2003/0145323 | A1 | 7/2003 | Hendricks et al. |
| 2003/0172012 | A1 | 9/2003 | Otsuka et al. |
| 2003/0172374 | A1 | 9/2003 | Vinson et al. |
| 2003/0202661 | A1 | 10/2003 | Rodriguez et al. |
| 2004/0122735 | A1 | 6/2004 | Meshkin |
| 2004/0148344 | A1 * | 7/2004 | Navar et al. ............... 709/203 |
| 2004/0153375 | A1 | 8/2004 | Mukunya |
| 2004/0194128 | A1 | 9/2004 | McIntyre et al. |
| 2004/0199471 | A1 | 10/2004 | Hardjono |
| 2004/0260575 | A1 | 12/2004 | Massey, Jr. |
| 2004/0267552 | A1 | 12/2004 | Gilliam et al. |
| 2005/0038706 | A1 | 2/2005 | Yazdani et al. |
| 2005/0060759 | A1 | 3/2005 | Rowe et al. |
| 2005/0076020 | A1 | 4/2005 | Huntley et al. |
| 2005/0160020 | A1 | 7/2005 | Asher |
| 2005/0160028 | A1 | 7/2005 | Asher |
| 2005/0160029 | A1 | 7/2005 | Asher |
| 2005/0177853 | A1 | 8/2005 | Williams et al. |
| 2005/0204394 | A1 | 9/2005 | Nguyen |
| 2005/0209954 | A1 | 9/2005 | Asher |
| 2006/0122877 | A1 * | 6/2006 | Yazdani et al. ............... 705/10 |
| 2006/0136969 | A1 | 6/2006 | Patton et al. |
| 2006/0212916 | A1 | 9/2006 | Steelberg et al. |
| 2006/0253323 | A1 | 11/2006 | Phan et al. |
| 2006/0293954 | A1 | 12/2006 | Anderson et al. |
| 2007/0011704 | A1 | 1/2007 | Anglin, Jr. |
| 2007/0016530 | A1 | 1/2007 | Stasi et al. |
| 2007/0022032 | A1 | 1/2007 | Anderson et al. |
| 2007/0156524 | A1 | 7/2007 | Grouf et al. |
| 2007/0157231 | A1 | 7/2007 | Eldering et al. |

FOREIGN PATENT DOCUMENTS

| | | |
|---|---|---|
| WO | WO03053056 A1 | 6/2003 |
| WO | WO2006071246 A1 | 7/2006 |

OTHER PUBLICATIONS

Form PCT/ISA/237—Written Opinion of the International Search Report, mailed Feb. 14, 2008.

International Preliminary Report on Patentability from related PCT/US2007/063023, dated Sep. 9, 2008.

* cited by examiner

FIG. 1: PRIOR ART

| Step | |
|---|---|
| 304 | Content is encoded with VC1 code |
| 305 | MultiRights™ VPP applies WMDRM via format SDK. Other DRMs are also processed in this step. |
| 306 | Content is distributed to WMDRM Client (PC, STB, phone) |
| 310 | Client contacts VCAS to process client lic. Request. |
| 312 | VCAS authenticates client, performs Clone Detection and verifies entitlements |
| 316 | If client is entitled, VCAS will pass a license key request to Microsoft License Server |
| 318 | VCAS delivers the WMDRM license to client device |
| 320 | WMDRM client in client device decrypts WMDRM and plays content |

FIG. 36

|  | Producers | Directors | Actors | Screen Writers | Release Date | Special Effects |
|---|---|---|---|---|---|---|
| Demand | | | | | | |
| Platforms | | | | | | |
| International | | | | | | |
| Historical Data | | | | | | |
| Genre | | | | | | |
| Competition | | | | | | |
| Costs | | | | | | |

FIG. 39

MOVIE STUDIO-BASED NETWORK DISTRIBUTION SYSTEM AND METHOD

RELATED APPLICATIONS

The present application claims the benefit of co-pending U.S. provisional patent application Nos. 60/779,003 filed Mar. 3, 2006, 60/817,040 filed Jun. 27, 2006, 60/807,788 filed Jul. 19, 2006, 60/822,738 filed Aug. 17, 2006, 60/824,002 filed Aug. 30, 2006, 60/867,072 filed Nov. 22, 2006, 60/870,798 filed Dec. 19, 2006, and 60/886,599 filed Jan. 25, 2007, and the content of each of the above referenced provisional applications is incorporated herein by reference in its entirety.

BACKGROUND

1. Field of the Invention

The present invention relates to a system and method for distributing digital content, particularly entertainment content such as movies, television, motion pictures or other over a network.

2. Related Art

It is well known that the business of creating and distributing motion pictures has been hugely successful over the last hundred years. Although each year has its share of successes and failures, the motion picture industry as a whole has thrived throughout the 20th century and now into the 21st century.

In the early part of the 20th century, motion picture studios were efficient and well-run factories that produced entertainment products primarily on film and then distributed film prints around the world. These motion picture studios became adept in maximizing the returns on their investment in the United States and also around the world as they learned to localize the film prints (by dubbing or adding subtitles) and then distributing these localized film prints to their intended exhibition houses.

When television came of age, the major motion picture studios adapted themselves by leveraging their facilities and infrastructure to provide short-form motion pictures for network primetime feeds and subsequently through local broadcast means.

In the later decades of the 20th century, new technologies became available that offered some challenges to the motion picture studios. Home recordable video tape (for example Beta-Max and VHS) became widely available and, for the first time, the motion picture studios could no longer control the entire distribution chain. In fact, consumers could make copies of virtually any entertainment asset directed to a TV set and distribute these copies at will. Ultimately the motion picture studios decided to support this paradigm shift by supplying pre-recorded tape-based products to the market. However, a "dent" was made in the armor of the studios in terms of their ability to tightly control the supply chain (end to end). During this period of time, the well known "Blockbuster" chain appeared with its model of overnight tape rentals. The revenues received by the studios for these overnight rentals were significant. At the same time, the degradation from one tape copy to the next made the threat of piracy manageable. Although commercial piracy began to appear around the world, a pristine copy of a VHS could only be obtained by purchasing an original "authorized" copy.

By the close of the 20th century, a more significant threat had arrived on the scene. That new threat revolved around the digitizing of entertainment content for the purpose of providing high-quality product through an entirely digital distribution chain. Through many years of hard work and dedication, the scientific community in coordination with academia created methods and processes that would accurately represent previously analog content material into a digital format. On both the audio and the video sides of the equation, means, methods, and processes were developed that translate the analog source material into a virtually perfect digital representation which suffers little or no degradation however many times it is replicated. This is the point where the armor of the motion picture studios received their second "dent". These digital copies further distanced the studios from the supply chain (due to the fact that digital sources are much easier to manipulate and distribute than analog sources). Although rampant digital piracy began to appear by the closing years of the 20th century, once again the studios prevailed as they could further monetize their assets by distributing optical discs (such as DVDs and VCDs). Those digital copies were, for the most part, too large for most consumers to easily move from one computing platform to another. A number of industry experts began to warn the motion picture community that significant threats to their business models were on the horizon.

In the early 21st century, some cameras used within the production process became digital and, in some cases, analog production media began to disappear completely. At the same time, readily available broadband capacity at the consumer level was increasing at an exponential rate each year. In an effort to defend themselves against further threats of rampant piracy, the studios began a campaign to rigorously tighten security requirements around their digital assets in order to gain better control of the supply chain. In addition, the studios have championed new legislation in the US designed to detect acts of piracy, prevent its proliferation, and establish civil or criminal liability for those involved. The coupling of the new security technologies along with the heightened policing of pirated content has been effective at certain levels; however, piracy continues to be a significant threat in most areas of the world and is virtually out-of-control in others.

By the end of the first decade of the 21st century, another paradigm shift, commonly referred to as High Definition (HD), is likely to be widely adopted. The shift to HD content is considered an enormous opportunity by virtually everyone within the non-theatrical supply chain. The vendors of products and services to the production and post-production communities are able to sell new gear and establish new service offerings. The consumer electronic and information technology vendors also have an opportunity to sell new gear at the retail level. Consumers have the promise of a much better viewing experience. The major studios are also looking forward to the shift to HD as their opportunity to make significant adjustments within the digital supply chain in order to greatly reduce the threat of piracy (casual and professional). The term casual piracy (more precisely termed as "looting") means the ability of a relatively unknowledgeable and inexperienced consumer to make unauthorized copies of content without assistance from a highly skilled engineer. Professional piracy refers to the more knowledgeable individual actively engaged in attempting to steal and re-sell digital content. Studios are motivated in the endeavor to reduce the threat of piracy in their market by the example of music piracy, and the rampant illegal distribution of digital video from DVDs, for which the encryption system was famously compromised soon after DVDs were introduced into the market.

Once the supply chain is filled with HD capable equipment and devices, it is the hope of the studios that people engaged in acts of piracy will be commercial criminals who can be isolated, detected, and effectively prosecuted. At the same time, normal consumers may learn that there is better economy in purchasing content than engaging in acts of looting given the threats of being caught and prosecuted.

For decades, the vast majority of entertainment content delivered through the various supply chains was analog and flowed in a single direction. Terrestrial broadcast and cable television services in the United States are very good examples. Although satellite delivery of content is primarily digital, it is also well known to be a one-way solution.

Current day motion picture studios carry out a number of functions. These include obtaining and reviewing potential projects (treatments and scripts), selecting the projects which appear to have the most promise, making decisions regarding funding of the selected projects, and engaging a production company to create the desired asset in the form of a television show or movie. Authorized copies of the digital assets are made, and then distributed according to license agreements. Focused advertising and promotional campaigns are initiated. At the same time, steps are taken to protect the studio's assets (i.e. the copyright movie or other entertainment media). Currently, most of these steps are routinely carried out using legacy means and processes, and could be more efficient.

Therefore, what is needed is a system and method that improves the overall process.

SUMMARY

Embodiments described herein provide for a network distribution system and method for distributing digital content files between an original content source such as a movie or television studio and consumers.

In one embodiment, a method of distributing digital content files from at least one content source to subscribers includes creating a plurality of entertainment events under the control of a content source and storing the events as digital content files at the content source. The content source is connected over at least one content source network to a plurality of distribution partners, and each distribution partner is associated with a selected group of subscribers for connection with the subscribers over at least one second network. A request for a content file is received at the content source through the content source network, and the requested digital content file is distributed from the content source to a subscriber in a network distribution path comprising at least the content source network, the distribution partner associated with the subscriber, and the second network. A profile information package on subscriber preferences is transmitted from the subscriber to the content source over the network distribution path, and the profile information package is stored at the content source.

In one embodiment, profile information packages of respective subscribers are used to create customized content targeted to respective subscribers and the customized content is inserted in content files transmitted to the respective subscribers targeted by the customized content. The customized content may be advertising content.

The content source may be a movie or television studio which creates entertainment content or contracts with a production company to create such content. This method provides the studio with visibility down to the individual subscriber level by means of a two way communication path between the studio and subscriber.

In one embodiment, the profile information package contains a subscriber identification code (ID) which does not identify any private information of the subscriber, and a proxy is provided between the subscriber and the content source to assign subscriber IDs and associate the IDs with the corresponding profile information on subscriber preferences. The content source sends a content file assigned to a subscriber along with customized content for the subscriber, along with the subscriber ID, and the proxy associates the subscriber ID with the subscriber network location so that the distribution partner can transmit the content file to the correct subscriber.

According to another aspect, a network distribution system for distributing content files from content sources to subscribers is provided. The system includes at least one content source which is responsible for original creation of entertainment events and which stores digital content files containing the created entertainment events, and a plurality of distribution partners each associated with a respective group of subscribers, each distribution partner having an access network over which content is distributed to the subscriber group for the distribution partner. At least one content source network links the content source to the distribution partners. The access networks, distribution partners, and content source network provide a two way communication path between the subscribers and the content source.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 36 is a more detailed explanation of some of the steps in FIG. 35;

FIG. 39 is a chart illustrating analytics used in one embodiment of the system of FIGS. 37 and 38.

DETAILED DESCRIPTION

Figure 1:
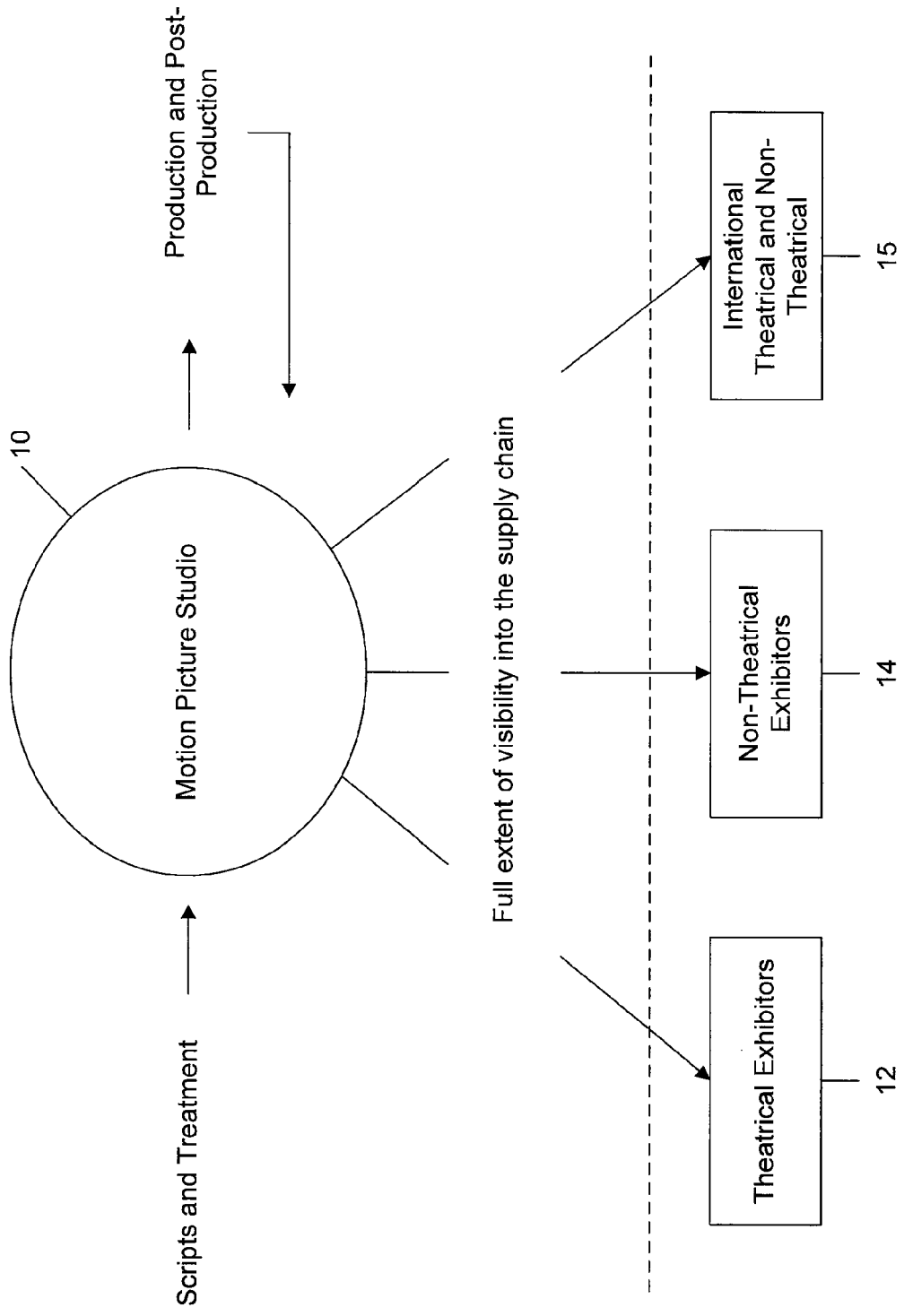
FIG. 1 is a block diagram illustrating a prior art movie distribution system.

Certain embodiments as disclosed herein provide for network distribution of digital content files such as movies or other types of entertainment from a movie studio or content creator to an end user. For example, one method and system as disclosed herein allows for a network distribution system and method which permits two-way communication activities between a content creator and a viewer of the content.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

In the following description, a client device may be any type of device capable of receiving and displaying content files received over a network, such as a set top box (STB), personal computer, game console, cellular phone, personal digital assistant (PDA), personal media player, video equipment such as a digital video receiver (DVR), digital video disc (DVD) player (DVD), compact disc (CD) player, smart card, or the like.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, Integrated Services Digital Network (ISDN) lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

Also in the following description, a digital content file is a movie or television show in the described embodiments, but may be other types of entertainment media such as a music recording or other type of digital content file in alternative embodiments, such as music, books, games, software, multimedia presentations, images, and other materials that can be represented digitally. In the following description, a source of digital content such as movies, television shows, and the other types listed above, is referred to as a movie studio or motion picture studio. The studio in the following description may be a studio which is involved in the creation and distribution of movies or other forms of entertainment, or may be a broadcaster, television network (ABC, CBS, Fox, NBC) or otherwise. The studio may also comprise other types of content source such as music companies, software companies, publishers, game producing companies, and the like. A distribution partner or service operator may be a telephone company, cable television provider, satellite television provider, Internet service provider, theatrical exhibitor, non-theatrical exhibitor, or the like which is associated with an access network connected with a group of subscribers or with movie theaters which display movies to customers. The access network may be a cable or Internet protocol television (IPTV) network, a satellite network with a 2-wire (or DSL) back-channel, or a mobile network where the client devices are either mobile phone devices and/or personal digital assistants (PDAs). The term "access network" as used herein is synonymous with the following: Service Operator; Platform; Internet Service Provider (ISP); or other type of provider of audio/video services.

FIG. 1 is a schematic block diagram illustrating the prior art system of distributing movies or other forms of entertainment content from a movie studio or content creator 10 to distribution partners 12,14,15 such as national and international theatrical exhibitors and non-theatrical exhibitors. In this system, the movie studio 10 has virtually no visibility past the point where the content is provided to the distribution partners, i.e. no communication is provided between the studio and end user or consumer, and the studio has little or no information on what takes place after the movie is distributed to distribution partners.

Figure 2:
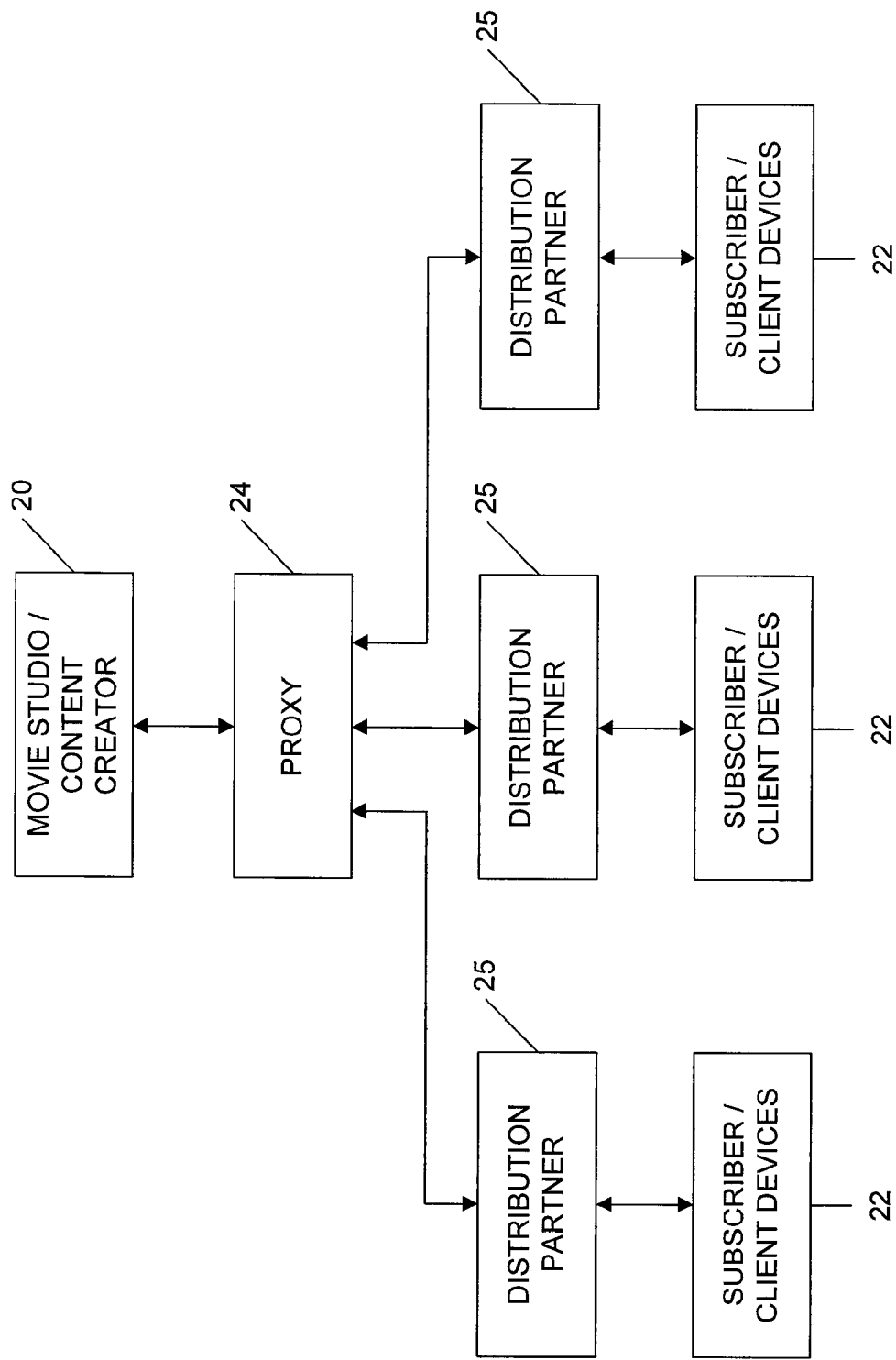
FIG. 2 is a block diagram illustrating one embodiment of a movie studio-based digital content network distribution system.

FIG. 2 is a block diagram of one embodiment of a digital content network distribution system in which a movie studio or content creator 20 distributes digital content files over a distribution path through one or more networks to end users or client devices 22 via proxy system 24 and distribution partners 25. The network architecture is a two-way communication network which allows the studio to receive information on a subscriber or consumer's viewing habits without violating the policies of the distributor or the privacy of the consumer.

Although it makes perfect sense for a studio to design its networks and systems to achieve a secure two-way communications channel with the end-consumers, maintaining consumer's privacy and confidentiality, there is the problem of the other partners within the supply chain and their willingness to share their valuable subscriber's information with the studio. Distributors, exhibitors, platforms, access networks and others within the supply chain may be opposed to sharing such information with movie studios. A mutually agreed "proxy" system as illustrated in FIGS. 2 to 5 may be used to facilitate that transfer of information from one end of the supply chain to the other. Revenue sharing may also be provided as a compelling incentive to the distribution partners to utilize this system.

The proxy system or mechanism 24 (also referred to as an "exchange") acts as a cyber middle-man. The studios do not receive any information that might be considered private or confidential. Instead, they receive a transactional ID number or cryptographically derived certificate that represents a specific subscriber's pointer to a database entry that accumulates the subscriber's habits. This "proxy" can then facilitate the two-way transfer of information without violating the policies of the service operator or the privacy of the subscriber. An example of a "proxy" or exchange is defined in patent application Ser. No. 11/614,888 filed on Dec. 21, 2006, and entitled "Multi-Source Bridge Between Content Providers and Access Networks," the contents of which are incorporated herein by reference.

This system may provide advertising revenues that can be redirected from the web back to television platforms. These revenues can then be shared between the studios and the various distribution partners or service operators.

Figure 3:
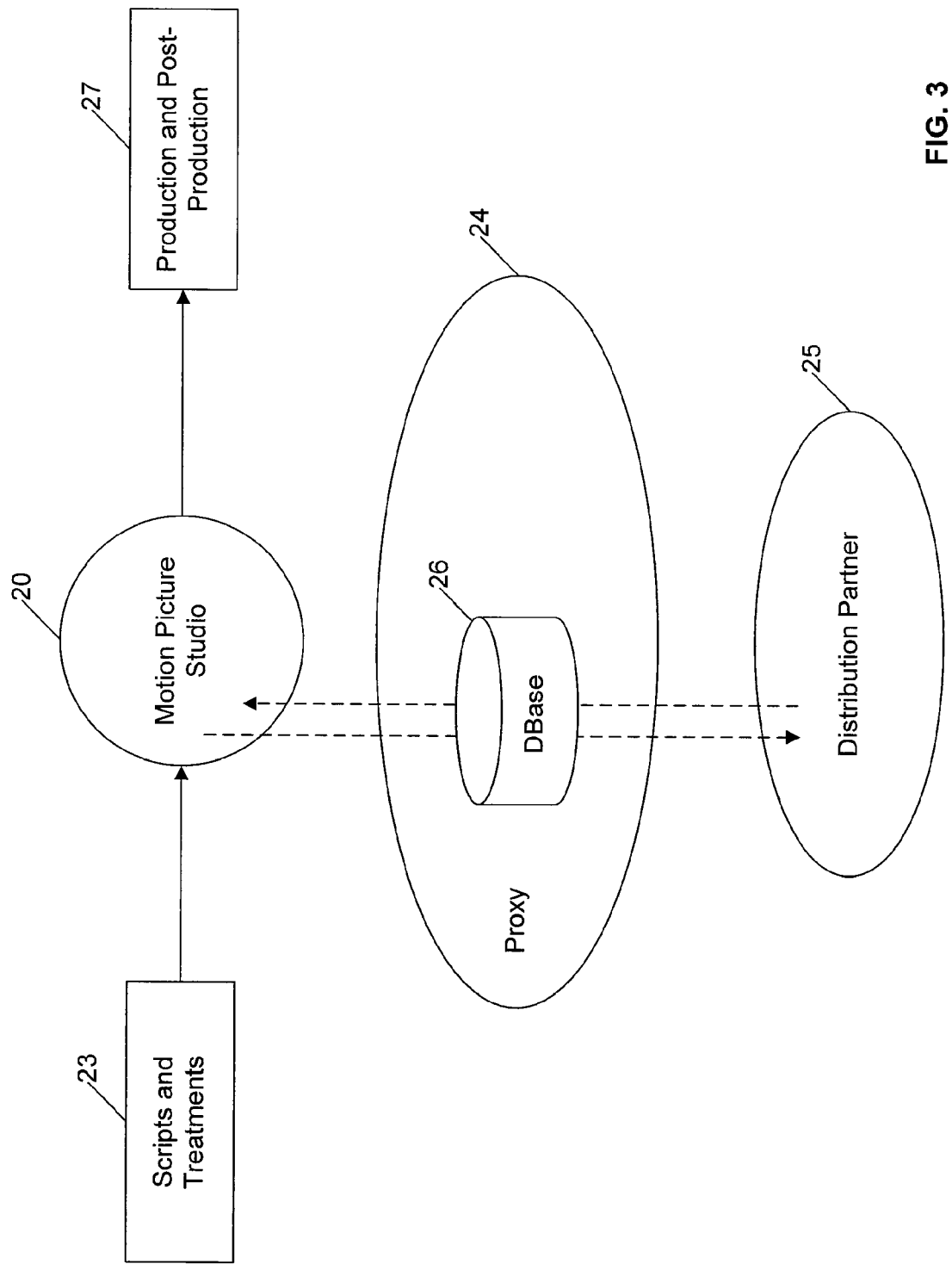
FIG. 3 is a block diagram illustrating an embodiment of two way communication between a movie studio system and a distribution partner through a proxy module.
Figure 4:
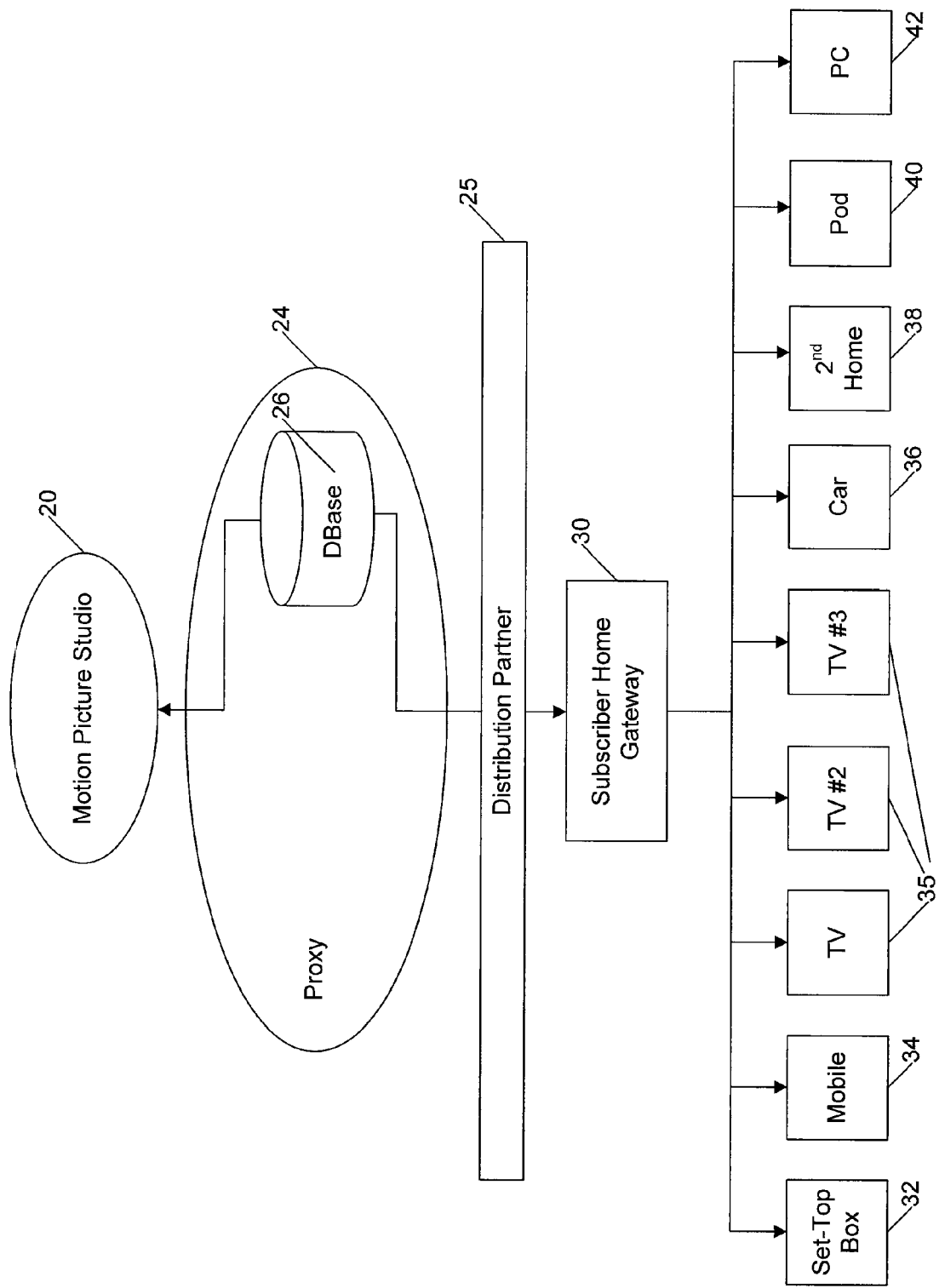
FIG. 4 is a block diagram illustrating the two-way distribution system of FIG. 2 connected to plural consumer devices through a home gateway.

FIGS. 3 and 4 illustrate more details of the network system. It is now normally not the case that the movie studio makes the movies. For the most part, movies and television shows are now made by production companies based on a contractual agreement with the studio, and the studio provides the funding and the avenue for distribution. As illustrated in FIG. 3, a movie or motion picture studio receives scripts and treatment proposals 23 from creators. If a proposal is accepted by a studio, the studio contracts with a production and post-production company 27 to make the movie or other form of entertainment, such as a TV show. Thus, the studio is still responsible for the creation of the entertainment event since it approves a proposal, funds the production, and contracts with a production company to make the movie or other entertainment event. Additionally, the studio is responsible for distribution of the entertainment event.

In one embodiment, as illustrated in FIGS. 3 and 4, the proxy system has a data base 26 which collects profile information for consumers or subscribers receiving content over the network and provides the information to a studio as a profile information package in conjunction with a subscriber identifier (ID) for the subscriber which does not contain any private or confidential information. Each consumer or subscriber may have a home gateway 30 (see FIG. 4) which is linked to various client devices such as a set-top box 32, a mobile device 34, one or more television sets 35, a media player 36 in a car, client devices in a second home 38, a personal media player device 40, and a personal computer 42. Any combination of these devices and other media playing devices may be provided in each subscriber's "home" network.

The proxy data base module 26 associates personal information which identifies each subscriber or consumer who subscribes with the distribution partner to receive content with a proxy comprising a unique identification code or the like, which may include numbers, letters, and/or symbols or the like. The proxy personal information may include some or more of the following information or data points:

Subscriber name
Subscriber home address
Social Security Number
Data from a trusted identity source.

This information is stored in the data base 26, along with profile information such as the type of content requested by the subscriber associated with the ID number or code. By simply exchanging a subscriber's personal information for a subscriber identification code (ID), and then passing this ID with the profile data points to the movie studio, "relevant" advertisements can be identified and then appropriately inserted into the content that is dedicated to that specific subscriber, as described in more detail below.

The proxy system may be set up to determine if a subscriber has moved from one service to another, so that the same profile information can be attached to the subscriber under the new service provider, and associated with the previously assigned ID. Although the specifics about the subscriber remain hidden, the change of service information can be provided as valuable data to service operators, subscribers, and others.

In one example, the data base 26 contains the subscriber's personal information and corresponding subscriber ID, along with collected profile information for the consumer, as indicated in the example below:

John Smith—ID: abcxyz
Profile information.

The proxy system sends the profile information and associated profile information to the studio, as follows:

ID: abcxyz
Profile information

The illustrated proxy method allows subscriber or consumer-level information to flow up to the movie studio for the purposes of identifying "relevant" advertisements for insertion, without the threat of violating the consumer's privacy and/or confidentiality. Valuable coupons and/or promotional campaigns can be included with the advertisements inserted into content streams or downloads in order to further encourage the consumer to make a purchase. When purchases are made using a valuable coupon (or other mechanism used to track the ultimate success of an advertisement with a given consumer), empirical data can be supplied to the advertiser in order to assist in the process of identifying the effective vehicles for their advertisements. As illustrated by the dotted lines in FIG. 3, the proxy system provides a communication path in which information can flow in two directions between the movie studio and subscriber without revealing subscriber private information to the studio. This option may be used where personal information is not protected or is not provided in the communication.

The proxy system 24 may be owned and operated by the movie studio 20, or may be an independent third party or the distribution partner. In the examples provided above, there is a vertical relationship as follows: Studio→Proxy→Distribution Partner→Subscriber. An example being: Paramount Pictures sends a new movie to a pay television operator that offers the movie on a video-on-demand service to its subscribers. However, in this example, studios are not able to determine if the subscriber has two different services offered by two different distribution partners or service operators. This problem can be overcome as described in more detail below in connection with FIG. 13 by providing a platform linkage 44 between various proxy platforms or systems in order to deliver empirical data back to the studio. Such a linking process can be achieved by linking data points such as the following:

Social Security Number
Other country identifier
Home Address
Subscriber Name
Data from a trusted identity source
The concatenation of any data points listed above
Other forms of Identification . . .

Figure 5B:
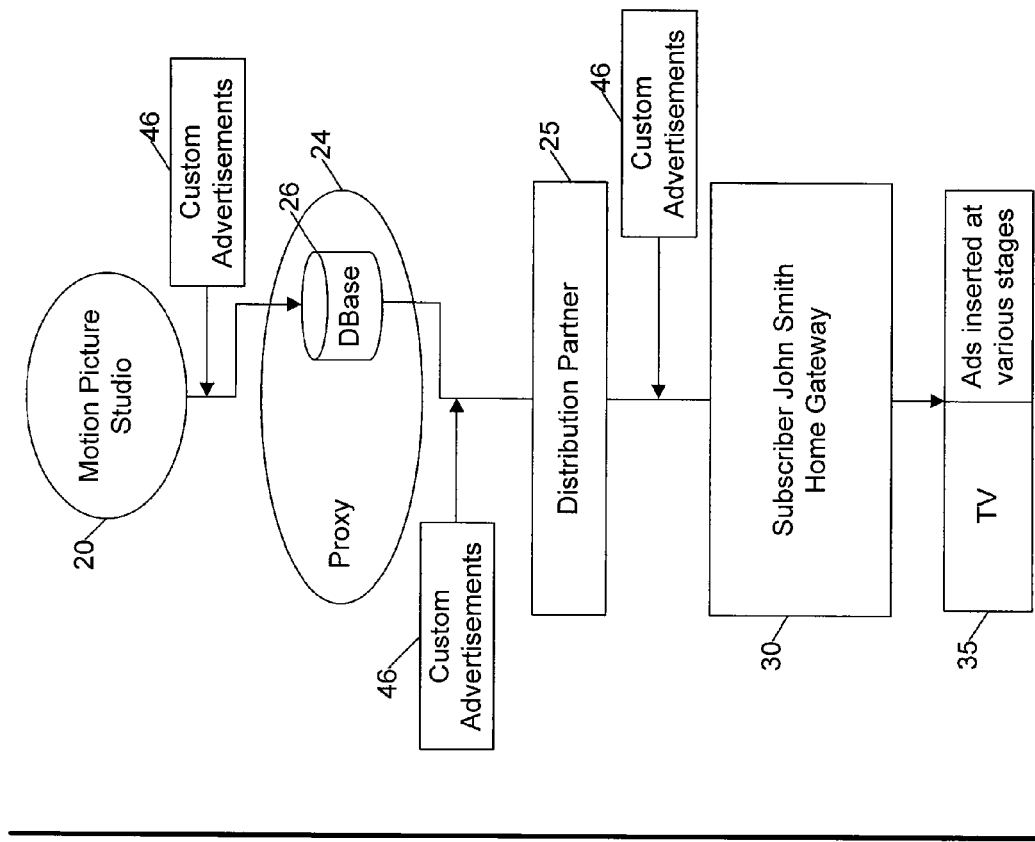
FIG. 5B is a block diagram illustrating insertions of appropriate advertisements in digital content provided from a studio to a user device.
Figure 5A:
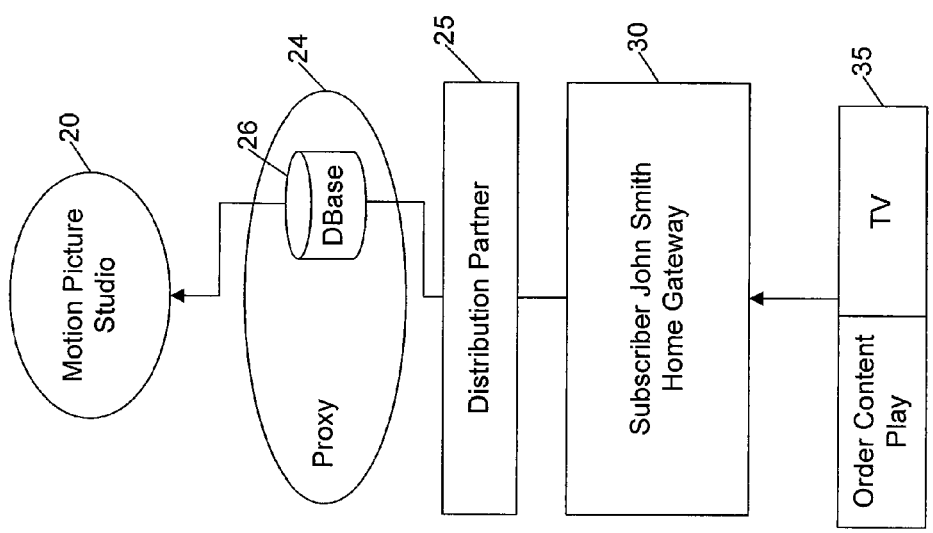
FIG. 5A is a block diagram illustrating the communication path for movie studios to receive empirical data from a user device through the proxy module.

FIG. 5A illustrates a subscriber requesting content from the motion picture studio 20 at a client device such as a TV set 35 via home gateway 30, distribution partner 25, and proxy system 24. The motion picture studio receives the request along with the subscriber ID or code for that subscriber, and provides the requested content to the subscriber as illustrated in FIG. 5B. Since the motion picture studio already has profile information for that subscriber ID, they can use this information to insert appropriate advertisements 46 to be displayed on the subscriber's device beyond the home gateway 30. The custom advertisements 46 can be inserted at virtually any stage of the distribution process at the request of the studio 20, i.e. at the studio, at the proxy, or at the distribution partner level, as illustrated in FIG. 5B. It is important to note that the custom advertisement can be inserted at the client device.

The studio may distribute digital assets or digital content files over one or more networks to distribution partners or service operators 25. In one embodiment, the studio may be built as a "hub" on top of some very high capacity international broadband "pipes". For example, fiber-optic cables with the capacity of handling peta-bytes of data may be used as the pipelines or communication channels to and from the studio. These "pipes" may extend to the major telecommunication hubs around the world including (but not limited to): Los Angeles, New York, Mexico City, Rio de Janeiro, London, Brussels, Amsterdam, Munich, Berlin, Moscow, Hong Kong, Singapore, Taipei, Shanghai, Beijing, Seoul, Tokyo, and Sydney. The digital asset or content files may be transmitted from the movie studio 20 to service operators 25 via one or more networks, and the network or networks in other embodiments may be a network or combination of networks spanning any geographical area, such as a local area network, wide area network, regional network, national network, and/or global network. The Internet is an example of a current global computer network. The network or networks may be hardwire networks, wireless networks, or a combination of hardwire and wireless networks, and may include satellite communication systems, packet radio systems, and mobile broadband systems.

High-speed, two-way interactivity between the studio and the consumer or subscriber may be provided through one or more of the following architectures:

IPTV (sometimes referred to as Telco-TV or Digital Subscriber Line DSL TV); HFC (Hybrid Fiber/Cable) with Docsis (Data Over Cable); Satellite with Hybrid DSL (IPTV) or Wireless (WiFi or WiMax); Multichannel, Multipoint Distribution System (MMDS) with Hybrid DSL (IPTV), or others.

Figure 6:
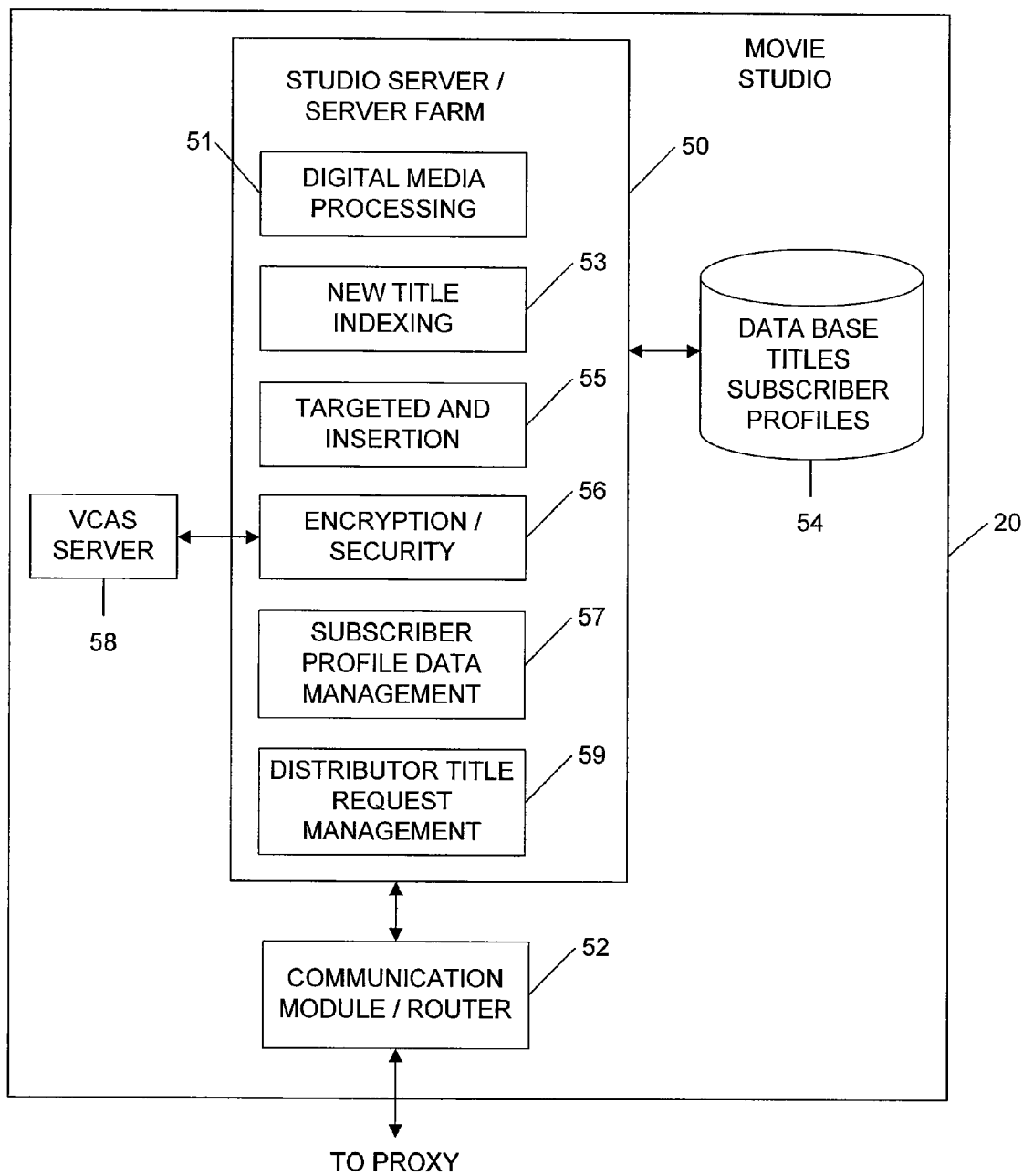
FIG. 6 is a functional block diagram illustrating one embodiment of a movie studio or content source in the system of FIGS. 1 to 5.
Figure 7:
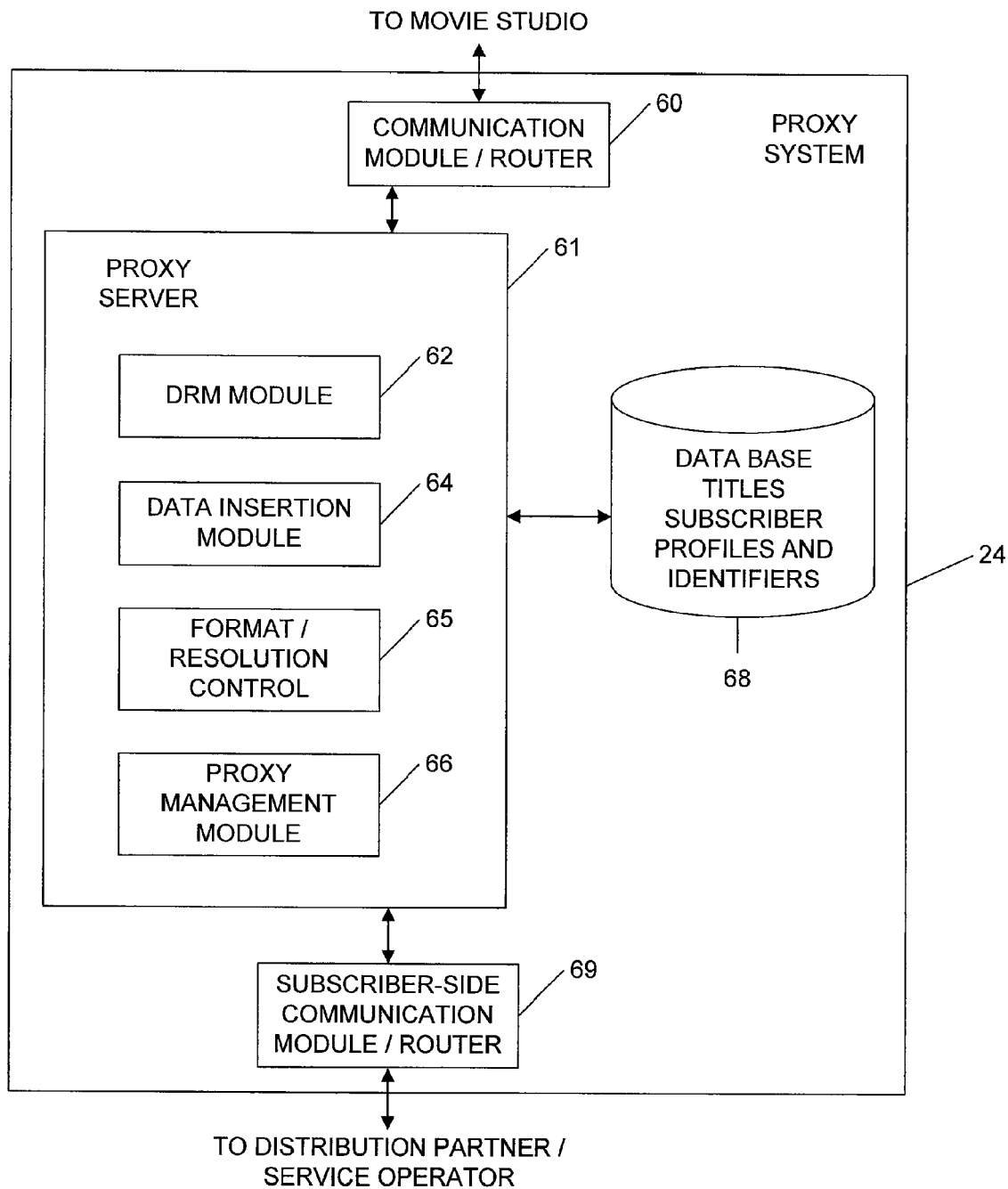
FIG. 7 is a functional block diagram illustrating one embodiment of a proxy system in the system of FIGS. 1 to 5.
Figure 8:
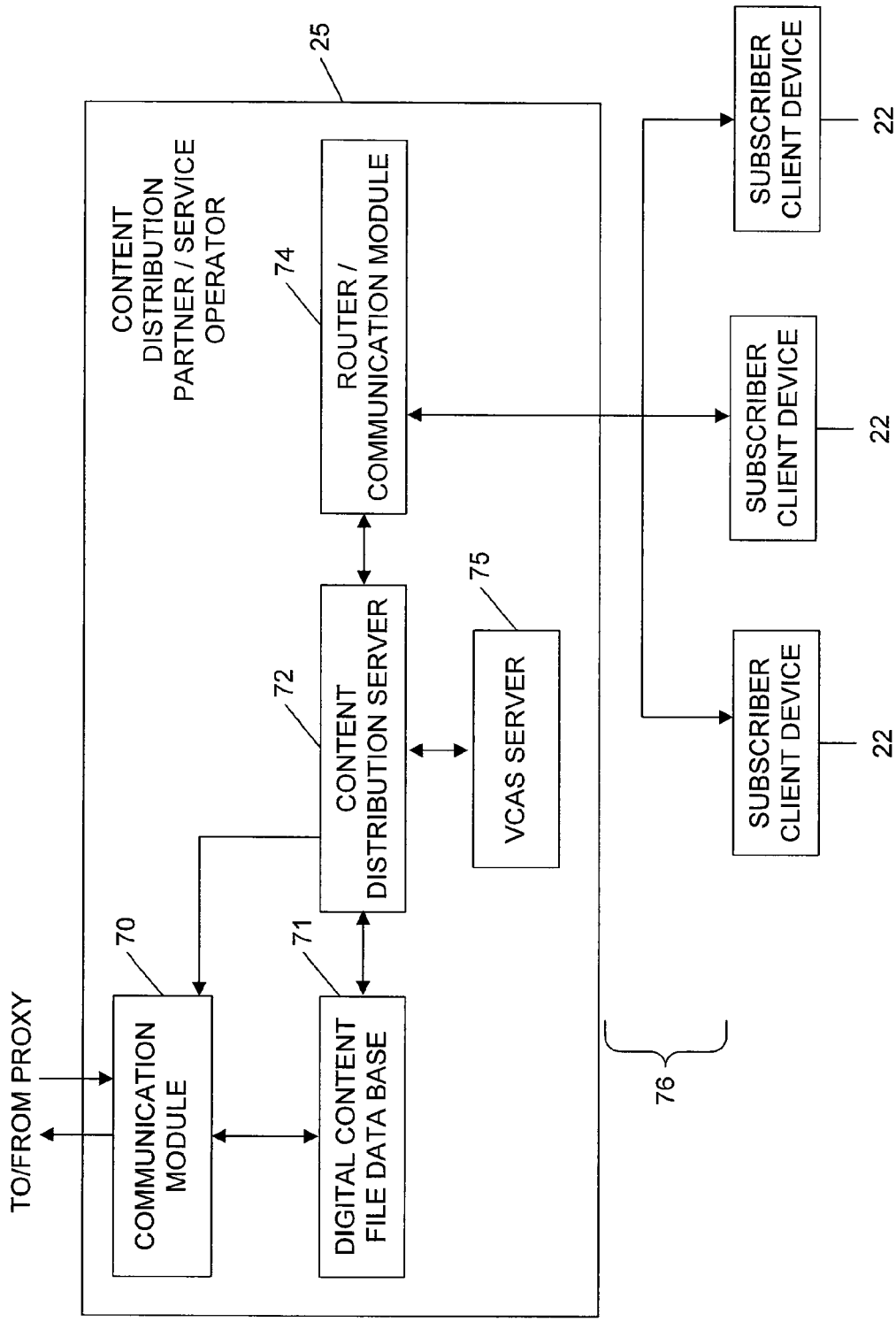
FIG. 8 is a functional block diagram illustrating one embodiment of a distribution partner in the system of FIGS. 1 to 5.

FIGS. 6 to 8 are functional block diagrams illustrating one embodiment of the movie studio 20, proxy system 24 and a distribution platform or service operator 25 in more detail. As illustrated in FIG. 6A, a movie studio 20 has one or more servers 50 connected to data base 54. Servers 50 may include a digital media processing module 51 for processing an entertainment offering such as a movie in a digital format. Alternatively, such a processor may be provided by the production company 27 of FIG. 3 and the media or entertainment production may be delivered to the studio in digital form. The movie studio servers control communications with subscribers through distribution partners 25 via two-way communication module or router 52. Server 50 may include a new title indexing module 53 for indexing new movies or other digital content files to be added to the studio's catalog or library of titles in data base 54, a targeted or custom advertisement insertion module 55 which inserts custom advertisements into the digital content file based on the stored profile information for a subscriber requesting the content, an encryption/security module 56, a subscriber profile data management module 57, and a distributor title request management module 59.

The custom advertisements inserted by module 55 into requested digital content files may be created by the studio, production company, or an advertising company. In one example, a studio may have a plurality of different advertisements for different products stored in data base 54 and may select an advertisement based on known interests of a subscriber requesting content. As noted above in connection with FIG. 5, custom advertisements may also be inserted by the proxy system 24 or by the distribution or service provider 25.

Movie studio 20 includes a security module or video content authority server (VCAS) 58 to add security measures to the digital content files via encryption/security module 56. Such security measures are designed to deter digital piracy efforts. Security module 55 may comprise a video content authority system (VCAS) configured to provide protection of ownership rights of digital content files while also providing distribution of the content files to entities that are authorized to receive the digital content files. This system may include various protection schemes, for example, proactive protections such as encryption, SSL or VPN technologies, public key infrastructure (PKI), and reactive protections such as watermarking or steganography, piracy watch systems, or legal action management. In one embodiment, each video content authority system (VCAS) may comprise a Verimatrix Video Content Authority System distributed by Verimatrix Inc. of San Diego, Calif., and described in co-pending application Ser. No. 10/177,263 filed on Jun. 19, 2002, the contents of which are incorporated herein by reference. Other video content security systems may be used in alternative embodiments.

The security module or VCAS may be used protect the content on its path and to flag, isolate, detect and prosecute hackers and pirates engaged in acts of digital piracy directed at the studio or the studio's assets. In order to protect the digital asset along its path, the studio may also determine whether adequate security measures are used in transmitting the asset on other stages of the path. Although a digital asset may be protected using the studio's own internal security solution, the distribution provider or service operator and end-consumer may be using other security solutions. The studio determines these different network and security architectures, protocols, application programming interfaces (APIs), and related issues when setting up the distribution path in order for content to flow along the path and to include adequate security measures.

One possible security measure which may be added to a digital asset is watermarking which embeds information directly into the file. This information is often referred to as the watermark "payload". This payload carries bits, bytes, codes, images, or other visible or invisible information that might be useful to the entities within the distribution supply chain. The watermark payload may be cryptographically signed with the user's private key from a unique digital certificate, to provide further proof of exactly where the content was delivered. The digital certificate may be a unique PKI or X.509 digital certificate as issued by a well-known certificate authority such as Verisign, Thawt, or Baltimore. The digital content in the file may also be encrypted with the user's private key so that it can only be decrypted and viewed by a subscriber provided with the corresponding public key.

One example of the use of a watermark payload is as follows:

A studio has selected a dubbing facility to create the appropriate foreign language dub files for a particular movie. Before sending the movie to the dubbing facility, the studio may place a watermark in the movie file with the name and ID Number of the dubbing facility. Therefore, if this same movie file is found on the Internet (or on the streets of Beijing on DVD), then the movie studio can determine the source of the leak. With a little investigation work, a culprit can then be found and compelled to cease from engaging in any further acts of digital piracy. Within networks that support electronic distribution of content files as in FIGS. 1 to 6, watermarks can be placed at various stages within the distribution supply chain. For example, watermarks can be embedded by security module 55 before the master file leaves the studio. Such a master file typically carries the name of the distribution partner 25 which receives the file. This helps to identify the source of a leak being either at the studio level, with the shipping company (or file transfer service), or with the distribution partner. If a distribution partner has one or more business-to-business partners, another watermark can then be added to the movie file to identify a second distribution partner. Once this second watermark is added, if a pirated copy is found with the same watermark, it is known that the source is distribution partner #1, the shipping company (of file transfer service), or with distribution partner #2.

This type of watermark insertion process is typically referred to as "Server-Side Watermarking". This means a non-real time, off-line, function takes place at some point prior to the file being sent to its intended recipient. The typical scenario calls for a human operator to request this watermarking function within a software application program prior to the file being sent. Such an operator typically keys-in the watermark payload as prompted by the software program. In an alternative embodiment, the networked system performs these operations without the need for human intervention. No matter if a human is involved or not, this process is typically performed in a batch process prior to the file being transferred to its next destination, or immediately after it has been received.

"Session-Based" watermarking is different from "Server-Side" watermarking as a Session-Based watermark is performed while on-line, and in real time. What this means is the watermark payload is inserted into the digital content file as this content file arrives at the terminal device, such as a subscriber device. Such a Session-Based watermark is valuable as it can not only identify the end user, it can also provide useful information about the entire distribution supply chain up until that point (as the distribution supply chain may be known once the end-user is identified).

An example of session-based watermarking is as follows:
A pirate copy of a digital file is found on a peer-to-peer web site. After downloading this file from the peer-to-peer site, it is determined that a session-based watermark exists. This session-based watermark points to a subscriber within a satellite subscriber using a popular satellite-based Pay-TV service. Everything pertaining to the distribution path for that digital file can now be determined.

The movie studio 20 may take all standard precautions to protect its content with industry-recognized Digital Rights Management (DRM) systems. These systems may use encryption at a minimum; however, watermarking and digital fingerprinting techniques as described above may be employed as well. The main reasons for a movie studio to protect its content are as follows:

To set a precedent establishing the fact that the content has value to the content owner. If the movie studio should ever find itself in a court of law or before a legislative body in an attempt to protect itself from piracy, support may be withheld if the movie studio took no actions to protect itself. (Lack of protection could signal approval to freely distribute.)

The hacking of DRM could provide the Studio 20 with legal tools to protect itself from sophisticated pirates as breaking encryption violates the Digital Millennium Copyright Act (DMCA) and other laws around the world.

Due to concerns about privacy and confidentiality of subscribers, the watermark payload may only carry an ID Number. It is unlikely for a payload to have clear text with the name (or other identifiers) of the subscriber, due to privacy concerns. The ID Number or subscriber ID can then be used, if necessary, to determine the exact identity of the subscriber within a secure facility as maintained by the service operator. In one example, the identity of the subscriber corresponding to an ID found in a watermark of a pirated copy of a file is determined from stored information in the proxy data base 26.

Subscriber profile data management module 57 in FIG. 6 receives incoming profile information on subscribers from proxy system 24, with the subscribers identified only by a subscriber identifier as described above in connection with FIG. 3. Module 57 may organize subscribers into one or more subject matter related community groups and provide the profile information for storage in the data base 54 along with the associated subscriber ID and one or more community group identifiers for the subscriber.

Distributor title request management module receives requests from distribution partners or service providers 25 for titles or digital content files and retrieves the requested files from data base 54 for transfer to the requesting party after encryption and any appropriate targeted ad insertion via modules 55 and 56. A search module (not illustrated) may also be provided to allow subscriber searches for titles or subject matter.

The two-way communication module or router 52 provides a two-way communication channel in a distribution path from the studio to various subscribers 22 or subscriber devices linked via a home gateway 30. The distribution network may include high-speed lines to the proxy system 24 or to an application service provider 45, if ASP 45 is used in the distribution path as in FIG. 13. Proxy system 24 is illustrated in more detail in FIG. 7. The connection of the studio to the proxy system 24 is via a studio facing pass-through router or second communication device 60.

In the embodiment of FIG. 7, the proxy system has a server 61 which includes a digital rights management (DRM) module 62, a data insertion module 64, and a format resolution module 65 by means of which the content can be encoded, manipulated and adjusted according to the needs of the supply chain or distribution path. Server 61 also includes a proxy management module 66 which provides subscriber profile information to data base 68 and which associates subscriber profile information with a subscriber identifier stored in the data base 68 before passing the profile information to the movie studio via communication module 60. The server is arranged to pass digital content files received from the movie studio directly to the requesting service operator in one direction, while taking out any subscriber personal information from profile information transmitted back to the movie studio, and instead associating the profile information with a subscriber identifier for that subscriber before the information is passed on to the movie studio. The proxy module may also have a security module (not illustrated) for adding further security elements to digital content files transmitted via the proxy to one or more distribution partners 25, and a search module (not illustrated) linked to data base 68. Data base 68 in this case may include an electronic library of meta-data categorizing assets or titles available at studio 20.

Since the proxy is providing professional services such as DRM, resolution, and the like, there can be a high degree of quality applied to these value added services. The proxy module server 61 may perform the following functions:

Encoding (DRM module)
Transcoding (DRM module)
Format adjustment (format/resolution control module) r
Meta-Data insertion (data insertion module)
Static Advertisement-Insertion (data insertion module)
Resolving Digital Rights Management (DRM) issues (DRM module)
Resolving bandwidth issues (format/resolution control module)
Resolving resolution or Screen Size issues (format/resolution control module)

The proxy module may also resolve other issues. Each of the modules communicates with the consumer profile and identification information data base, and obtains information on the user devices to which the digital content is to be provided, so as to modify the content as needed to match the requirements of the user device.

Requested digital content files are transmitted to the distribution provider via communication module or router 69, which communicates with proxy side communication module or router 70 of the content distribution partner or service operator 25 (see FIG. 8). Router 69 provides a two-way communication channel so that subscriber profile information may be received from the distribution provider and stored in the consumer profile data base 26, and provided to the movie studio 20 in association with the corresponding subscriber ID which contains no personal information, via proxy management module 66.

As illustrated in FIG. 8, the distribution partner or service operator 25 has a data base 71 which communicates with proxy communication module 69 and which receives, indexes, and stores digital content files received from the movie studio via proxy system 24. A content distribution server 72 receives requests for digital content files such as movies from subscribers 22 via client side router or communication module 74. If the requested file is available locally, it is then retrieved from data base 71 and provided to the requester through client side router 74. If not, the request is passed on to the studio via proxy 24. A security module 75 such as a VCAS system is associated with content distribution server 72 to add a payload identifying the client device 22 to which the content is distributed before transmitting an encrypted movie or content file along with the payload to the client device over an access network 76 associated with the service operator or distribution partner.

Figure 9:
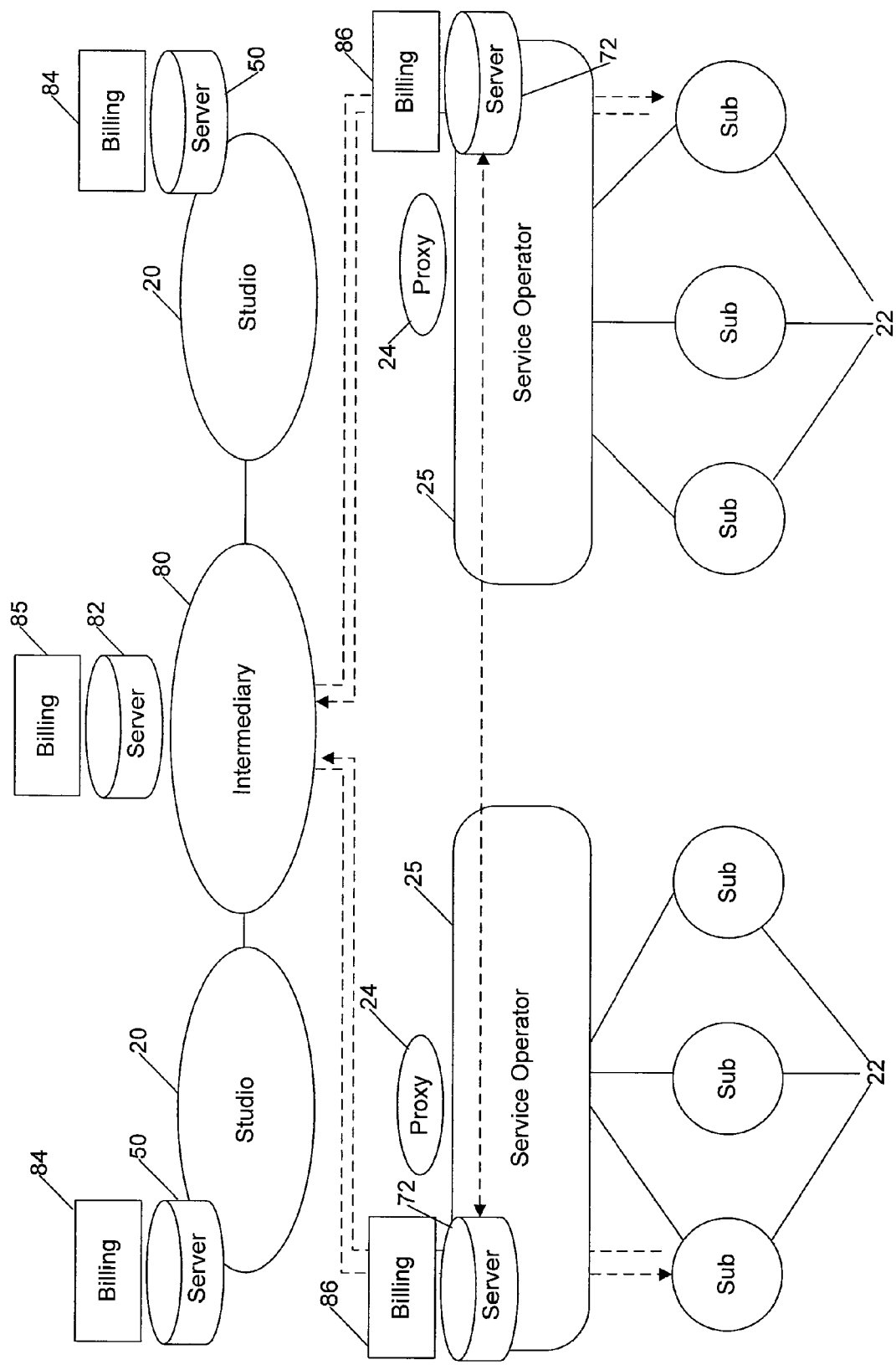
FIG. 9 is a block diagram of another embodiment of a network distribution system.

FIG. 9 illustrates another embodiment of a digital content distribution system involving more than one movie studio or content provider 20. Some modules and components in this system are identical to those in the previous embodiments, and like reference numbers are used for like parts as appropriate. This embodiment allows a plurality of movie studios to link together in order to do business with different groups of subscribers through a plurality of distribution partners or service operators. A number of new services and applications can be introduced if the studios peer amongst themselves. Due to restrictions placed on the major studios to conduct their business affairs independently due to threats of anti-trust issues, price fixing, and other consumer un-friendly practices, studios cannot peer with each other directly. In this embodiment, a third party or intermediary serves to keep the studios operating while avoiding any appearance of conspiracy.

In this embodiment, studios 20 are not linked directly to one another, but each communicate with an intermediary platform 80 for sharing subscriber profile information. The studios are connected to multiple service operators (or distribution partners) 25 who are connected (peered) with one another. Each service operator is linked to a group of subscribers 22. The connection from the movie studios to the subscribers is a two-way connection, as in the previous embodiments, with the upstream data or communication path from a subscriber to the studio including a proxy system 24 as described above in connection with FIGS. 3 to 5. Once again, the studios do not know the actual identity of individual subscribers. They are only aware of profiles, actions, events, and tendencies. This is all of the information that a studio needs in order to create communities and then start to provide services and applications to these communities.

In the network described above, the studios have visibility into the service operator's networks down to the specific subscribers. As a result of information coming up-stream (from the subscribers back to the studios), profile information can be captured. This profile information can then be used to create "Communities" across different service operator's platforms. Communities in this patent application refer to subscribers who are similar in one compelling way or another, for example subscribers having similar viewing preferences or other interests. Multiple communities can be created and one discrete subscriber may become a member in multiple communities. Each movie studio may store a list of communities along with the attributes of the community and the subscriber identifiers for subscribers in the community. An example might be subscribers who enjoy watching televisions shows that instruct people how to upgrade their homes. Such a community may be entitled "home improvement community" or the like, and can be an ideal source of potential customers for a paint manufacturer. In one example, targeted advertisements for the paint manufacturer are inserted in digital content files provided to the subscribers in that community.

Once a studio has obtained a level of visibility into distribution networks, numerous studios may connect their systems in such a way as they can provide more compelling services and applications to consumers. For example, a studio may offer a consumer the ability to search its vast catalog of movie and television titles. Such a search is limited to the universe of titles that are owned or otherwise controlled by this single studio. If multiple studios are connected or "peered" so that they are securely connected to multiple subscribers through different service operators, as indicated in FIG. 9, then the universe of movie and television titles which can be searched by a subscriber can grow exponentially. The problem that exists for such a model of studio "peering" over a network is that studios are considered a monopoly by the U.S. Government and they are subject to policies and regulations that forbid them from engaging in activities that might tend to result in a form of price manipulation for the end-consumer. For example, studio personnel may collaborate in such a way as to set pricing schemes so consumers have no choice and no alternatives. Therefore, they are strictly monitored and policed.

In one embodiment, the studio 20 may offer advanced search capabilities to consumers locally or through proxy module 24. Through Meta-Data and other methods of defining and categorizing assets (including electronic means and methods that provide an explanation of the content without human intervention), there can be a huge amount of specific information that can be used by a sophisticated search client. In one embodiment, the proxy module 24 may have an electronic library of meta-data (and other data mines) that can be used by the consumer to search for a specific piece of content that may be associated with a studio 20.

Direct network connections or peer connections between studios might be viewed as being consumer-unfriendly and could therefore attract the attention of government policing agencies. The intermediary platform 80 between the studios in FIG. 9 has a server 82 which allows certain information to pass from one studio to the next, while blocking other types of information. Such a function is similar to the proxy function as described above; however, it is not used to maintain the privacy of a consumer. Rather, it is intended to monitor the types of information that pass from one studio to another, so information relating to pricing, release dates, or other sensitive information can never be passed. Server 82 has an information monitoring module which reviews incoming data directed from one studio to another for sensitive content by searching for key words or discrete data fields in the information, and passes only data which does not contain sensitive content. If sensitive data is found, a content blocked message is sent to the studio where the data originated to indicate that the data was blocked. This reduces the risk of conflict with government regulations which may occur if studios communicated through a direct network connection.

As illustrated in FIG. 9, intermediary 80 acts as a buffer between studios so consumers can enjoy a better media experience, however, the studios are unable to conspire amongst themselves to increase prices, withhold services, or otherwise negatively effect consumers. An example of how an intermediary may help subscribers or consumers to obtain information is described in the example below.

In one possible example, a consumer may want to submit a search request for as many John Wayne movie trailers as possible. Since John Wayne had working relationships with a number of major studios, a request for trailers from one studio (only) would not yield anything close to the entire body of John Wayne's work. In fact, a number of studios would need to be contacted for enough trailers to be gathered that would satisfy the consumer's request. Since the studios are unable to connect to one another for fear of the threat of consumer-unfriendly practices, intermediary service 80 acts a buffer between studios. The intermediary 80 independently contacts each studio with an independent request. The studios receiving the requests provide the intermediary 80 with the appropriate data to fulfill each request. The intermediary then packages all of the information received from the studios in such a way that it can be sent to the consumer in an orderly fashion. Thus, the studios do not communicate with one another directly.

The subscriber can enjoy the services and applications provided by multiple studios, however, the threat of a potential studio conspiracy is reduced or eliminated as an intermediary service keeps all the studios separate.

Apart from the subscribers 22, each entity in FIG. 9 is associated with a billing system for receiving and sharing revenue. Thus, each movie studio server 50 has a billing system 84, the intermediary server 82 has a billing system 85, and each service operator server 72 has a billing system 86. These systems may be arranged to share revenues from subscribers for downloaded content. The network architecture of FIG. 9 may allow new revenues to be generated by allowing subscribers more direct contact with content originators such as movies studios. Revenue can also be generated from companies wishing to insert custom or targeted advertisements into content downloads. These revenues can be shared among the distribution partners so as to provide potential motivation for each partner to participate.

The network architecture illustrated in FIG. 9 may be provided using telecommunications standards and methods such as IP Multimedia Subsystem (or IMS). By connecting multiple studios together through an intermediary in the manner illustrated in FIG. 9, a vast collection of movie and television titles can be provided to subscribers through their distribution partners who contract with the studios.

In the above embodiments, the two way communication between movie studios and subscribers allows profile information to be collected and targeted advertisements to be placed into content provided to requesting subscribers. This is similar to the two-way nature of Internet communications which allows advertisers to learn about the needs and desires of specific consumers in such a way that they can tailor their ads to be effective to such a consumer at a point just prior to a purchase. An example is as follows:

A consumer uses the popular search engine Google to search the web for cars (in general). After a bit of searching, the consumer begins to gather a good deal of information about cars that are in the $30,000 to $50,000 range. Google then has the ability to notify the automobile company BMW that a specific consumer has been spending a good deal of time searching for a car that can be easily satisfied by one of BMW's offerings. BMW may then select an appropriate advertisement that can be displayed in such a way as to capture the consumer's attention (if only for a moment). Such an advertisement may provide the consumer with a valuable coupon or some free merchandise at a BMW dealership in his/her neighborhood which could yield in the sale of a new BMW.

Up to now, this type of pin-point, targeted advertising was not possible in delivery of movies or other types of digital entertainment content to consumers in their homes or offices. The movie studio-based network distribution system described in the above embodiments allows monitoring of consumer interests, and encouraging the consumer to consider a specific product offering by way of targeted advertising based on the consumer's interests while maintaining the consumer's privacy using the proxy system.

The approach to current broadcast television advertising has often been compared to the pellets of a shot gun shell. Advertisers know that a large audience watches their commercials; however, it simply isn't possible to achieve any significant level of granularity. This is why newspaper advertisements have continued to be strong even into the early 21st century. The coupons within the newspaper can be linked to a specific purchase therefore closing the advertising/sales loop. A technology that further inhibits the ability of broadcasters to maintain advertisers and advertising revenues is the Digital Video Recorder (DVR). It is well known that consumers use DVR technologies and solutions for the specific purpose of fast-forwarding through the advertisements. The advertisers are aware of this new technology (and its popularity) which gives them more incentives to investigate new opportunities on the Internet.

The system of the previous embodiments provides a two-way network framework which can be set up in a similar way to some of the large web portal sites so as to collect consumer activities and interests and create a profile. Consumer or subscriber confidentiality can be maintained by way of the proxy as presented in FIG. 3. The movie studio can then insert the appropriate advertisements into numerous areas of the consumer's viewing experience such as:

Traditional advertisements at natural breaks in the programming
Advertisements before and after video-on-demand session
Advertisements on Electronic Program Guides (EPGs)
Advertisements on Middleware Screens
Advertisements on screens that are displayed when the TV (or other device) is turned "ON"
Product Placements
Emails directly to consumers (via the proxy)
Postal mail directly to consumers (via the proxy)

In some cases, subscribers may choose to see the same content numerous times (either on the same platform or on a multitude of platforms). The studio 20 may insert new or different targeted advertisements for each viewing by the same subscriber, so that the subscriber sees completely different advertisements while watching the same content multiple times.

The network architecture of the embodiments described above may be similar to that found in Internet Protocol television (IPTV) deployments. An IPTV system may configure itself to prepare content for a targeted household and then transmit this content using a uni-cast model. This is the way that a VOD transmission takes place today (in the IPTV world). Wireless solutions may also be designed to provide uni-cast and multi-cast solutions to their customers as well. A satellite network architecture may also be used for the high-speed, two-way capabilities of the above embodiments. If the network used is a cable network, a VOD-Centric Conditional Access System may be appropriate. The definition of a VOD-Centric CAS is as follows:

The number of broadcast channels may one day exceed 200. In fact, the number of channels may exceed 600 over time. Given this huge number of channels and the proportionately small number of homes that are being serviced by a particular cable "node", it is very possible that most channels go "un-watched". Since it takes a tremendous amount of bandwidth to deliver even a single channel, the architecture of a cable system may be re-designed as follows for the network distribution system of the above embodiments:

1. Remove all true broadcast channels from the network
2. Replace these true broadcast channels with uni-cast channels instead
3. Re-purpose the bandwidth (that would otherwise be spent broadcasting to nobody) by allowing significantly more bandwidth for more consumer-level interaction including (but not limited to):
Pod downloads
DVR
Home Gateways
Extra consumer devices
High Definition
Other uses of valuable bandwidth . . .

Such a system still works when a consumer is channel surfing, since there is a very discernable pattern going on between the consumer and his television service. The consumer is systematically stepping from one channel to the next with a variable, however, constant pace. The network recognizes this pattern and "turns on" a number of channels in front of such a channel surfing consumer. The consumer may switch to one of these newly "turned on" channels, or continue to "surf". As the consumer continues to surf, the network can decide to turn channels "off" as they are left behind.

If a consumer should quickly grab a remote control and request a channel that has been long turned "OFF", then the consumer may see a screen that indicates that he might need to wait for a few seconds until the channel is turned "ON" for him. An alternative method simply allows the consumer to see a blank screen until the channel is turned "ON".

In a VOD-Centric CAS network method, the network can "act" like it is broadcasting 600 channels at the same time; however, it is simply an intelligent uni-cast architecture that is anticipating the requests coming from consumers within a given node. The method for "Channel Surfing" mentioned above can also work for a Fast Channel Change model specifically for IPTV. By turning "ON" a few channels ahead and preparing for an Internet Group Management Protocol (IGMP) "Join" and also turning "ON" a few channels behind and preparing for an IGMP "Join", a scenario may be created where a much faster channel change experience can be enjoyed by the subscriber. Such a Fast Channel Change model can be deployed within a STB or virtually any other IP-enabled Playback system (including but not limited to PCs, Game Players, Mobile devices, etc.)

Figure 10:
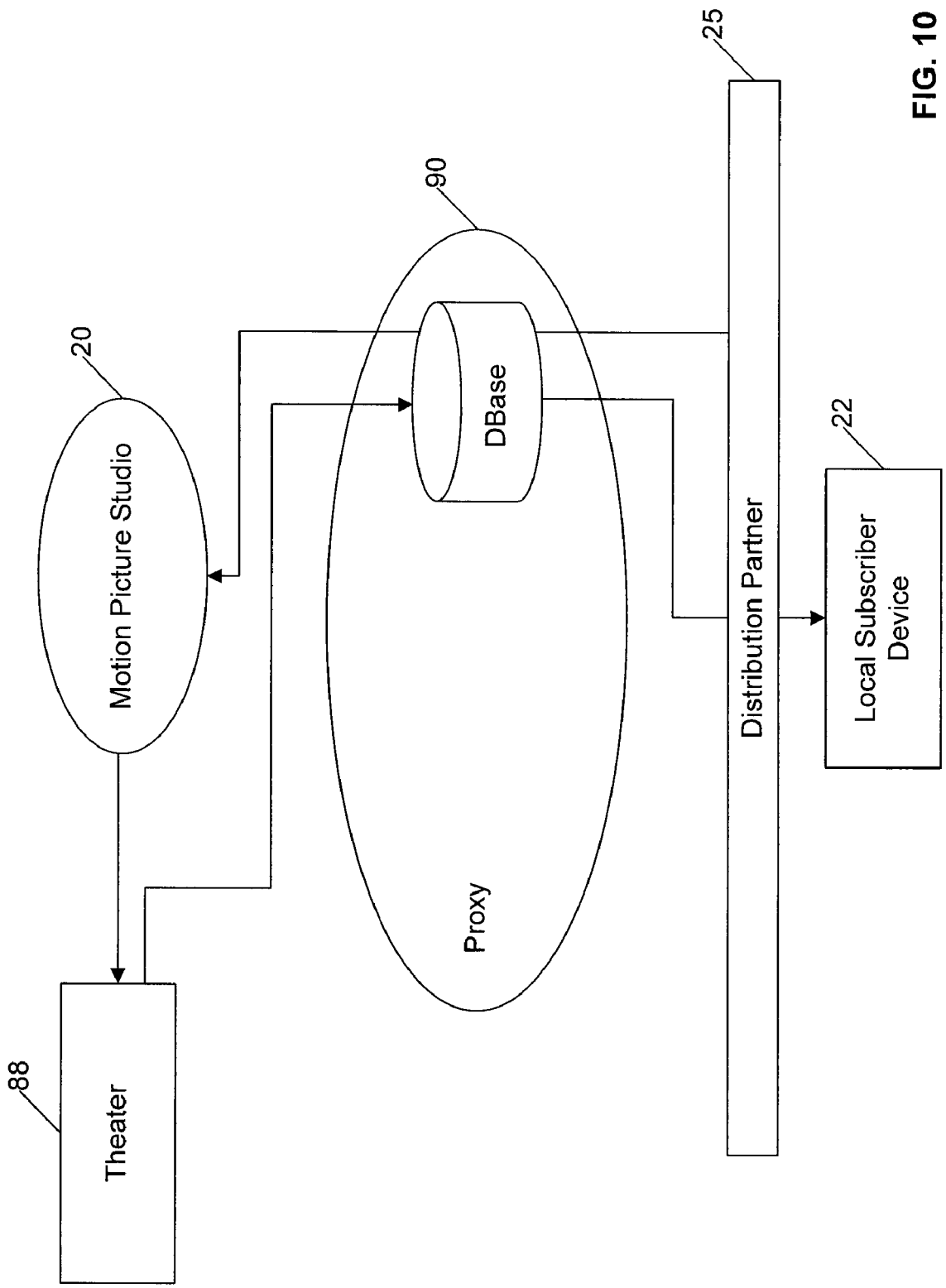
FIG. 10 illustrates another embodiment of a content distribution system including a movie theater.

FIG. 10 illustrates a modification of the network distribution system or architecture of FIG. 3 to include a movie theater 88. Movie theaters typically exhibit movies exclusively during an initial release window, and during this time the movies are typically not available on DVD or for rental from video on demand (VOD) providers. Movie theater owners at some point may switch from film prints to digital cinema. Once this transition has been made, theaters 88 may receive digital files directly from studios, such as Joint Pictures Expert Group (JPEG) files, rather than film. In FIG. 10, digital content files are provided from studio 20 to theater 88 via a network connection. As in the previous embodiments, the communication between the theater 88 and studio 20 may be two way, and the studio may receive empirical data from the theater through a proxy. In this case, the empirical data is representative of the group of customers visiting the theater, and may include geographical boundaries for the neighborhood based on GPS information, number of projectors, movies currently being exhibited, audience size for current movies, and the like. The studio may then prepare custom advertisements based on the profile of the audience at the target theater, and insert the advertisements in the digital content file prior to distribution to the theater.

Figure 11:
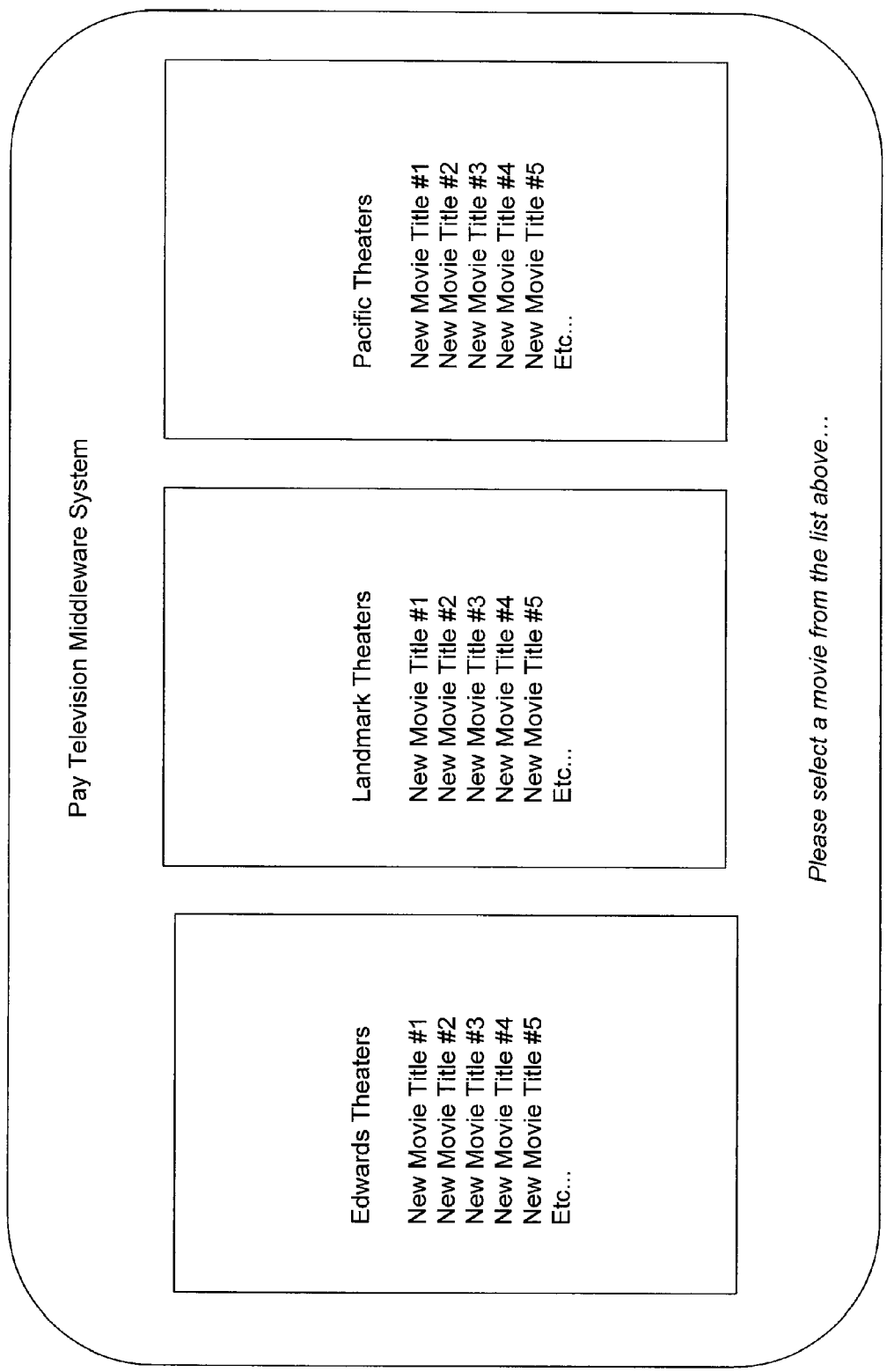
FIG. 11 illustrates an embodiment of a consumer movie selection guide when several different movie theater companies in a neighborhood are linked to the system of FIG. 10.

In this system, movie theater 88 has the right to exhibit the movie exclusively during an initial release window, and movies are only available directly from the studio via the distribution partners 25 along the path illustrated in FIG. 3 after the rental release date. In the system of FIG. 10, the theater 88 may allow subscribers within a local or pre-defined neighborhood to purchase the movie directly from the theater 88 for viewing it at home rather than at the theater in the initial release period, at a premium price. In this system, theater 88 has its own network systems with appropriate security and the like to provide video-on-demand (VOD) services to the local neighborhood. A distribution path is provided from the theater 88 to local subscribers 22 through a proxy system 90 and distribution partner 25 linked to the subscribers through a local access network. The proxy system 90 is designed to provide the granularity needed to keep the movies locked into the pre-defined neighborhood for the movie theater. FIG. 11 illustrates an embodiment of an electronic program guide generated by a middleware system for a service operator 25 comprising a pay-TV service within the local neighborhood of several theaters 88 willing to offer VOD services. There may be a number of competing theaters within the neighborhood which can each compete for a movie play to be transmitted to a neighborhood consumer's home. Such a VOD service offered by a neighborhood theater may benefit the theater and the studios by allowing theaters to keep the movies longer, and also allows the theater owner to find ancillary exhibition opportunities for the movie if it is not drawing a sufficient number of people into the theater.

With the advent of digital cinema, short episodes can be inserted into the content stream that reaches one or more digital cinema theaters 88. In the past, such short episodes or features were presented in movie theaters prior to the main attraction. Since each theater 88 is designed to serve a discrete community and/or geography, these episodes can be produced to be relevant to the very specific target audiences. For example, an episode may be created specifically for an audience in India and the main attraction may be a Hollywood movie created for audiences world-wide.

Such episodes (which may be created by local or regional production companies) can be inserted into a JPEG 2000 stream by way of an authoring process that takes place before the JPEG file is transmitted to the theater or by way of automatic content insertion as accomplished by a system such as the Cherry Picker™ of Terayon Communication Systems of Santa Clara, Calif. Other means to automatically insert content may alternatively be used.

Figure 12:
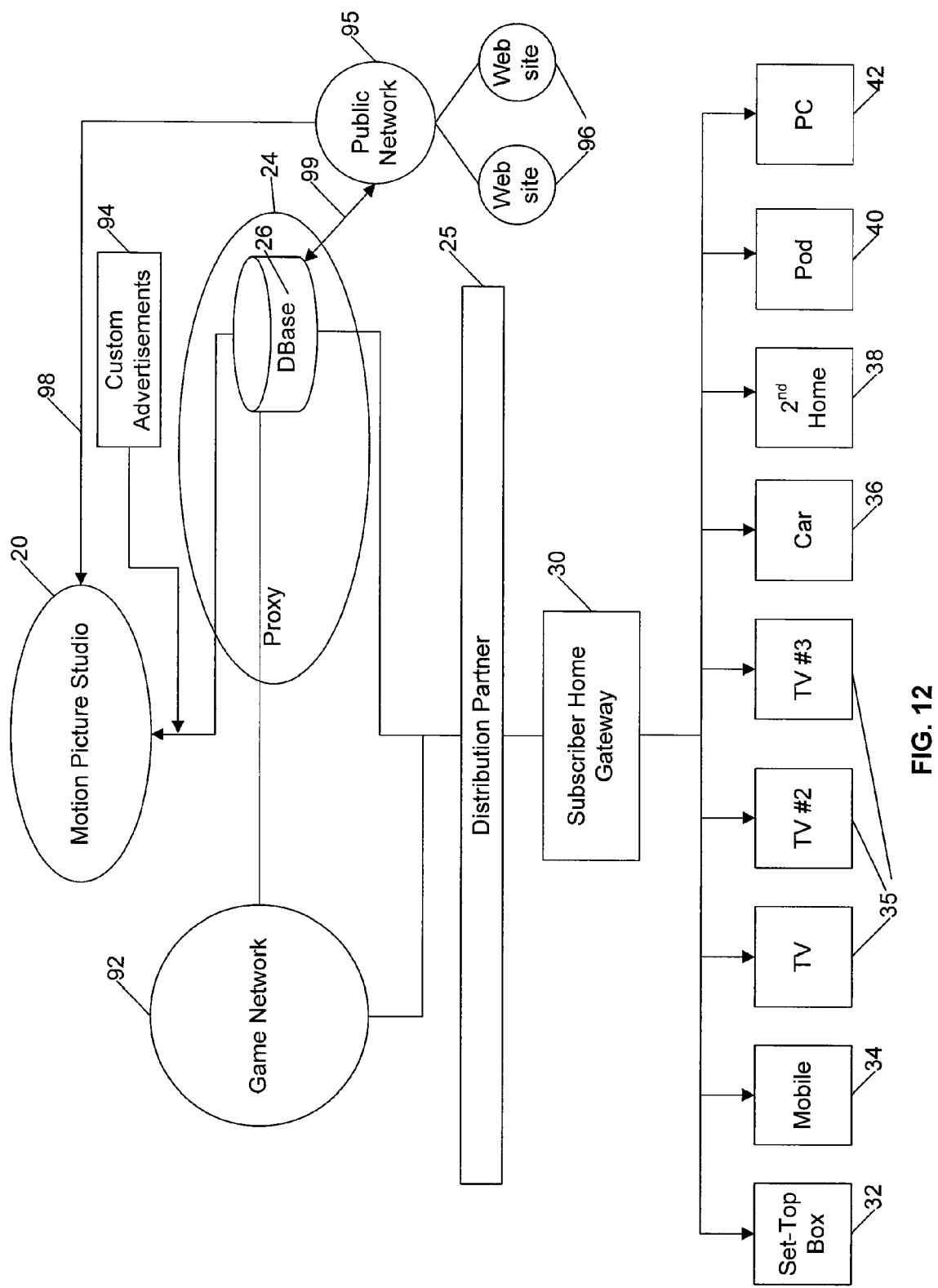
FIG. 12 illustrates an embodiment of an entertainment content distribution system including a gaming network.

FIG. 12 illustrates another embodiment of the movie studio based content distribution system in which a game network 92 is integrated with the system. This system is similar to that of FIGS. 3 and 4, and like reference numbers have been used for like components, as appropriate. The proxy system 24 is used in the manner described above to provide the linkage between the movie studio and the distribution partner (thereby maintaining the consumer's privacy) and the game network 92 is accessible to the consumer and the proxy. Selected games may be distributed to the requesting subscribers through the proxy or directly to the distribution provider.

Devices such as X-Boxes and the Playstations today separate themselves and their gaming eco-system from the television network (terrestrial TV, Pay-TV, or otherwise). If a consumer decides to play a game, a switch is set to by-pass the television network and relegate the consumer electronics gear to the job of supporting the gaming experience. For example, with the flip of a switch (and the insertion of a game cartridge), the TV screen is now converted to a display for the game console only. At this point, the parties within the electronic distribution network derive no benefit (unless the game itself is distributed electronically). In the system of FIG. 12, there is no need to by-pass the television network. Instead, the game network 92 is integrated into the other offerings provided by through the network architecture of FIG. 12. Game playing may allow subscribers to use a broadband connection to play with peers synchronized through game network 92. In the system of FIG. 12, subscribers may be allowed to play with peers through the illustrated separate game network or through the proxy 24.

A 24-hour a day, gaming channel may be offered by studio 20 in one embodiment. This gaming channel may be used to promote the games provided by the movie studio and by partners such as game developers and distributors, to teach people to play the games, including advanced strategies, and to teach people how to use the various game devices (X-Boxes, Playstations, Nintendos, Mobile devices, and the like). The gaming channel may also offer advertising space to game vendors. Once a consumer becomes aware of a game and learns the object of the game and how to play, they may connect to gaming network 92 within the movie distribution architecture of FIG. 12, rather than a separate (private) network. The games can then begin with the encouragement and support of the movie studio and the television distributor or distribution partner.

Although there are hugely successful game companies around the world that know how to create compelling and successful games, they are not well positioned to integrate the experience into the rest of the television paradigm (including the home networking component). For the most part, the game community is relegated to being a separate business within a private setting (either connected to the Internet, or operational only within a small local environment.) When fully integrated into a television environment, it is possible for people playing games to find themselves inside popular television broadcasts. An example would be, you achieve the next level of success in the game and you find yourself in the popular Fox television show, The American Idol, for example. Although this particular example may not come to fruition, it provides some framework of what can be done if the gaming experience is kept within the movie and television delivery environment.

In the system of FIG. 12, custom advertisements 94 can be inserted into the gaming experience by way of the studio 12 (as illustrated in FIG. 12). Custom advertisements may alternatively or additionally be inserted by the distribution partner or television distributor 25. Advertisers may agree to pay the consumers a cash award (or a gift) should the consumer achieve a certain threshold. This in itself cannot be considered gambling as the consumer does not have any of his own money or property at risk. It is only the consumer's ability to achieve certain goals in a game that allow the consumer to enjoy rewards such as cash, gifts, or valuable coupons. It is envisioned that such cash (or other valuable awards) may create a sense of consumer loyalty to the games and the game platforms being offered in the system of FIG. 12.

In addition to providing a much larger platform for consumers to enjoy playing games (as it can be integrated into the large television viewing experience), the system of FIG. 12 can offer game developers the opportunity to develop and distribute game "plug-ins" into the gaming network. These "plug-ins" can be anything from the games themselves to scenarios within certain games. An example of such a "plug-in" idea is presented in the game scenario below:

Example of Game Provided Using Game Network with Plug-Ins

The game in this example is referred to as "My Life". In this game, the consumer or subscriber has the opportunity to scan in all of the pictures, videos and images of all the people he or she is closest with. This can include family, friends, peers, work-mates, school-mates, neighbors, community members, and others. Once these images are scanned-in, then the consumer has the ability to render each person in three dimensions and provide personality and other profile information that can be included with each three dimensional image.

The game may also offer a number of three dimensional images of celebrities including profiles of the celebrities themselves or of specific characters played by such celebrities in television shows or the like.

Once the consumer's personal world contains the desired three dimensional images representing his or her own local environment and the celebrities are provided by the gaming network, then the consumer can select from a number of predetermined scenarios. Scenarios may include the following:

Receiving an Academy Award
Winning the World Series
Winning the American Idol
Impressing their friends at a school assembly
Impressing their friends on an athletic field
Becoming President of the United States The game "My Life" can also be programmed to include some random and unexpected events at the request of the consumer. Plug-in style scenarios may be developed by third party game developers for use in such a game or other games. Once the scenario is complete, it may be offered to television broadcasters such as MTV by way of the movie studio or it may be offered on the studio's own gaming channel. Given the examples above and many more scenarios, the game network can permit integration of the game playing experience within the larger television viewing experience.

FIG. 12 also illustrates an optional modification to the movie studio-based network architecture which allows web entities to work together with the movie studios 20. As illustrated in FIG. 12, the motion picture studio 20 may be linked to one or more web sites or web entities 95 over a public network 96 such as the Internet. FIG. 12 illustrates two ways in which the movie studio can work with web entities over network 96. One method is to have web content delivered to the movie studio via link 98 and then provided to subscribers over the same distribution path as movies and television shows. The web content is made available by the studio to the distribution partners and ultimately to the play-back devices within the subscriber's domain. A second method is for the proxy 24 to facilitate a two-way relationship with the web entity for transactions that require the two-way flow of information and/or need to happen quickly, via two way exchange 99. The system of FIG. 12 may allow movie studios and web providers to enjoy an integrated exchange of information, advertising and entertainment and a resultant increase in value.

The system of FIG. 12 may provide an improved level of "Quality of Service" (QOS) when web entities carry more video content without the ownership of access networks (or favorable relationships with the primary providers of broadband access), their offerings are relegated to "best efforts" only. High-definition (HD) is becoming a desirable option for millions of consumers who have purchased HD consumer devices such as televisions and the like. In the system of FIG. 12, web entities may partner with movie studios, proxies, and distribution partners to provide a higher level of quality in their offerings. Movie studios can offer both QOS and a fully integrated viewing experience without depending on the consumer to purchase specific equipment. The movie studio may offer one or more of the following through the proxy and distribution partners: remote control; electronic program guide; digital video recorder; search engine; home gateway; set top box; television screen. The consumer or subscriber does not need to purchase any new equipment but can use their existing pay-TV system to integrate with the network distribution system of FIG. 12.

For projects such as television production, a studio connected in a content distribution network system as described in the above embodiments can help to secure and house the television production process itself, in addition to having the ability to make instantaneous insertions of advertisements, product placements, information, scene changes, or otherwise that may further enhance viewing enjoyment and make the experience feel more relevant (and connected). Some examples are provided below:

Within an episodic television show, there is a designated location established to hold a box of detergent soap. During the production process, there is no box of detergent of any kind. The space is simply left "open". During the broadcast of this television show, the movie studio inserts the appropriate "branded" product within that space by use of electronic means. Such a just-in-time approach may yield significant more revenues over time as the deal may be negotiated within a time frame much closer to the actual "airing" of the show.

Within a Reality Television show, the movie studio 20 can insert broadcast video from virtually any location on the planet in order to further enhance the enjoyment factor of the Reality Television show.

The movie studio 20 may weave broadcast video and place discrete products into television shows using the granularity of a consumer's household (rather than a region of the United States).

The studio 20, as stated earlier, can weave in more of a real-time gaming experience for game enthusiasts and others with the granularity of a consumer's household.

There may be other similar opportunities where high-speed connections, two-way communications, and the granularity of individual households can be leveraged for both profit and enjoyment.

Figure 13:
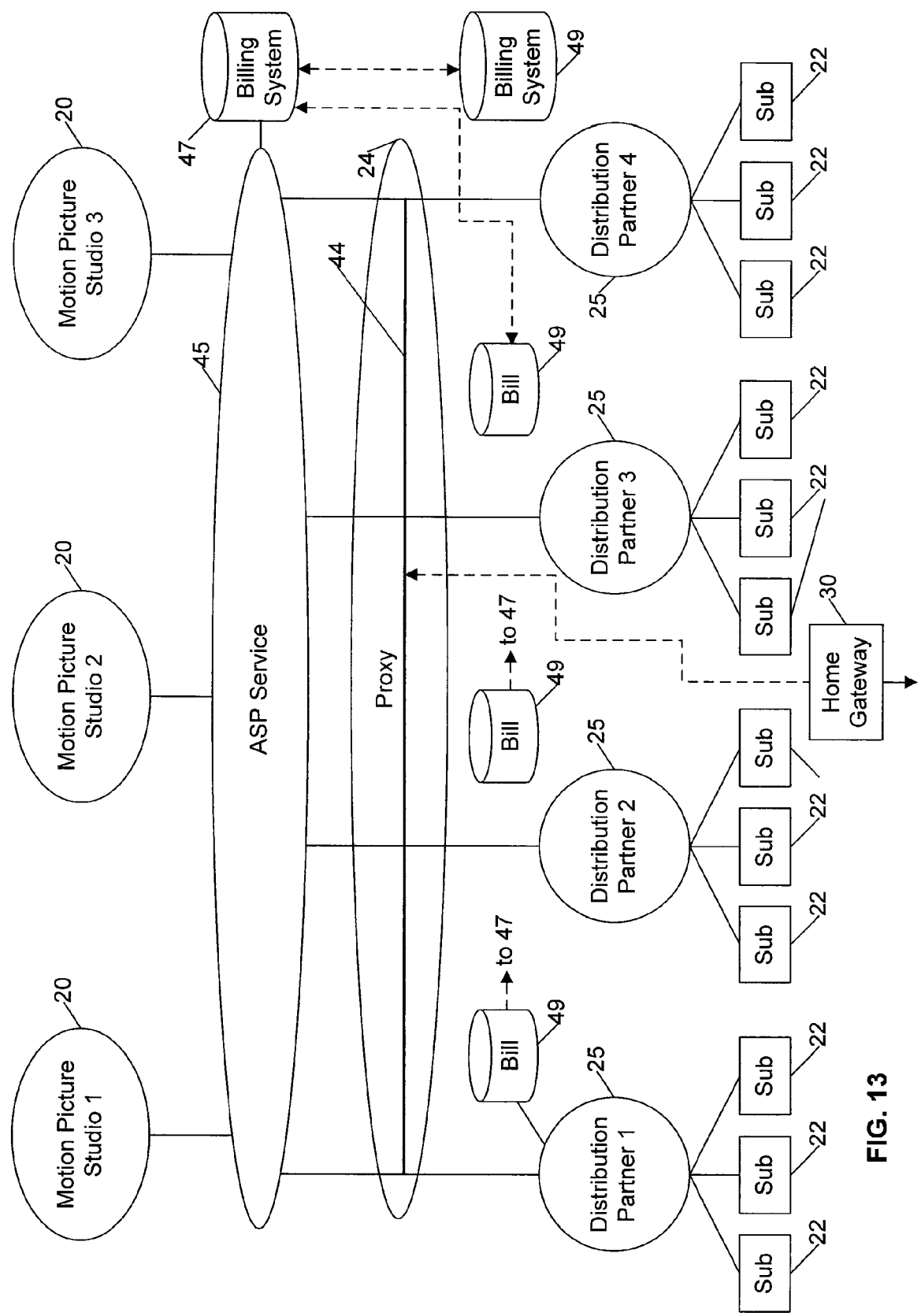
FIG. 13 illustrates an alternative embodiment of a content distribution system in which a plurality of movie studios provide content over an application service provider to various distribution partners or access networks.

An alternate way to design the systems mentioned in this patent application is as an application service that can be operated by an Application Service Provider (ASP) which can be accessed by numerous studios and access networks. FIG. 13 is an overview design of an ASP model. Numerous studios can use such a service and numerous service operators can be connected and subscribers can have access to subscribers on distant (or alternative) networks. In the alternative illustrated in FIG. 13, rather than a movie studio being connected directly to the proxy system as in FIG. 4, an application service provider (ASP) 45 may be accessed by the various movie or motion picture studios 20 and various distribution partners or service operators 25. By providing such a multi-platform (or cross-platform) capability, then subscribers using different platforms or sources for content delivery can be combined so improved data or a more accurate profile of subscriber preferences can be delivered to the participants of the network. Such a model can allow subscribers to enjoy networked "community" environments outside of the domain of their own access network, as described in more detail below. Additionally, advertisers can enjoy "word-of-mouth" advertising opportunities across multiple access networks.

A billing system 47 at the application service provider may be linked to billing systems 49 of each distribution partner 25, and to billing systems (not illustrated) of Studios 20. A single aggregated bill may be provided to subscribers 22, which aggregates charges of the distribution partner or service operator and charges of the ASP and movie picture studios for services requested from time to time.

In addition to the proxy linking the various delivery platforms or distribution providers for a given subscriber (using a key such as a Subscriber ID or otherwise to preserve the confidentiality of any personal information), the home gateway (or media server) 30 of FIG. 4 may also be used in the system of FIG. 13 to link the various delivery platforms or client devices within a home or office and offer this "behavior" data to the proxy system 24. FIG. 13 illustrates how such behavior data can be collected by the home gateway of a subscriber and then transmitted back to the proxy from the client device, such as a set-top-box or television set, connected to the service operator's network (as illustrated in dotted line in FIG. 13).

Figure 14:
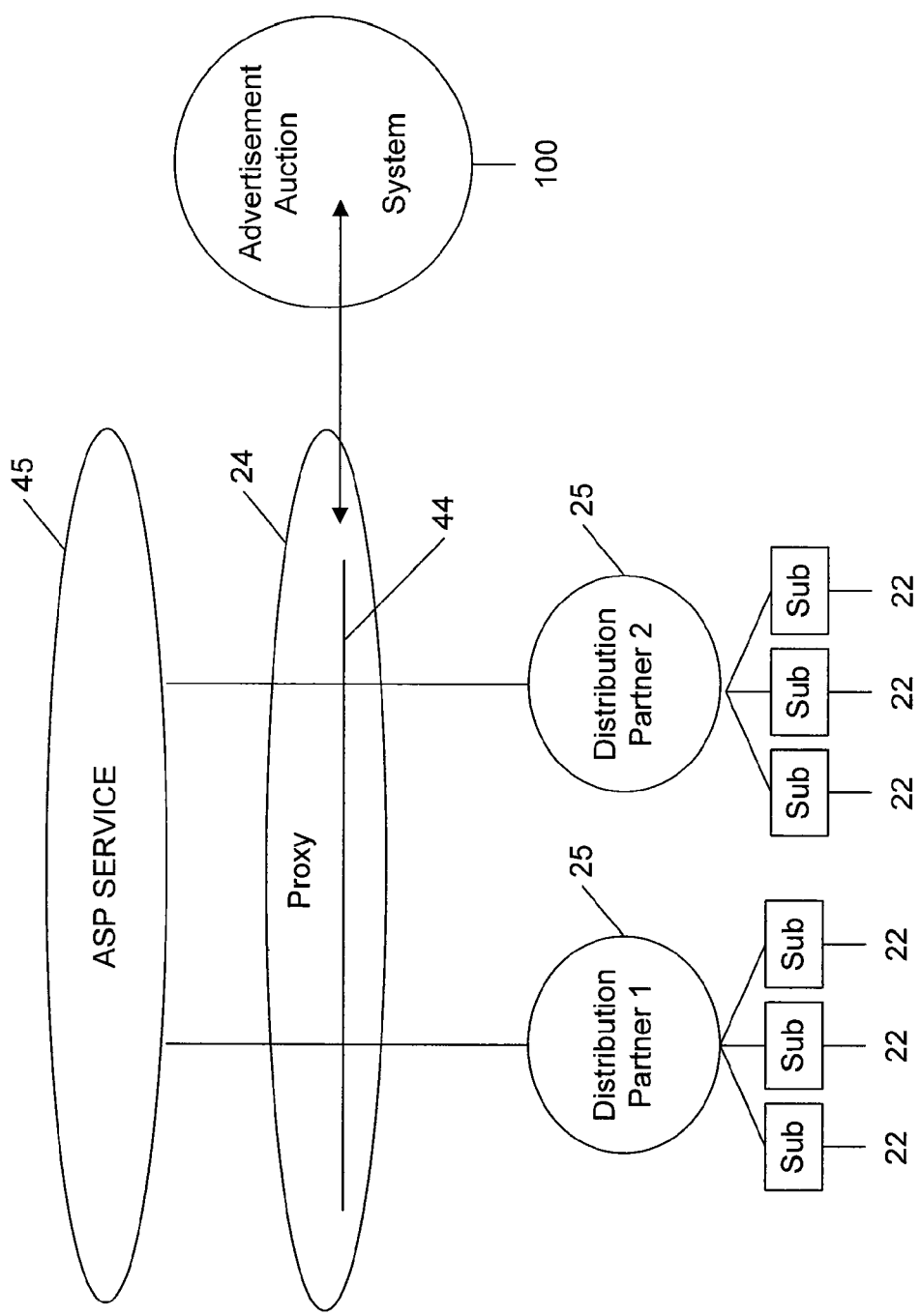
FIG. 14 illustrates a modification of the embodiment of FIG. 13 to include an advertisement auction system.

In certain circumstances, content distribution opportunities with advertisement insertion capabilities might lend themselves well to an auction scenario. In one embodiment, an advertisement auction system 100 may be connected to the proxy 24 of the previous embodiment, as illustrated in FIG. 14. Instead of having a certain advertisement waiting in a database for the right subscriber (or set of subscribers) to reveal themselves, advertisers can participate in an auction scenario where they bid on the right to play their advertisement given the set of circumstances that present themselves at the time. One scenario can be as follows: A given subscriber is watching a documentary about expensive yachts traveling around the Greek Isles. An advertisement is scheduled to be presented to the subscriber within 15 minutes and the service operator 24 has allowed the profile information for this subscriber to be transferred to the proxy data base. In addition to the profile information, the service operator also passes the credit score for this subscriber to the proxy as well. (The credit score may be obtained through Experion, Equifax, and others.) Given this profile information, the credit score, and other information it may be determined that this subscriber is considered a "high-net-worth individual". Such a scenario may lend itself to an advertisement auction. Such an auction looks for advertisers that are waiting for such an opportunity to present itself. The auction is quickly performed and a winner is determined. The advertisement for the winner is then shown to the subscriber seamlessly at the appropriate moment during the content play.

Such an auction may be conducted days, weeks, months, or even years before the exhibition, however, it is also possible that such an auction can be conducted minutes or even seconds before the advertisement is to be placed into the appropriate slot within the exhibition. Once the auction is complete, the winning advertisement is placed within the appropriate slot within the exhibition and it is played seamlessly.

The auction system 100 may accommodate an "automated bidding" process. By using an application such as an "Advertisement Bot" program, bidders can automate the bidding process as they look to take advantage of opportunities to place their own advertisements when ideal conditions present themselves.

Figure 15:
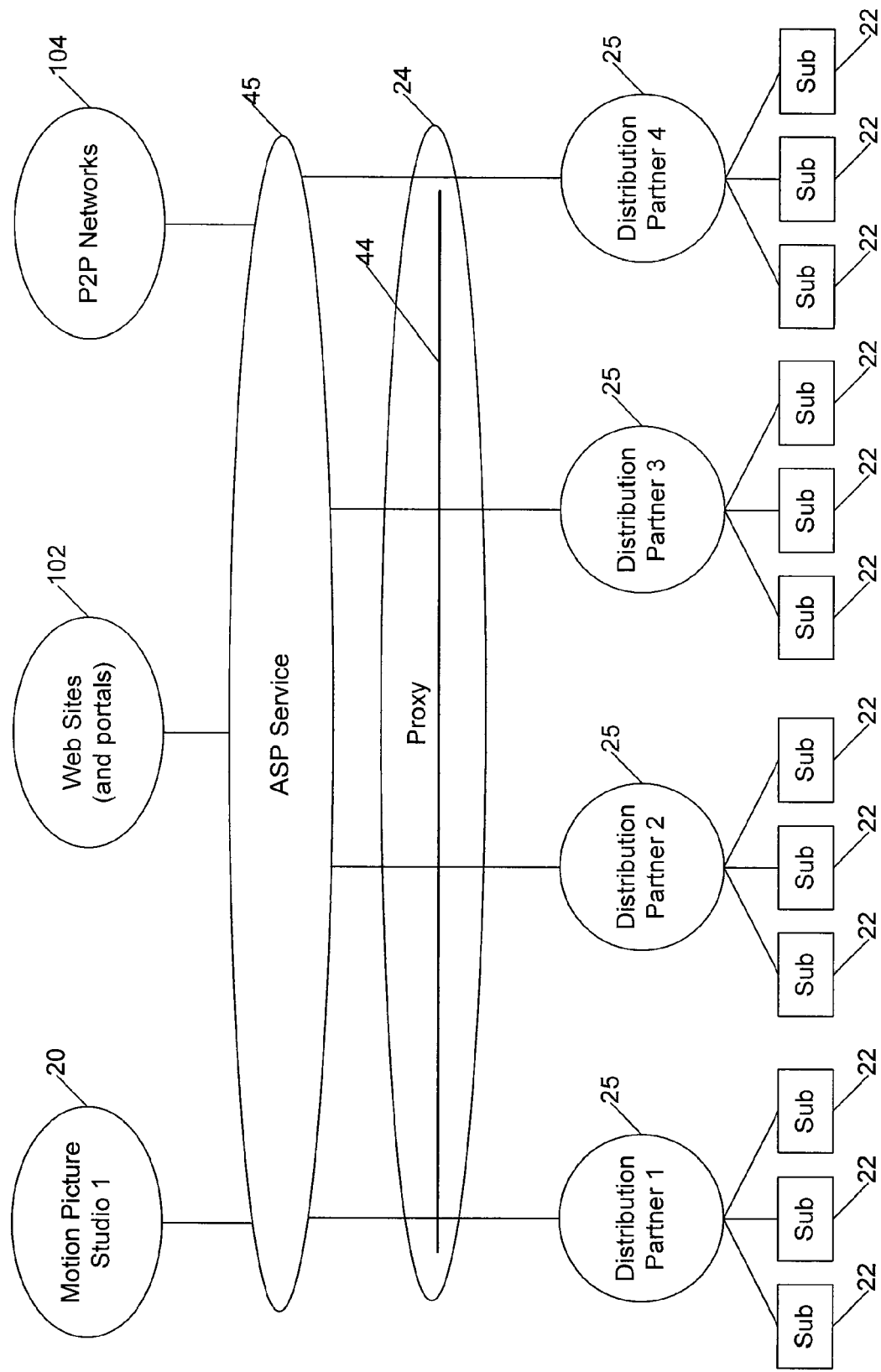
FIG. 15 illustrates a modification of the system of FIG. 13 in which web sites and peer-to-peer (P2P) sites also provide content over the content distribution system or network, in addition to movie studios or content creation sites.

FIG. 15 illustrates a modification of the network architecture of FIG. 13 in which other content providing entities or content creators are connected to the ASP service 45, in addition to movie studios 20. These entities comprise web sites 102 (including web portals and other web-based entities) which can thereby provide content to the distribution partners 25 and to subscribers 22 via the access networks of such distribution partners. In this embodiment, web sites, web portals, and other web-based entities are treated like any other studio. The two-way flow of information can be achieved through the proxy system 24 in the same way as for movie studios, as described above in connection with FIG. 3.

Additionally, Peer-to-Peer (P2P) sites 104 may offer content to subscribers through ASP service 45, proxy 24, and distribution providers 25, as illustrated in FIG. 15. In the embodiment of FIG. 15, a web site, web portal or other web entity can provide content and its relevant advertising material in the same way as a major Hollywood studio 20. Such a web site using these networks and systems receives empirical data on consumer preferences from the distribution providers in order to send the appropriate advertisements (and advertisement specifications/requirements) to the subscriber.

Figure 16:
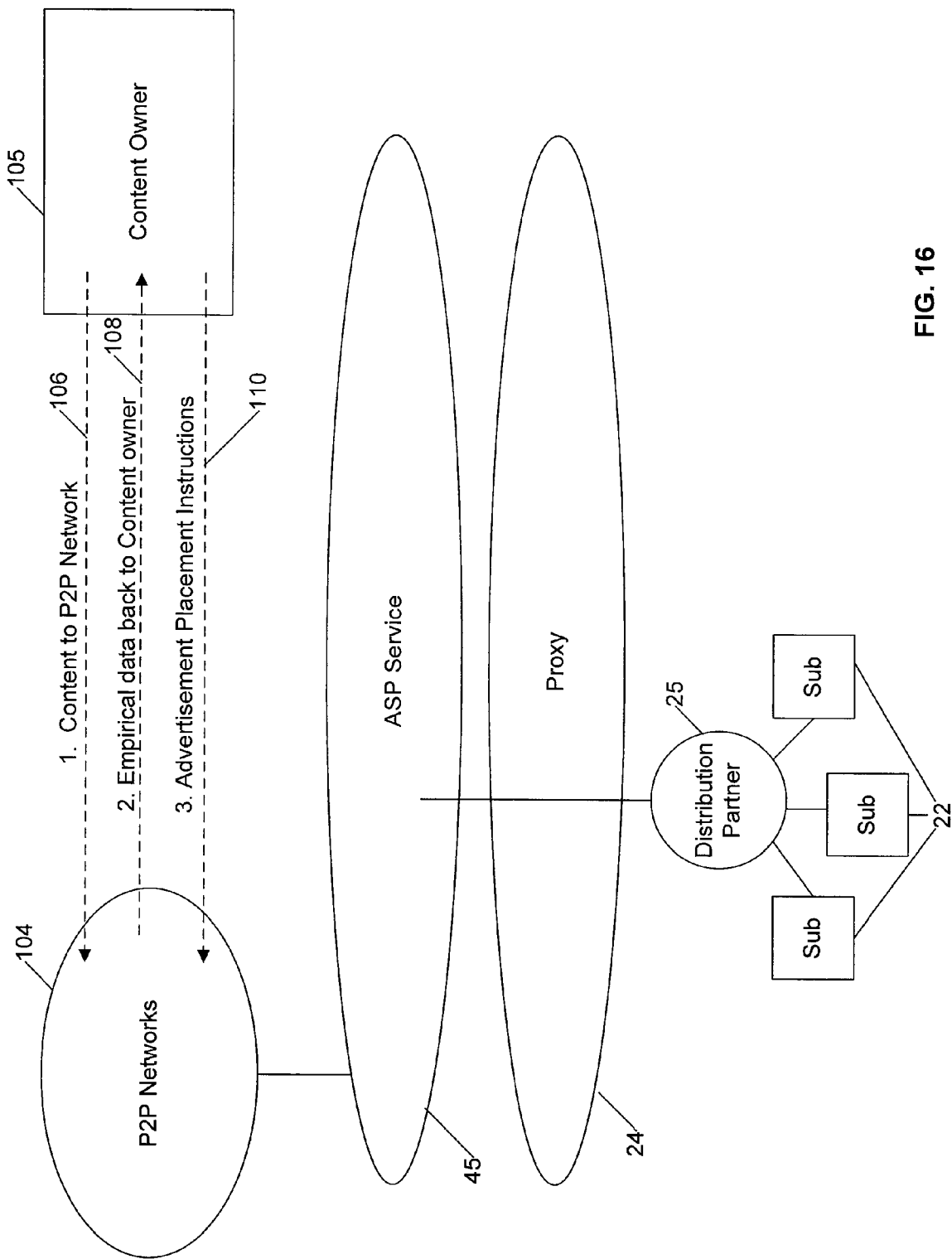
FIG. 16 illustrates a link between a P2P site and a content owner in the system of FIG. 15.

FIG. 16 illustrates operation of the peer-to-peer site 104 of the system of FIG. 15 in more detail. Such sites typically obtain content from a content owner 105 to offer to subscribers through the network system of FIGS. 15 and 16. Empirical data or subscriber profile information received by the P2P site 104 through proxy 24 can then be provided to the content owner, and the content owner 105 can then dictate the specifications and parameters for the advertisements that are allowed for the content owner. In this Peer-to-Peer case, this is a two-step process. The content owner sends content to the Peer-to-Peer site to be posted for the domain of potential users (step 106). As the content is downloaded, empirical data is captured by P2P site 104 and sent back to the content owner (step 108). The content owner then sends instructions detailing the advertisements and specifications for the delivery of the advertisements according to the empirical data (step 110). The goal of such a delivery mechanism is to allow Peer-to-Peer delivery mechanisms to provide relevant advertising as if they were a major Hollywood studio.

As discussed above, subscriber communities in this patent application refer to subscribers who are similar in one compelling way or another, for example subscribers having similar viewing preferences or other interests, or subscribers who all belong to a particular group. Multiple communities can be created and one discrete subscriber may become a member in multiple communities. Communities may be created by studios or proxy systems by grouping subscribers based on preferences found in subscriber profiles. Additionally or alternatively, such groups may be created and offered to subscribers universally, who may then decide to join community groups in the manner described below. Each movie studio may store a list of communities along with the attributes of the community and the subscriber identifiers for subscribers in the community, and provide community applications based on the preferences of each community group. Since these "Communities" are integrated with the primary video delivery platform within a home, "Community" applications may be provided to a TV and other client devices, rather than simply to a PC only.

Figure 17:
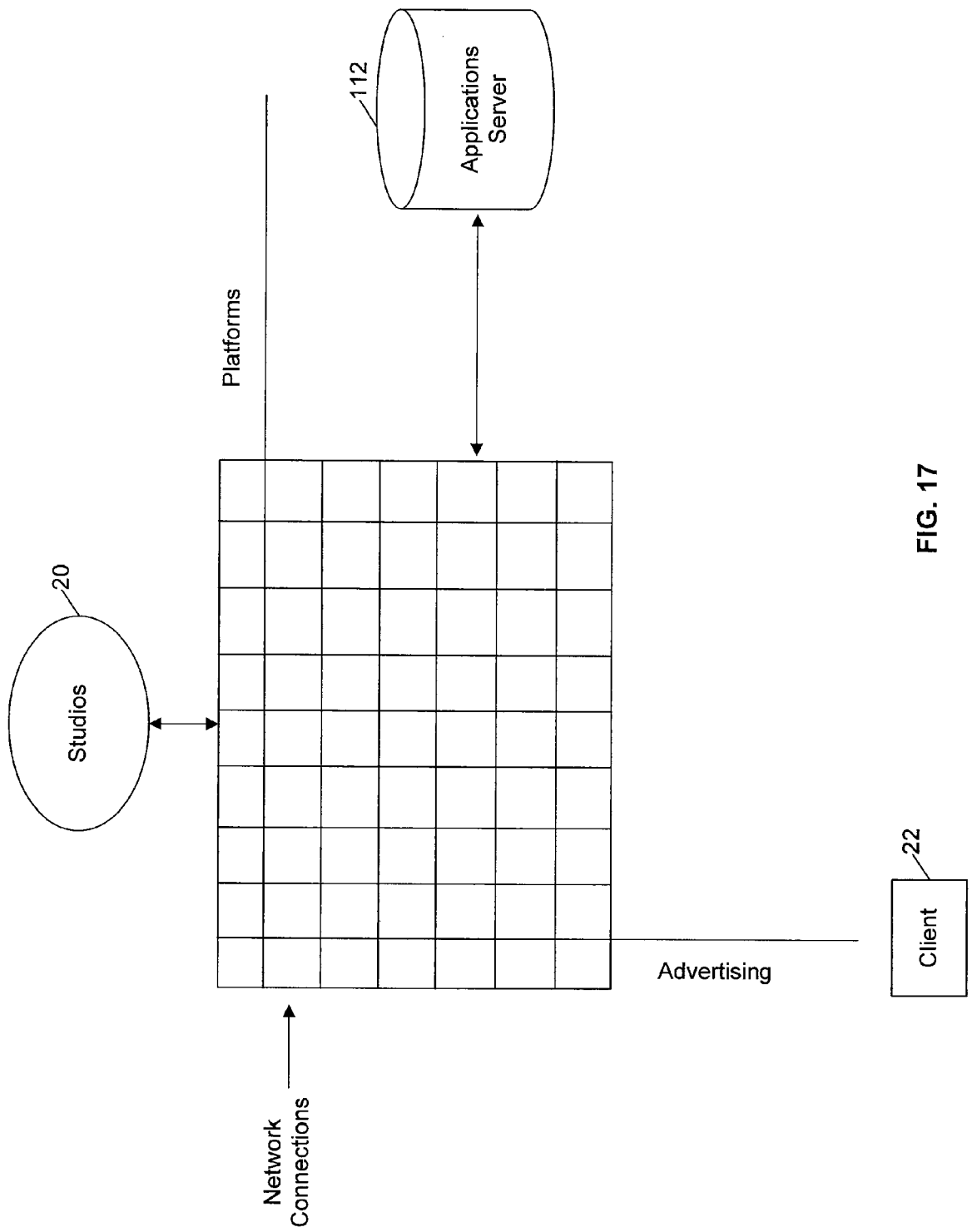
FIG. 17 is a block diagram illustrating a possible organization of infrastructure in an embodiment of a community content distribution network with cross links at all levels so that access is provided to a wide variety of content.

FIG. 17 is high-level illustration of an embodiment of an infrastructure for a community-based content distribution network system. In the matrix of FIG. 17, advertising is represented by vertical lines and platforms are represented by horizontal lines. The horizontal lines describe how the various platforms are connected in order for people living in different locations (around the world) using different devices (mobile or fixed-line) to enjoy the benefits of these "communities". At the same time, advertising models are threaded (as represented by the vertical lines) in such a way as to reach-out to this potentially lucrative audience and, at the same time, help to reduce the overall cost of television delivery by allowing potentially large streams of revenue from advertisers to sponsor some (if not all) of the content delivery. Also present in FIG. 17 is an application server 112 for providing applications to a community group based on known preferences, such as gambling on a sporting event. Applications provided by such application servers can be virtually anything ranging from content delivery offerings to next-generation games.

Figure 18:
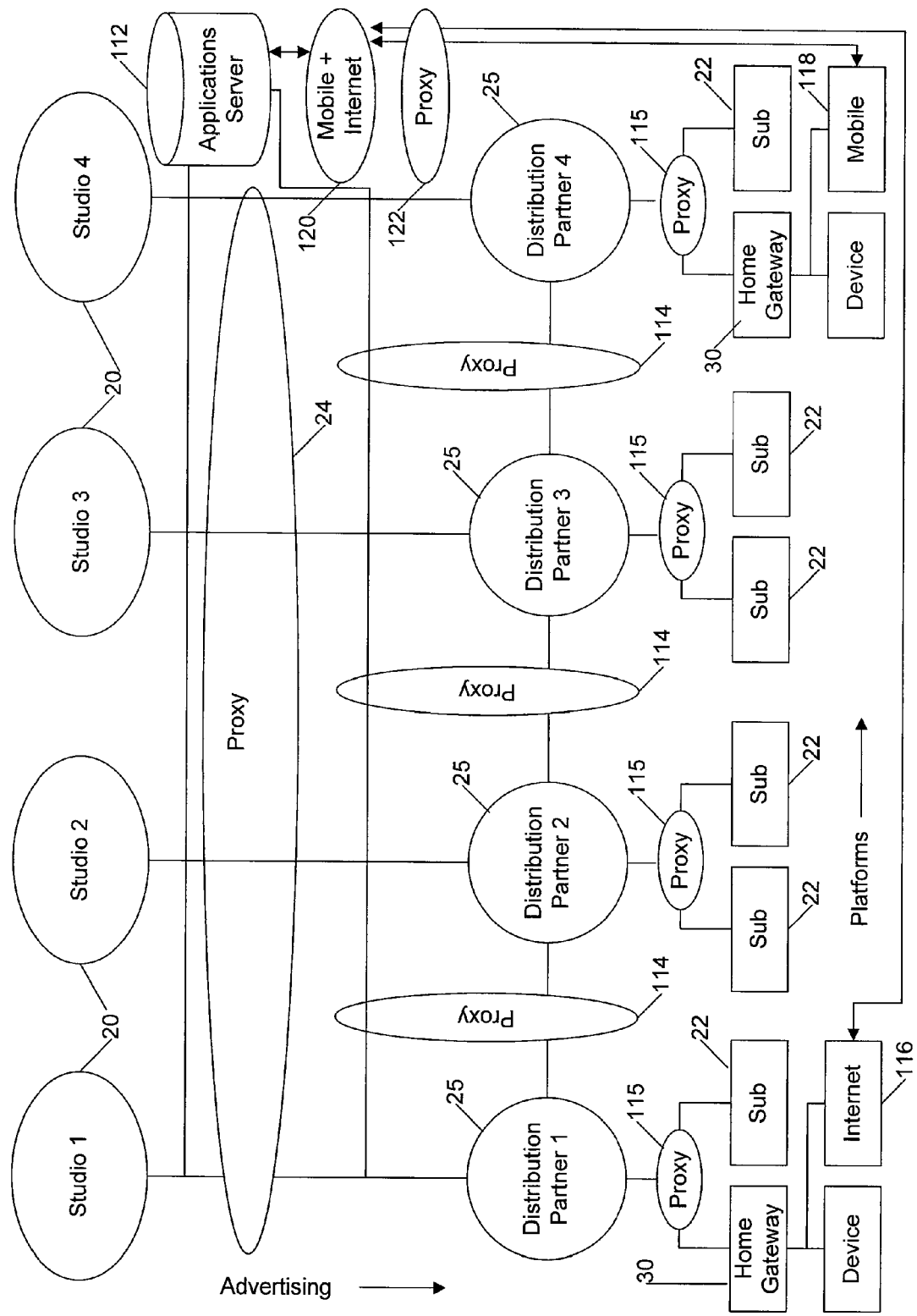
FIG. 18 is a more detailed block diagram of the community content distribution network of FIG. 17.

FIG. 18 illustrates the infrastructure for a community-based content delivery system in more detail. In this embodiment, studios 20 are linked to distribution partners 25 via a proxy 24, as in FIG. 3, and the distribution partners 25 in turn are each linked to a group of subscribers 22. One difference between the embodiment of FIG. 18 and that of FIG. 3 is that all the distribution partners 25 are linked together for communications through a proxy 114, and a proxy 115 is also provided between each distribution partner and its subscribers. There are proxies on connections between all entities until the network encounters a gateway (such as a home gateway 30). In FIG. 18, some of the subscribers 22 are shown as home gateways 30 which are linked to various subscriber devices, such as those illustrated in FIG. 4. Each subscriber 22 of FIG. 18 comprises a similar gateway to various subscriber or consumer devices. After a gateway, such as a home gateway, there are no more proxies. The proxies 24, 114, and 115 serve to protect the identity and confidentiality of subscribers across the network. The various subscribers are assigned transactional ID Numbers (or the like), and are shielded from providing private or otherwise confidential information about themselves unless they so chose. Other than that, advertising can flow from the highest levels (studios) to the most granular of consumers. In addition, platforms can allow "community" applications as they are connected together in the manner illustrated in FIG. 17.

As illustrated in FIG. 18, internet capable devices 116 and mobile devices 118 may be provided in any subscriber's home network and are capable of communicating with various community applications 112 over an alternative network 120, such as a mobile network or the Internet. Such communication paths also include a proxy 122, as illustrated.

In FIG. 18, the studios 20 have visibility through the network to the ultimate terminal devices of each subscriber 22 and the subscriber (consumer) has visibility up-stream to the workings of the studios. FIG. 18 also illustrates peer-to-peer connections between studios. A motion picture studio 20 having access and visibility through the supply chain to the ultimate consumer may offer these options to other studios by "peering" with them (connecting networked systems at the highest levels). By "peering" with other studios, it may be possible to enjoy various cross-promotional opportunities (with or without product sponsorship), and consumers or subscribers may have greater visibility up-stream to more than just one studio.

Figure 19:
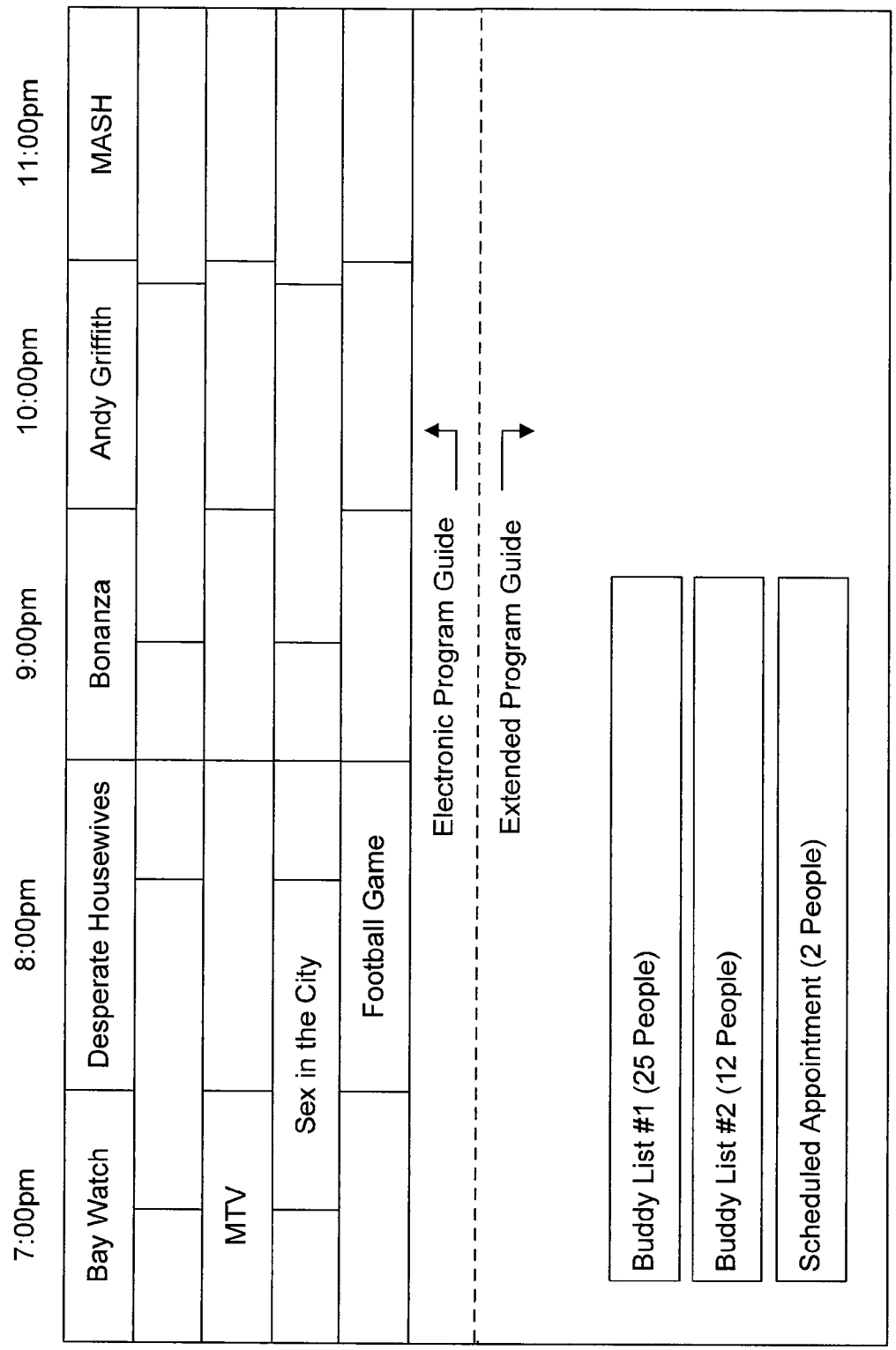
FIG. 19 is an example of an extended program guide (EPG) for the community network of FIGS. 17 and 18.

FIG. 19 illustrates an embodiment of an Electronic Program Guide (EPG) configured to show the "Communities" that might be available to a consumer or subscriber at any given point in time. The consumer is a member of two groups having buddy lists #1 and #2, and certain shows may permit interactivity. In the example of FIG. 19, Buddy List #1 and Buddy List #2 is currently available to the target consumer and there are a number of people who are enjoying the "Community" experience at the moment. The Andy Griffith show that starts at 10:00 pm is highlighted to indicate the scheduled appointment in the EPG for people to enjoy the "Community" experience at that time.

Figure 20:
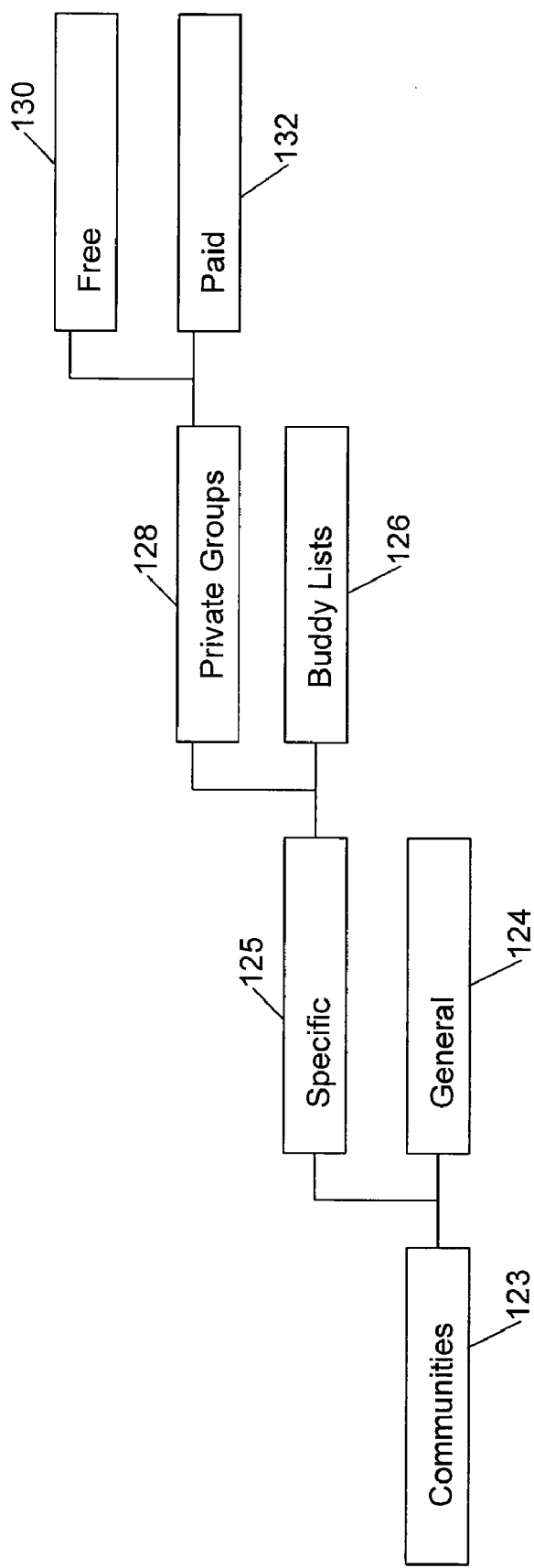
FIG. 20 illustrates a possible method for offering different community lists to consumers.

FIG. 20 illustrates an example of a tree structure for offering membership in community groups to consumers. The tree of communities 123 includes general communities 124, such as teenagers, parents, kids, and the like. There may also be more specific communities 125. Specific communities can be created around numerous themes, special interests, or specific events, such as (but not limited to) the following:

Mounting biking
Sporting Events/Gambling
Movie critiques
Television critiques
Movie and/or TV watching parties
Other types of parties
Exercise classes
On-line Shopping
Craft-making Classes
Educational Classes of all kinds
Chatting
Sharing of videos, pictures, documents, and the like
On-Line Dating including Video Dating.

The system described above may allow a subscriber to obtain recommendations from peers when browsing for content titles. For an example, if the subscriber is browsing for content titles to watch in a given night, such a subscriber may have the option of viewing comments, observations, notes, and other information from peers on the network who have already viewed the title and have submitted their opinions for the potential benefit to others. The subscriber may appreciate these comments as it may be helpful in making the ultimate content selection. In a further embodiment, comments, observations, notes and other information can be offered from specific communities. For example, a subscriber may want to better understand comments about a content file made available from a watchdog group that serves to protect children. Or, a subscriber may want to better understand comments about a content file made available from a more artistic community. The comments, observations and notes can be wildly different from one community to another. This system allows the subscriber to select a specific community before receiving comments, observations, information and/or notes from other peers, rather than receiving critiques from the entire subscriber community which may have different interests from a particular subscriber. The subscriber therefore chooses the community which has interests most in line with their own in order to receive a critique. The various communities may provide potentially different points of view on a particular content title available from a movie studio, depending on the community's collective purpose.

Within the specific group or community 125, there might be Buddy Lists (or those people who the consumer enjoys communicating with on a regular basis) 126 and private groups 128 which may be provided free 130 or for which payment is required 132 (pay-to-join). For example, within the specific group Mountain Biking, there might also be private groups 128 which may be joined on a free basis 130 or a pay-to-join basis 132. One example of such private group might be a "pay-to-join" model where you watch the Tour-de-France along with Lance Armstrong (even though Lance Armstrong my physically be thousands of miles away). The last group to mention is still a private group (as is the one with Lance Armstrong), however, there are no charges for the consumer. In fact this group may be made available be way of a sponsor who may be interested in reaching such a specific group.

Some of the community groups may be established from the outset to be "Child Friendly" as the default. In order to switch from a "Child Friendly" environment to an "Adult" environment may require one or more deliberate actions (i.e. the entry of a password or the waving of a smart card or similar.)

Communities as illustrated in FIGS. 17 to 20 may be created and used in several ways. In one example, subscribers on various networks (fixed-line and mobile) either define a community or join an existing community for the purpose of gambling on a "live" sporting event in an environment of camaraderie. In this particular example, the ASP allows subscribers across numerous various discrete networks to connect with one another using communications means including (but not limited to) the following:

Voice transfer methods (POTS or VoIP)
Mobile communications methods (2.5G, 3G and others)
Texting methods (SMS)
Email methods (SMTP)
Video Transfer methods
Video Conferencing
Instant Messaging In one embodiment, a video conferencing scenario is used for the community event. Using high-speed, two-way Video Conferencing capabilities may yield the highest amount of enjoyment for subscribers engaged watching a sporting event with bets being placed on certain outcomes. The ASP service may take the bets for each participant and disburse the winning appropriately for the community. In an alternate embodiment, the participants can use an outside service to place their bets. Thirdly, the participants can simply make verbal bets and disburse their winnings and losses as a private matter.

A "Group-Cast" can also be established for an event, a television broadcast, or a movie play. Such a "Group-Cast" can foster a party environment where participants feel connected to others. One such example is the opportunity for a group of men gambling on a football game to "trash talk" while the game is in progress. These participants may be using different platforms, services, and may, in fact, be in different cities, states, countries, or even continents.

Figure 21:
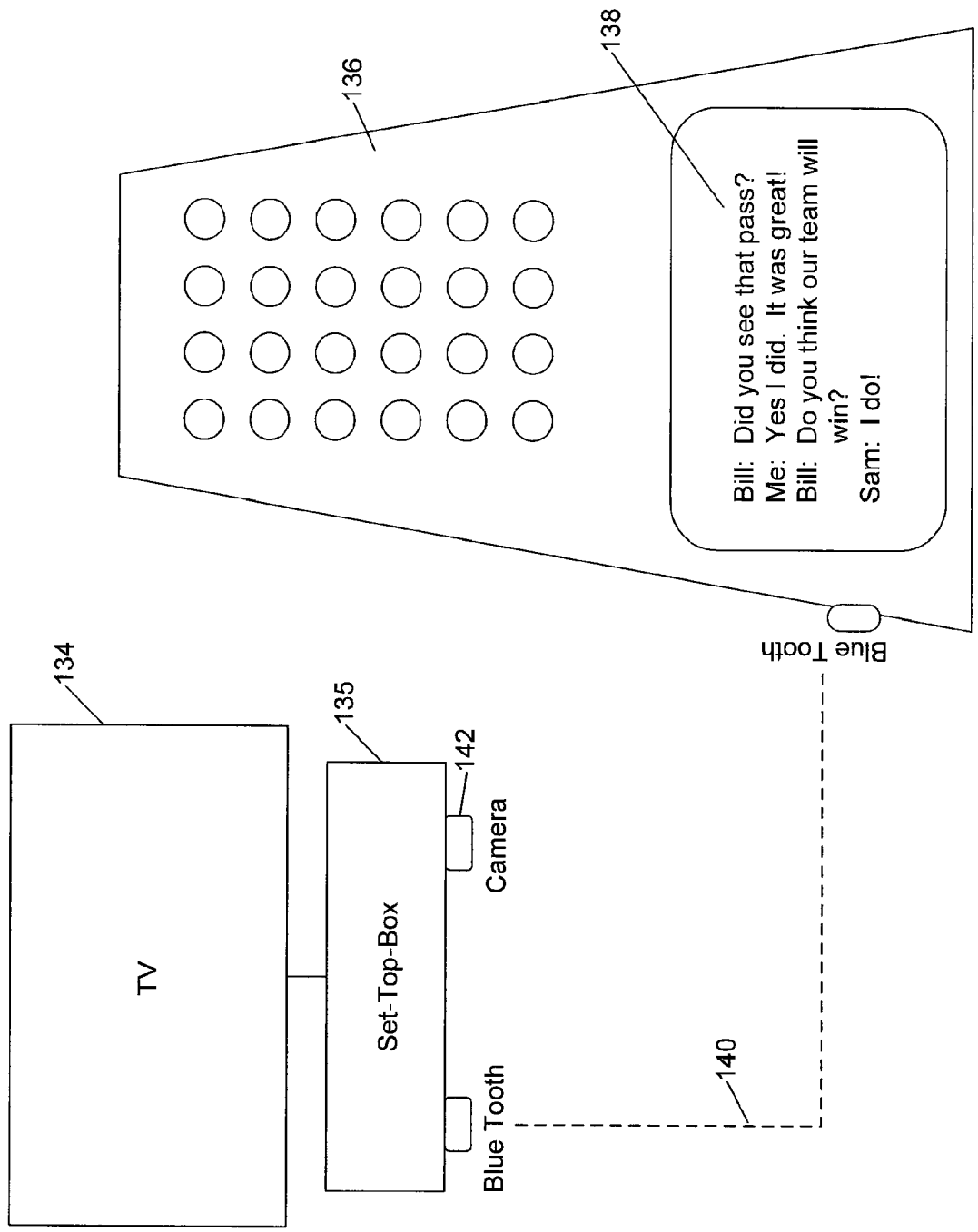
FIG. 21 illustrates a two screen model for a consumer in the community network of FIGS. 18 and 19.

FIG. 21 illustrates one embodiment of a subscriber viewing system incorporating the ability for community group interactions as discussed above. The system comprises a television set (TV) 134, a set top box (STB) 135 connected to the TV, and a remote control unit 136 for the TV. A small screen 138 (approximately the size of an Apple® iPod® screen) is placed on the remote control unit for the TV or the STB. A blue tooth connection 140 is provided between the STB and the remote control unit 136. A small camera 142 is attached to the STB. Camera 142 may alternatively be attached to the TV 134, or may be a free standing camera.

Text information from the STB is directed to the remote control unit by way of the blue tooth connection 140. Likewise, text information from the remote control unit is directed to the STB using blue tooth. This arrangement can allow participants in a community group to watch a presentation on their TV and at the same time comment on the presentation to others also signed on for group participation. For example, participants watching a football game may comment or "chat" about events in the game as they occur, with the comments appearing on each participants group activity screen 138. Although the representation in FIG. 21 shows text being traded between participants, audio/video experiences such as video conferencing can be used as well, using camera 142. The second screen added to a remote control unit allows a sense of "community" to be achieved for the participants without altering the television viewing experience.

Targeted advertising may also be inserted onto the group activity screen 138 based on the activity or event which a group is viewing. For example, if the group is viewing a football game, team products such as shirts, flags, and the like may be advertised to the group participants in the community.

Advanced systems such as IMS (which is an abbreviation for IP Multimedia Subsystem) can be used within the context of a community as described above in order to achieve a multi-platform experience for the various buddies within the various communities. By leveraging the IMS infrastructure, multiple platforms can be integrated into the television viewing experience. IMS is an expansion of the Session Initiation Protocol (SIP) that provides a number of useful standards, guidelines, and APIs to help a Pay-TV operator integrate multiple platforms into a service offering.

In some cases, IMS may either be too large of a system to deploy, or it may simply be impossible to deploy given the constraints of the networked system. In these cases, a full IMS infrastructure is not needed. Rather, Java code can be written to ultimately achieve the same purposes.

The embodiment of FIG. 21 uses two discrete screens in a subscriber viewing system including the capability for group activities. In an alternative embodiment, a single screen may be used. In the two-screen model, one screen displays the television programming only. The other screen is dedicated to the visual activities of the "Community" members, such as text messaging, video conferencing, web crawling, and the like.

The second screen may be achieved in different ways as follows:

1. An external PC-style screen can be connected to the TV or STB
2. A second TV screen can be plugged into the primary TV or STB
3. A mobile device such as a PDA or Mobile Phone can be used to wirelessly connect to the TV, STB, home gateway, or network service
4. Other screens using either a fixed-line or wireless approach.

This two screen model using an appropriately configured remote control unit, a mobile device, a PC screen, a second TV screen or any other screen is different from previous attempts to combine the TV viewing experience with consumer chat platforms which were not popular. In addition, broadcasters, studios and other rights owners are resistant to attempts to use some (or all) of the real estate on the TV screen for purposes other than the programming they provide. The two screen model described above may avoid such problems.

An alternative to this two screen method is to allow the participants of the "Community" to use the single television screen (one screen method) to navigate, select a group, and communicate. Such an alternative method can be achieved by:

1. Reducing the overall screen size and adding a data area on the screen
2. Allowing pop-up screens that can prompt the consumer and capture responses 3. Enabling the middleware to prompt the consumer and capture responses.

Technologies such as Picture-In-Picture (PIP) can be used for this single screen embodiment. The smaller PIP screen may be moved to virtually any location on the TV screen.

In another embodiment, community or group communications are permitted using a combination of a television and a telephone, without a second screen. Within such a "Community" environment, the various participants simply talk to each other while they enjoy watching the television programming collaboratively. If external applications are to be initiated, then such applications can be activated using one or all of the methods below:

1. Voice activation
2. Speech to Text activation
3. Navigation through the television service middleware system
4. The press of a button on the consumer's remote control unit
5. Using a mobile device or PC One example of a possible use of the viewing system of FIG. 21 is that of a Superbowl party being enjoyed at a home. This system allows interaction between friends or community group members with like interests. This embodiment offers a similar environment to a party although the participants may be in different physical locations using different platform devices. In the end, the participants are watching a dedicated television screen in such a way as to enjoy the intended exhibition as prescribed by the broadcaster (or service operator). At the same time, these participants can enjoy a high level of rich community interactions.

In a "community" model as described above, the middleware may be synchronized for the various different systems used by community members. Software may be used for this purpose, such as Ajax software tools on Web 2.0. These software tools perform the processing on the server side so the only processing that needs to take place on the client side is the display of the application pages themselves. In one embodiment, the ASP provides Ajax software tools and applications to allow for community applications without the need to upgrade each middleware system for all access networks, and also to eliminate the need for interoperable digital rights management (DRM) systems.

In a standard television environment, communication between community group members may be difficult due to the absence of both a keyboard and a mouse with only a (limited) remote control device being made available to a typical subscriber. In one embodiment of a community as described above in connection with FIGS. 17 to 21, buttons may be added to the remote control or certain buttons on the remote control device can be programmed to handle the high-volume key-presses. For example, there can be a YES key, a NO key, and a number of navigation keys (right, left, up, down, page up, page down, exit, guide, etc.). These keys can handle the majority of the inputs that would be required of a subscriber.

In another embodiment, voice commands and the use of speech-to-text technologies can be used in place of a keyboard. Such a voice command system may be provided as a feature of a set-top-box (or a TV set), or it can be provided as an external plug-in module. Such a voice command system captures instructions provided by the subscriber and translate the speech into text strings that can be captured by the middleware systems. In another alternative, a keyboard and mouse or other remote pointing devices may be provided in conjunction with the TV set or STB. One or more of these alternatives may be provided in the community system of FIGS. 17 to 21.

Another example of such an integrated community provided by such a network as described in this patent application is the identification of community members who are watching certain television streams at a given moment in time. Such an identification process can be achieved in a number of ways as follows:

1. A discrete page can be presented showing the subscribers community members (who are currently on-line), and the programs they are watching.
2. The activities of the community members can be included within program guide offered by the service operator.

Yet another example can be based around current-day reality TV shows such as the popular American Idol. Using a community as defined in this patent application, subscribers can confer amongst themselves and decide the best way to vote for their favorites. Each subscriber is empowered to place his or her vote as permitted by the television producers.

Figure 22:
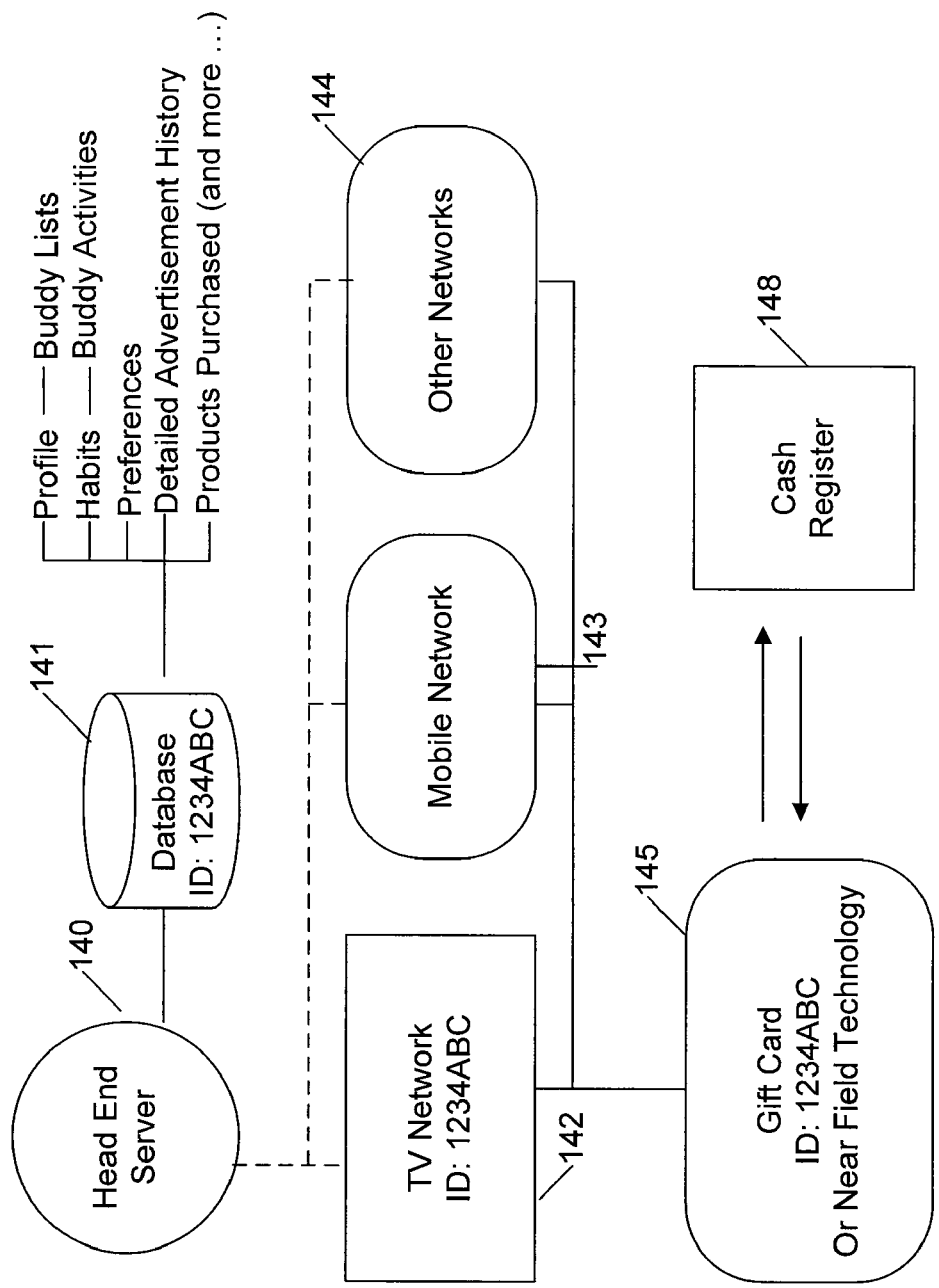
FIG. 22 is a block diagram illustrating a possible method of purchasing items over the distribution networks of the previous embodiments.

FIG. 22 is a schematic block diagram illustrating a modification of a subscriber home or office network which allows purchases of advertised products by subscribers over the network distribution system of the previous embodiments. Significant value can be created when a direct link can be made between a discrete advertisement and the sale (of the advertised product) to the consumer. Although large companies tend to advertise to a large audience in order to improve the visibility and attractiveness of their brand, there are advertising strategies and initiatives that are designed to generate a discrete sale. One such strategy is to combine an advertisement with a valuable coupon (or other such advertising enticement). Such a strategy would reward a consumer with a discount if the consumer consummates the purchase within a certain period of time. If a coupon is then handed to a sales person at the point of sale, then a bar code on coupon (or other medium) is scanned and a match (link) can be made between the advertisement and the sale.

Figure 22A:
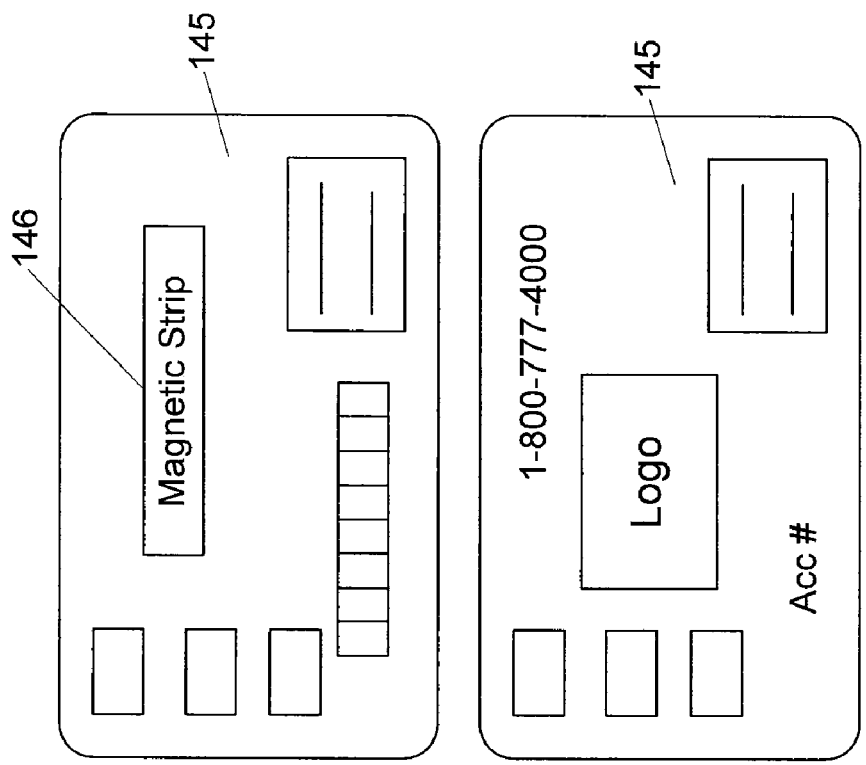
FIG. 22A illustrates opposite faces of a smart cart which may be used for purchase as illustrated in FIG. 22.

In FIG. 22, a coupon-style advertising method is incorporated in the network distribution system described above. The enhanced advertising system comprises a head end server 140, which may be the network server of the movie studio, or a separate server of a company provided a targeted advertisement, has a data base 141 which stores a profile of a particular subscriber identified by the subscriber ID (in this example 1234ABC) which may be the same ID assigned by proxy system 24 or a different ID assigned by the advertising system. The profile may include buddy lists, buddy activities, preferences (subject matter of content files requested), detailed advertisement history, and previous products purchased. Head end server is linked over the network to a TV network 142, mobile network 143, and other access networks 144 used by subscribers. A smart card or affinity card 145 is distributed to subscribers who are using the various access networks. FIG. 22A illustrates the rear and front face of such a card. Each card has a magnetic strip 146 on its rear face, such as you might find on a credit card or ATM card, and a subscriber ID which identifies the subscriber to which the card was sent. The card is for a product advertised to the subscriber by way of a targeted ad over the content distribution network system of the previous embodiments.

If the subscriber decides to purchase the product in the targeted advertisement, they can use the card 145 at the point of sale to obtain a discount. The card is scanned through the cash register 148 and the subscriber receives a discount on the price of the product. The head end server receives notification of the product purchase through the scanning of the card, and can add the product purchase data to the profile of that subscriber.

Using a smart card as mentioned above (or similar device or mechanism), it is possible to provide data going in the opposite direction. Instead of an advertiser sending incentives to a consumer that might encourage the consumer to make a purchase, the retailer may provide incentives that might encourage the consumer to purchase a product or service. An example might be: buy one package of candy and get a video-on-demand play for $1.00. In addition, the data regarding the consumer's candy and VOD purchase can also be logged into the database that is managed by the "Community" as described above.

Such a method can effectively close the loop between the advertisement and the purchase it generates without using the older-style" coupons (clipped from the Sunday paper). The Subscriber ID Number is simply a transactional ID number that in no obvious way links the consumer to the activity. This Subscriber ID number is used to protect the privacy and confidentiality of the consumer in much the same way as a proxy protects the consumers over a network environment.

Instead of using a coupon, smart card, gift card, affinity card or the like to obtain a discount as described above in connection with FIG. 22, "Near Field Communications" (NFC) may be used for this purpose. NFC takes its name from its extremely short-range wireless transmissions which are designed to be used in mobile devices such as cell phones to conduct transactions such as payments for good or services. By waving an NFC-enabled device 145 over an appropriate NFC reader (e.g. in place of the cash register 148 of FIG. 22), a payment can be made quickly and efficiently and a record of the transaction can be provided to the consumer at virtually any time after the purchase (by way of the mobile device service operator).

In this embodiment, an NFC-enabled device is used for payments and may also be used as a mechanism to link an advertisement with a purchase. Therefore, a consumer responding to an advertisement may purchase a product or service and use a mobile device equipped with NFC to receive the promised incentives. Once the incentives are delivered to the consumer, the advertiser can learn of the linkage between the advertisement to such a consumer and the ultimate purchase. The advertisement/purchase linkage of FIG. 22 can therefore be carried out using NFC technology instead of legacy methodologies such as coupons and gift cards, and may result in reduced logistical problems for consumers and retailers.

In one embodiment, the targeted ad insertion system as described above keeps track of all large purchases made by subscribers so they do not receive repeat advertisements for products they have already purchased. A large purchase may be items such as a home, motor vehicle, appliance, carpeting, and the like. In addition, timing mechanisms can be put in place to allow adequate time before similar ads are presented (after a purchase). The following is an example of the use of such a timing mechanism:

A consumer views an advertisement for a particular breakfast cereal and is provided with a valuable "cents-off" coupon as an incentive to make the purchase in the near future. The consumer then goes to the grocery store with the coupon and purchases a box of the advertised cereal. The system as described above waits for at least one month (and most likely longer) before more ads for the same breakfast cereal are presented.

In this example, a coupon may be replaced by a gift or affinity card, or by NFC technology. For example, a short message service (SMS) message may be sent to an NFC-enabled device regarding a discount which may be obtained if the device is used to make a purchase.

Data may be "mined" in an attempt to collect the most relevant data possible about each subscriber. In creating a subscriber profile for targeted advertising purposes, data may be "mined" from other sources. Some of these sources can be (but are not limited to) the following:

1. What are the buddies doing? With a "Community" network as presented in FIG. 18, activities and purchases of the buddies may be considered in order to predict the preferences and desires of the target subscriber. In addition, information is captured that indicates the number of connections with each buddy, the time that is spent with each buddy, and more.

2. What are cross platform buddies doing? With the community network as presented in FIG. 18, activities may be detected across various platforms (mobile devices, PCs, television, and others) in order to "mine" data for the target consumer or subscriber. For example, certain buddies may routinely "text" each other before they begin watching a TV show on Friday nights.

3. What are the contents of the messages going back and forth? Although this may be difficult to accomplish when working to protect the consumer's privacy and confidentiality, it is possible to look at key words in order to determine the preferences and desires of the target consumer.

4. What does the traffic analysis tell us? An analysis of the traffic that is going on between the consumer, his or her buddies, and others can be very meaningful. For example, it may be determined the consumer has a buddy list, however, there is not much traffic until the weekend, or the consumer does not become active unless he first receives a text message on his or her mobile phone. By way of analyzing the traffic within the "Community", a large amount of meaningful information may be gathered and utilized.

Data may also be gathered on the "intensity" of group or community activities by a subscriber, i.e. the level of participation and interest as shown by the consumer and/or the buddies. For example, a television set may be turned "ON" for six continuous hours with no channel changes (or other events) during this entire time frame. It is hard to know the reason why the television is tuned to one channel for so long in this scenario, and the "Intensity" level is therefore low. On the other end of the spectrum, if a subscriber sends and receives numerous text messages with his or her buddies during this time period, and they all immediately turn their television sets "ON" and tune to the same show, the "Intensity" level would be considered high. By watching the cross-platform activities and monitoring the buddy lists and the activities (and possibly words that are being written or spoken), it is possible to determine the intensity level for the target consumers for the moment and, therefore, further provide valuable relevant data that can be used to target specific messages including relevant advertisements.

Figure 23:
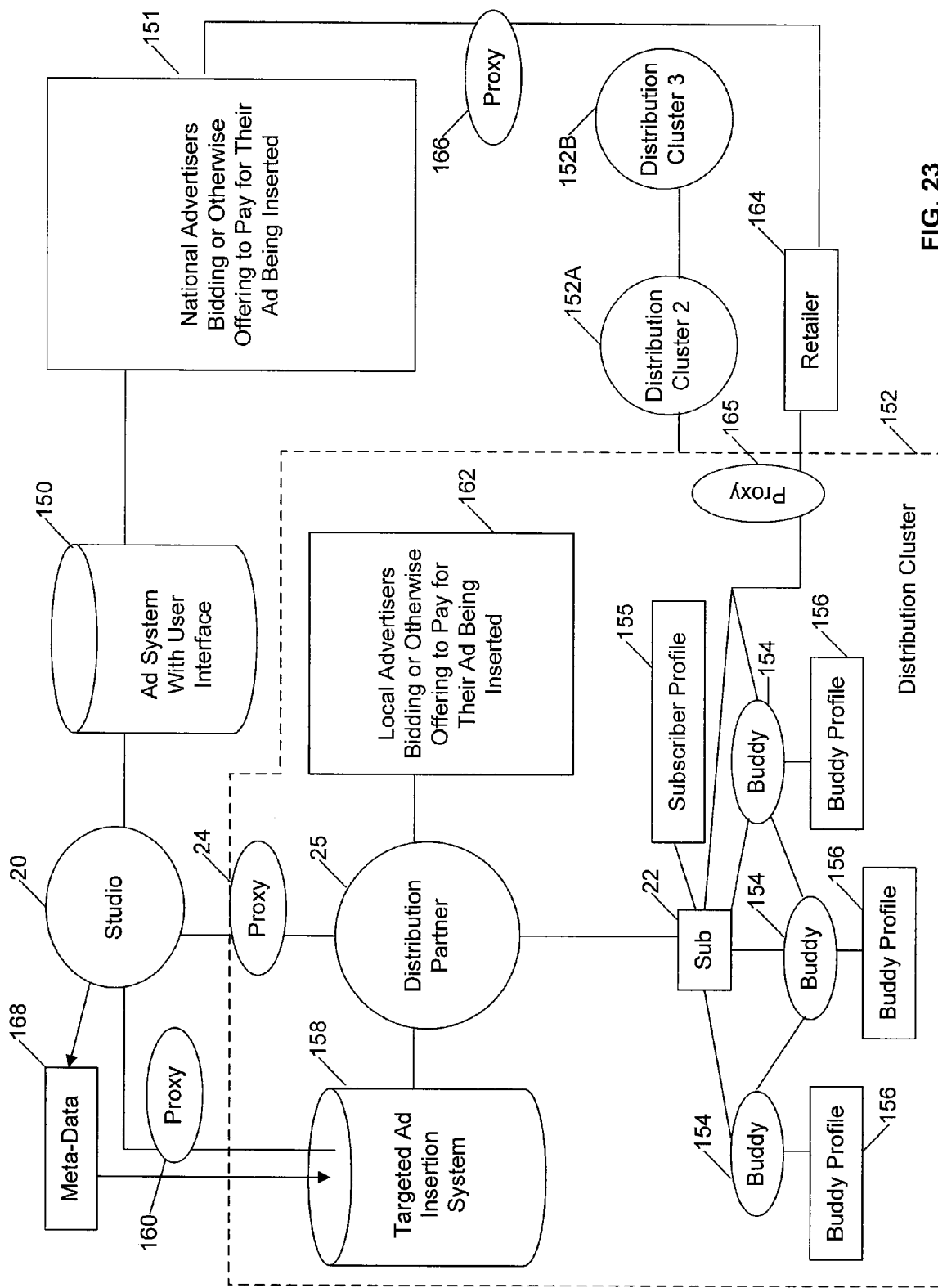
FIG. 23 is a block diagram illustrating an embodiment of a system for inserting targeted advertisements in content distributed over a network.

FIG. 23 is a block diagram of an embodiment of a targeted advertisement system included in a network distribution system including community groups, similar to that of FIG. 18. Some components of the system of FIG. 23 are identical to those of previous embodiments, and like reference numbers have been used for like components as appropriate. In FIG. 23, a content distribution chain from a movie studio 20 to a subscriber 22 is provided through proxy system 24 and distribution provider or service operator 25. As in the previous embodiments, the communication path between the studio and subscriber is two-way, and the studio can gather profile information for each subscriber for use in inserting targeted advertisements into content provided to the subscribers.

The studio 20 is connected to its own advertisement system 150 which has a user interface. Within this advertisement system 150 are encoded advertisement (media) files that reside in a data base. National advertising companies 151 are linked to advertisement system 150 and may provide advertisements to system 150 and may bid for insertion of advertisements through an auction, or offer to pay for ad insertion individually. FIG. 23 illustrates a distribution cluster 152 within the network distribution system which comprises proxy 24, a distribution partner 25 linked to subscriber 22 over its access network, and a number of buddies 154 linked to subscriber 22 through one or more community groups as described above. Subscriber 22 is associated with subscriber profile 155, and each buddy is associated with its own buddy profile 156. The distribution cluster also includes a targeted advertisement insertion system 158 linked to the studio and the studio advertisement system 150 via proxy 160. Local advertisers 162 may be linked to the distribution partner 25 within cluster 152 to allow bidding or payment for advertisement insertion. As illustrated in FIG. 23, additional distribution clusters 152A and 152B are linked to the first distribution cluster and include the same components as distribution cluster 152. Further distribution clusters are incorporated in the network in a similar manner.

The subscriber and buddies in distribution cluster 152 may be linked to one or more retailers 164 over a network through a proxy 165, and may make purchases through this route. Retailers 164 are also linked to national advertising companies 151 through proxy 166.

Any of the advertisements (media files) stored at studio advertisement system 150 can be transferred to the distribution partner 25 at extremely high speeds upon command. There are three different events that trigger a media file (advertisement) being transferred from advertisement system 150 to the advertisement system 158 of the distribution partner 25, as follows:

1. Some pre-defined criteria within a distribution partner's network may trigger the automatic transfer of the asset from advertisement system 150 to the distribution partner 25 by way of 158. In one example, when a particular subscriber begins watching a television show about hunting, an advertisement for a hunting/fishing magazine is instantly sent.

2. The national advertisers 151 bid, barter or otherwise instruct the ad system 150 to transfer a media asset to the distribution partner 25 by way of 158 upon their command as they have guaranteed to pay for it (in one way or another).

3. The distribution partner 25 makes a request to the studio for transfer of a media file to be placed.

By way of the studio's visibility into the network, the national advertisers 151 also have visibility into the entire network infrastructure including the following:

Distribution partners 25
Distribution peers in other distribution clusters 152
Subscriber profiles and activities 155
Profiles and activities of various "Buddies" for the subscriber 156
Retail transactions 164
Other data points that can be captured from neural networks or other artificially intelligent systems, mechanisms, devices, processes, and the like.

A national advertiser 151 has two primary options as described above. This advertiser can establish criteria in response to which his own media files are transferred to the distribution partners 25. Such an option means that advertiser 151 has already entered into an agreement with the studio to allow his ads to be transferred when these criteria have been achieved. No other advertiser is allowed to transfer his ad when these criteria have been reached as this would constitute a "collision" and it is uncertain which ad is inserted and seen by the viewer. Advertiser 151 negotiates for an exclusive right to deliver his advertisement to subscriber 22 once predefined criteria have been achieved. Each time there is an exact match of criteria specified in the exclusive agreement between the studio 20 and the national advertiser 151, the advertisement in the form of a digital media asset residing in the ad system 150 is transferred to the targeted ad insertion system 158 in the distribution cluster 152 of the appropriate distribution partner 25.

Another option is for the studio 50 to allow a multitude of national advertisers 151 to bid on criteria in either a real-time mode or an off-line mode. An example is as follows: A subscriber 22 and his buddies 154 have performed enough activity to know that they are looking for new luxury vehicles. Most likely the search is intended for one of the buddies, but this level of detail may not be determined from profile data. The distribution partner 25 sends the search criteria (profile information 155 and 156) up-stream to the studio for analysis and also to be shared with the national advertisers 151. Since the studio 20 knows there are a number of luxury vehicle manufacturers within the population of national advertisers 151, a bidding process is initiated. The bidding process allows a winning national advertiser 151 to send a specific advertisement to the subscriber 22 and his buddies 154 in place of the national advertisement that would have otherwise played during a specific time slot. This bidding process can be achieved in a number of ways as follows:

1. An on-line electronic auction (using high technologies)
2. An off-line auction (using telephones, sneaker net, or otherwise)
3. Other ways in which auctions can be achieved between a bidder and a population of potential buyers.

Once the auction is concluded, the advertisement in the ad server 150 is appropriately transferred to the designated distribution partners 25 for the subscriber 22 and each buddy 154 by way of each distribution partner's own targeted ad insertion system 158 so it can be placed in a queue to be sent to the subscriber 22 and his buddies 154 at the designated time slot.

The various proxies in FIG. 23 shield personal or private information of the subscriber and buddies from the studio 20 and the national advertisers 151. These entities can see activity information for subscribers and buddies identified only by an anonymous subscriber ID, however, they do not receive any confidential information.

In one embodiment, the targeted advertisement is inserted into the television feed is by way of meta-data 168. The studio sends the advertisement from the ad system 150 to the targeted ad insertion system 158 along with the meta-data 168 in order to inform the distribution partners when the advertisement is to be inserted into the stream of the subscriber 22 and his buddies 156.

A targeted ad from a local advertiser 162 may also use meta-data to inform the systems of the exact location of the advertisement within the television feed. The targeted ad insertion system 158 is a robust system that is connected to the video streaming systems within the data center of the distribution partner 25. The targeted ad insertion system 158 can be operated in a traditional mode by inserting advertisements to discrete geographical areas within the region of the distribution partner 25. This method shows the ad to the entire geographical area at the same time. In addition, targeted ad insertion system 158 also has the ability to insert advertisements into a dedicated stream (such as the stream going directly to a subscriber 22 or a Buddy 154. Furthermore, the targeted ad insertion system 158 can likewise insert advertisements into multiple dedicated streams so the subscriber and all of the subscriber's buddies can watch the advertisement without interrupting the normal advertising lineup for the geographical area. The subscriber and his buddies in one or more communities can be selected to receive specific, targeted advertisements that have been sent from a national advertiser 151 by way of the studio 20 and a distribution partner 25 or from the local advertiser 162.

There is a great deal of value to the network's awareness of inter-buddy behavior. If a subscriber is watching a show and suddenly three of his buddies start watching, he is influential. If another subscriber watches wrestling and his buddies watch cooking shows, the influence is not that strong. These data points can be further analyzed in order to provide data back to the advertisers connected to such a networked system to aid in making targeted ad insertion decisions.

The example above shows discrete advertisements being inserted into individual streams of broadcast video such as news programs, sports programs, episodic television, and the like. The targeted ad insertion system 158 can also operate with discrete video sessions such as Video-on-Demand sessions (VOD). VOD sessions are subscriber initiated events that disrupt the broadcast streams so a video asset can be played from start to finish under the complete control of the subscriber 22. In such a case as a Video-on-Demand (VOD) session, the targeted ad insertion system 158 inserts the appropriate advertisement into the VOD stream. Advertisements may be inserted into the beginning of the VOD stream, or at other locations within the VOD stream as follows:

1. After the first advertisement, but before the VOD media file (for multiple ads before the VOD session)
2. Somewhere in the middle of the VOD media file (possibly during an intermission)
3. At a location after the VOD media file has completed its "play".
4. At the beginning of the VOD session.

In one embodiment, the types of advertisements that are provided by the national advertisers 151 to be ingested by the studio's ad system 150 may be fundamentally different than traditional broadcast television ads with which most people are familiar. The targeted advertisements in this system may be designed to close a sale as quickly as possible. As is commonly known, most advertisements that are played to either a local or a national audience are intended to promote a brand. In some cases there are calls for consumers to find the nearest retail location in order to take advantage of time-critical promotional events. In still other cases, a consumer may be encouraged to buy a product on-line or over a telephone by way of an infomercial-style approach. The studio-to-subscriber advertisements provided in the embodiment of FIG. 23 may be different. An example of such a Studio-to-Subscriber ad is as follows. A national advertiser shows a luxury automobile performing its paces around a race track in order to send the implied message that the car performs very well next to the competition. Then a spokesperson may speak directly to the subscriber (and his or her buddies) in the following manner. The spokesperson may say, "You have been selected by the automobile manufacturer to receive a special offer. This is how it works . . . Go to your closest retail auto center and make your best deal for one of our luxury cars. After your deal has been struck, show the retailer your affinity card (or smart card as defined above) or mobile device by way of SMS message or near field technology or provide the retailer with the number that you now see on your TV screen. This number is used by the retailer to verify that you can receive an extra 10% off from your already negotiated price!"

A transactional ID number may then appear in a designated location on the screen as directed by the targeted ad insertion system 158 This Transactional ID number can be displayed using a number of technologies including (but not limited to) a visible watermark. The ID number may be used in the manner illustrated in FIG. 22 in order to obtain a discount. Once the subscriber or his/her buddies go to the retail location and negotiate their best price for the luxury car, the Affinity Card or the number presented on the screen or mobile device using SMS or near field technology is used to verify an extra 10% deducted by way of the intervention of the national advertiser 151.

The Affinity Card (or smart card as described above in connection with FIG. 22) has an ID number that is associated with a subscriber. This ID number is assigned by the distribution partner 25 and linked to the distribution partner's internal database (such as database 71 in FIG. 8 or a separate database). The distribution partner determines the identity of the subscriber once the ID number of the Affinity card is presented. This Affinity Card may have additional granularity to the level of individual family members who watch television alongside the subscriber.

A secondary method that can work in tandem with an Affinity Card ID number is a Transactional ID Number that is displayed on the TV screen that is also associated with a subscriber. The distribution partner 25 maintains this linkage (Transactional ID Number to Subscriber) as well. Both the Affinity Card and the Transactional ID Number point to the same subscriber. In an alternative embodiment, both ID Numbers (Affinity Card and Transactional ID) can be identical. Once the targeted ad insertion system 158 sends a targeted advertisement to the subscriber 22 and possibly his buddies 154 (with different transaction ID numbers to identify each buddy), all of the applicable Affinity Card Numbers and/or Transactional ID Numbers are sent from the targeted ad insertion system 158 to the ad system 150. As subscribers 22 and buddies 154 arrive at the various retail facilities, the retailers can check these numbers against the ad system 150 by way of the following:

Web
Application Program connected to a public or private network
Telephone
Printed list of ID Numbers supplied by the manufacturer
Printed list of ID Numbers supplied by the service operator
Mobile with SMS message or near-field technologies
Other means to determine if the subscribers or buddies have arrived.

Profile and event information that is sent to a studio 20 by way of distribution partners 25 provides national advertisers with data points necessary to prepare and deliver individual (discrete) advertisements to subscribers 22 and their buddies 156. These functions have value to the national advertisers 151. The value is increased when a sale is ultimately achieved. The embodiments described above in connection with FIGS. 22 and 23 provide additional data if and when the "sales loop" is closed. All of the feedback and data points received from this network can be transmitted to the national advertisers in order to help them to construct future models to leverage these networks (including social networks) to boost sales, market share, and brand-name recognition. This "closing of the loop" is achieved when the subscriber 22 or buddy 154 purchases the advertised product and shows the Affinity Card ID or the Transactional ID Number (that was displayed on the TV screen), and one or both of these numbers are checked against either the targeted ad insertion system 158 or the ad system 150. The motivation for the subscriber 22 or buddies 154 to present this number to the retailer is the potential savings or discounts they may enjoy that is presented directly from the national advertiser 151.

A similar system may be used by local advertisers 162 in a distribution cluster. Local advertisers 162 can insert targeted advertisements by way of the targeted ad insertion system 158, display a Transactional ID Number on the TV screen, and then capture the Transactional ID Number (or Affinity card or smart card) at the point of sale in order to close the sales loop. The main difference between the loop with local advertisers and national advertisers is that local advertisers coordinate efforts through the distribution partner 25 and not the studio 20.

In FIG. 23, the retailers 164 are linked to the subscribers 22 and buddies 154 by way of an Affinity Card or a Transactional ID Number. Once a retail transaction is made, a retailer reports the transaction either through the distribution partner 25 to the national advertisers 151, or to the national advertiser 151 directly by way of a proxy 166, as illustrated in FIG. 23.

With the exception of the studio 20, ad system 150, national advertisers 151, retailer 164, meta-data 168, and the other distribution clusters 152A, 152B, and so on, all components, systems, and participants in FIG. 23 are considered to reside within a single distribution cluster 152. Multiple distribution clusters allow other subscribers and buddies connected to other distribution partners to participate in the system illustrated in FIG. 23. An example of how this might work is as follows: A subscriber using a Comcast cable network may have Buddies who are using a Time Warner network in another part of the country and even more Buddies using a Verizon mobile network. All of these participants may be provided with targeted advertisements and the opportunity to benefit from discounts offered by local or national advertisers by way of the various access network distribution clusters connected through the network system of FIG. 23.

In one embodiment, the method used for inserting targeted advertisements in content delivered using the content distribution network system described in the above embodiments is based on the standard referred to as SCTE 35 (Society of Cable Television Engineers). This standard defines ad insertion points within the broadcast video. SCTE 35 may allow for compatibility and compliance on the server-side of the network. The client-side of the network has its own unique methods as it is the goal to provide individualized advertisements at the STB level, rather than at the level of a discrete geographical region (as is common in conventional, non-individual targeted advertising schemes). Any suitable insertion system may be used for ad insertion, such as the Cherry Picker™ of Terayon, which follows the SCTE standards and can deliver targeted advertisements to discrete geographical areas.

Instead of having discrete uni-cast streams going to each STB, targeted ad insertion system 158 may use multicast streams that are directed to "N" number of Set-Top-Boxes. This could be one STB or a million, however multicast streams are used regardless. This allows for much more efficient scaling of the system without requiring large numbers of dedicated uni-cast streaming servers.

In one embodiment using a targeted ad insertion system as in FIG. 23, an input stream comes from satellite, tape, file server, or other source and is fed into an industry standard Clamping and Splicing server that defines locations for placement of targeted advertisements. This process is performed for inserting national advertisements. The same method may be used to insert local advertisements at distribution partner 25. Ad insertion is based on ad insertion cues which are present in the MPEG TS stream which is defined by SCTE 35.

The Clamping and Splicing server then sends the feed with the insertion points out to the network and the feed is eventually delivered to the STB of subscriber 22 (and/or other targeted subscribers). In the embodiment described above in connection with FIG. 23, instead of deploying regional servers that intercept and splice local commercials into a content stream, this system operates in a "pull model" where the STB detects the SCTE 35 ad cue and initiates an Internet Group Management Protocol (IGMP) join to the targeted ad insertion server address that corresponds to the advertisement already selected for that STB.

The ad insertion system 158 has at least one targeted ad insertion (TAS) server which receives the same broadcast stream as the STB, so that the timing of both the start of the broadcast from the targeted ad insertion server and the IGMP join (coming from the STB) can be synchronized. Before a TAS server initiates the broadcast of a targeted ad, it detects the SCTE 35 cue to know when to start broadcasting. The STB detects the same cue message and switches from its current broadcast channel to the channel the TAS is now broadcasting over (now showing the targeted ad).

The TAS server listens on all channels and transmits multiple commercials to different STBs. For example, if a single TAS server is listening to 100 channels and there are 10 different commercials for each of the 100 channels, and all 100 channels have commercials cued at the same time, in some situations the TAS server may need to begin streaming 1000 different targeted ads at once. This may be the extreme as targeted advertising is the exception rather than the rule. Most STBs (and other client devices) receive the normal advertisements in the current broadcast stream with only a defined subset receiving targeted advertisements, but the potential is there for this type of scaling problem. The number of concurrent ads that a single TAS server is authorized to serve may be limited, and the targeted ad insertion system may have numerous TAS servers so that the number of ads that are served by any one server at once may be reduced to a predetermined level.

The TAS server either ingests the content and meta-data files for the targeted ads, or the TAS links to an external server that already has these files ingested. In either scenario, the TAS has access to these files prior to the point where the TAS begins to "multi-cast" them over the network (for a particular channel at a given cue time). There may be a limited number of targeted ads available for a given channel's ad cue time slot. For example, if a subscriber is watching the Discovery Channel and TAS has ten targeted ads that are available for that time slot, it may begin broadcasting all ten ad spots at once. This mix of channels is communicated to the STB population so they know which ads are available during that particular time period and can then appropriately select the correct one to join.

This ad lineup information (or guide information) can be distributed to the STB population similar to the way a network security system "Key Server" distributes keys to a STB population. During STB initialization and periodically thereafter, the STB contacts a TAS "Ad Matrix Server" (A Server System located within targeted ad insertion system 158 of FIG. 23) and requests the ads and ad categories queued for each channel and each time slot. This can be an Extensible Mark-up Language (XML) or XML-like formatted data set that describes the ads, their attributes, and their position in the queue.

In one embodiment, the STB receives a small message (either in-band or out of band), that instructs the STB as to the correct ad to be presented when the appropriate cue appears. This small message is the result of analytics that are performed on the server side that predict the best possible ad for each target STB. This function is performed primarily by the "Ad Matrix Server". In an alternative embodiment, the client code in the STB uses information that was previously downloaded from the "Ad Matrix Server" (and temporarily stored within the STB) to determine which of the ads to present during the targeted ad period. In one case, the decision is made at the server-side and a message is sent to the STB. In the other case, the decision is made within the STB so no specific message needs to be sent from the server. In both cases, the "Ad Matrix Server" has the preference data and analytics that are used to determine which ads are the most relevant to the subscriber at that moment in time.

Commercials on TV are inserted seamlessly into the content stream at the head end and this can be performed on a frame boundary so there are no resulting artifacts. The STB is operating in pull mode in this embodiment, so it detects an IFrame and inserts the new stream after the IFrame or ad cue is detected. The STB can receive the ad cue 5-8 seconds prior to the ad insertion point in the stream. This is sufficient time for the STB to initiate the IGMP request to the TAS server to request the targeted ad.

As described above, an industry standard Clamping and Splicing server performs the ad insertion. Then the STB is made aware of the various ads being multi-cast and a message is generated that instructs the STB to perform an IGMP request to join one of the multicast streams so a specific targeted ad can be viewed on a specific STB.

Targeted ad insertion system 158 provides information to the Clamping and Splicing server in order to instruct it to insert ads that are relevant to one or more STBs found to be "in-use" on the network. The targeted ad insertion system 158 may also instruct the Clamping and Splicing server(s) to send a specific ad to a community of STBs.

The TAS 158 may be scaled up by adding more servers to the network. The scaling requirements may be determined by way of metrics such as: How many targeted advertisements to be served at (virtually) the same time to a given population of STBs (or other play-back devices). Other metrics may be considered as well.

Other types of advertising may be used in the content delivery network system described in the above embodiments. It is known for movies and television shows to allow for high profile product placements. One famous example of this is in the movie The Extra Terrestrial directed by Stephan Spielberg that prominently highlights the candy M&M's. Such product placements may be paid for by advertisers, providing them with the opportunity to have their products associated with the project and the projects can typically use the revenues derived from such product placements.

In the movie studio based content distribution network system described above, product placements may be used during production of the digital content such as a movie or TV show. A blue screen in an empty space within one or more scenes may be used to place products at the time the project is being edited. In this way, the decision regarding product placement can be made at a time after the initial filming.

Furthermore, blue screens can be left in the project after the editing process so products can be added at virtually any point in the distribution chain prior to delivery to the consumer. In one embodiment, the TAS 158 may also hold images (including 3D images) for a number of products. As per commands from the advertisers in conjunction with the distribution partners, the proper product can be woven into the content by placing the product image in the blue screen area.

In one possible example of this method, a subscriber may see a television show where a popular beer product is prominently displayed. The subscriber in the house next-door may see a television show where a different drink product including a different beer or a non-alcoholic beverage is used instead. Both subscribers see the same content, but see different products being promoted over the blue screen (as these products are placed as per the relevancy for each subscriber).

This same product placement process can be used for digital cinema as well. This way products that have a local relevance can be used rather than one international brand. For example, a US beer may be used as a beer to be inserted in the United States, however, a Japanese beer may be used as a beer to be inserted into the content when viewed in Japan. These product inserts can take place along the distribution chain and do not necessarily need to be woven into the content at the editing time.

In an alternative embodiment, a national advertiser 151 in FIG. 23 may wish to send an advertisement to the subscriber 22 and his buddies 154 that is longer than the time slot available. For an example, the time slot for a national advertisement may be 30 seconds. The national advertiser may, however, wish to show a commercial that is two or three minutes long. In this case, the system is programmed to automatically initiate an Auto-DVR (digital video recorder) session. This is where the television programming that is missed as a result of the longer ad is automatically saved on some type of storage device so the subscriber 22 and his buddies 154 may have the opportunity to view any lost television programming by selecting a designated button on a remote control device such as resume. The subscriber can then watch the program in its entirety from that point on.

The subscriber 22 and his buddies 154 may have the opportunity to purchase the items being advertised instantaneously. An example is as follows: A subscriber watches a commercial specifically produced to encourage a mountain biking enthusiast to buy a new, high-technology mountain bike. The subscriber is so highly encouraged to purchase the mountain bike that he uses one or more key presses of the remote control (or other communications device) to instruct the advertiser to bill the subscriber's account (or other payment mechanism such as a credit card or PayPal, etc.) and send the mountain bike directly to the Subscriber's home (or alternative address).

In this example of making an automatic purchase, the fulfillment is performed either directly by the service operator or by way of a third party entity empowered to purchase the product, ship it to the appropriate address and bill the service operator who then bills the subscriber (either on the monthly bill or on a separate invoice).

In one embodiment, if a subscriber purchases instantaneously or from a retail facility based on (at least in part) the exposure to a commercial, the national advertiser 151 may allow the subscriber an opportunity to be entered into a pool established to ultimately select one or more winners for a major prize. In addition to the pool, the national advertiser may also allow the subscriber to enter his or her name into a sort of lottery. This lottery then selects a winner from among a larger population of subscribers. At a certain point in time, a winner is selected. Since the winners are selected from multiple subscribers, the prizes may be larger than if the national advertiser opted to provide N number of prizes for N number of subscribers. Such prizes and or lotteries can be promoted by the national advertisers in targeted or system-wide advertisements.

In one embodiment, viewers may be prompted to answer questions about the content (or commercials) they are watching. By way of the network's middleware system, questions can be retrieved from a database and displayed on the subscriber's screen. The subscriber then has an opportunity to answer the questions. Such a question/answer scenario provides further evidence that the subscriber is watching the television program with no significant breaks. In one example, in the case where a subscriber answers one or more quiz questions correctly, the subscriber may be awarded with Frequent Flyer Miles (or other valuable offerings).

One way to accomplish the awarding of prizes to subscribers is to have them perform the equivalent of "scratching" a piece of paper in order to discern a series of numbers that were hidden from view. In one embodiment, the "scratching" process may be automated in such a way as to simulate the process on a television screen.

In the end, the subscriber is able to see the numbers that were assigned to him (or her) and the winning numbers. Either the subscriber can determine if he (or she) is a winner (so the appropriate awards can be claimed), or the television's middleware system can determine if the subscriber is a winner (or both). If the subscriber has been assigned numbers that constitute a winning combination (or an exact match), then a high value prize can be rewarded by the national advertiser 151, the distribution partner 25, or both.

Figure 24:
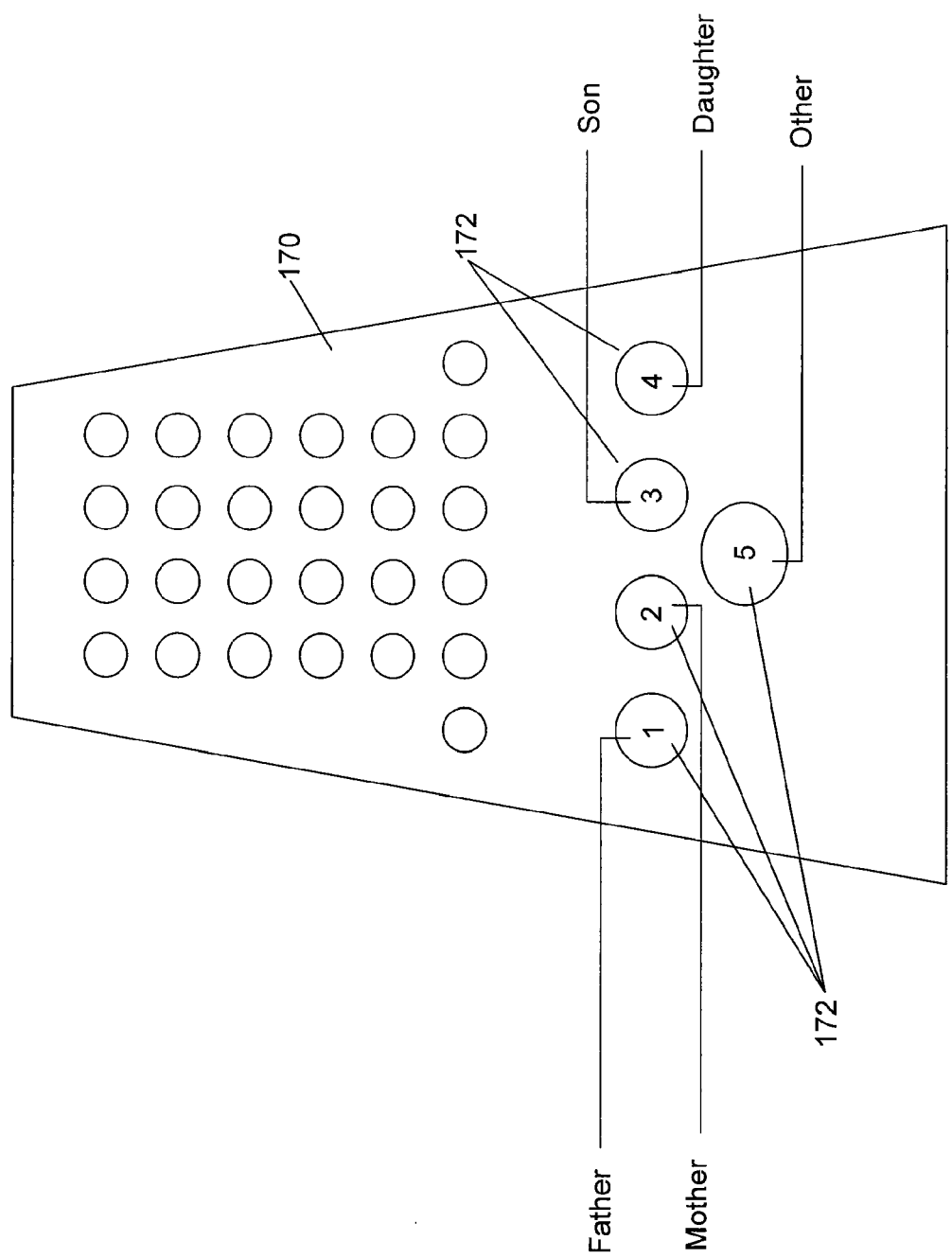
FIG. 24 illustrates a remote control unit with individual viewer buttons.

FIG. 24 illustrates an embodiment of a TV remote control 170 which may be provided to subscribers in the content distribution network system described in the above embodiments. The remote control 170 has the usual control buttons, but has additional buttons 172 labeled 1 to 5 (or any other unique identifiers) below the standard buttons. Each family or household member may have a number assigned to them (1-4) and another button is assigned to "other" (5). Although this figure represents an example only, it does represent a method that can be used to identify who is watching television (and is exposed to advertisements) at a given point in time. Multiple family members viewing a presentation may each press their buttons during the same period of time in order to express the fact that multiple family members are watching simultaneously.

In a setup process prior to the use of these buttons, each button is assigned to a person within the subscriber's domain. Along with each button assignment process, a family member profile can be provided by way of an on-screen questionnaire. When one or more of these buttons are pressed, then targeted advertisements can be made more relevant as a specific family member (or a subset of family members) can be targeted for the advertisements. In addition, prizes can be awarded and games can be played that are relevant to the viewer(s) and the advertisers, as described in more detail below.

The buttons 172 do not necessarily need to be assigned to family members. They can be assigned to business partners, friends, associates, and others. Family members are used as they are more likely to be found within the context of a Pay-TV service network than any other demographic. Additionally, although five buttons are shown in FIG. 24, remote controls with a greater or lesser number of buttons may be provided so that a remote control can be provided based on the number of household members.

In one embodiment using the remote control 170 of FIG. 24 by subscribers 22 in the system of FIG. 23, the TAS 158 provided by the distribution partner 25 (or Pay-TV Service Operator in this case) queries for the profile(s) for the subscriber(s) and family member(s) currently watching television content. This information is transmitted to the studio and the studio's own ad system 150. National advertisers may then deliver their custom designed advertisements that are intended to close a sale (as described above).

Another embodiment is to have the TAS 158 provided by the distribution partner 25 query the profile(s) for the subscriber(s) and family member(s) currently watching television content. This information can then be transmitted to the local advertisers so they can deliver their own custom designed advertisements (intended to close a sale) as well.

Still another embodiment is to allow different family members (or people watching television) to watch on different television sets throughout the subscriber's home (or facility). Therefore one person watching TV in one room could receive advertisements that are completely different from another person watching TV in another room. By pressing the buttons described in FIG. 24, family members (or others) can signal who they are and which television they are watching.

FIG. 24 describes a remote control unit with a number of buttons, each button representing a person watching TV at the present time. An alternative embodiment is a remote with a small screen (for example as illustrated in FIG. 21). In this case, the subscriber can simply respond to prompts that appear on the remote's screen 138.

In another embodiment, the remote control may be a pointing device that either points to objects on the TV screen, or there may be menus and prompts on a small screen within the remote control unit that can be navigated easily. By using such a pointing method, the user can select objects on the screen (either TV or small remote screen) and indicate the desired functions. If an alpha-numeric response is required, the screen can either prompt the subscribers to point to the various characters on the screen (using the pointing mechanisms) or there can be an alpha-numeric keyboard on the remote control as well. In either case, the remote control units may have far fewer discrete control keys. Examples of control keys which may be provided are:

Channel-Up
Channel-Down
Louder
Quieter
Pause
Rewind
Fast-Forward

In one embodiment, a subscriber, family member, business partner and otherwise may provide feedback and participate in engaging games based on the commercials that are sent to the subscriber's residence (or facility). These games may be played (in real time) as part of the commercial watching experience. For example, a large cola company may ask a subscriber to indicate which colas are "his or her" favorite. By using a remote control, the subscriber can play the game. The subscriber can then select a favorite cola from a list of the most popular colas currently available.

An alternative embodiment is to simply provide feedback on the commercial being viewed. For example, the subscriber may be asked to select whether the commercial was:

Engaging?
Not relevant?
Boring?
Insulting?
Otherwise?

If the subscriber indicates an interest in the commercial, it may be a good opportunity to prompt for an immediate purchase option by way of a, "Do you want to buy?" button. As this feedback (directly or through the use of games) is captured, it can be packaged in such a way as identities are not revealed, however, profile, preference, and event information can be transmitted to local or national advertisers.

As it is possible for the client software program from within a set-top-box to monitor usage information, it is possible to predict whether a subscriber is watching a television show or not. For example, if a subscriber has been changing channels at 9:00 pm for one minute and then stops on a discrete channel only to change channels again in exactly one hour's time, it would be highly likely the subscriber is watching that discrete channel. Therefore, an assumption can be made that the television is being viewed and it is not simply running without anyone watching. In this scenario (or other similar predictive scenarios), it may be possible to offer bonus points for a subscriber who simply watches the commercials (without changing channels, rewinding, or otherwise switching to another source of stimulus). If enough bonus points are collected by a subscriber, valuable prizes, rewards, discounts, and other can be offered.

Another embodiment is to simply capture data that indicates that the subscriber is either watching a particular channel or has already watched a particular channel in its entirety. By watching usage patterns that suggest there is definitely activity going on at the normal time breaks and by monitoring other metrics such as Mute-ON, Mute-OFF, Volume Higher, Volume Lower, etc. . . . it is possible to package this usage data and send it to the national advertisers, the studios, the local advertisers, and the distribution partners for their further investigation and analysis.

There are numerous other ways to determine if a subscriber is engaged in watching television, or if a television is simply "On" with nobody watching. The well-known company Tivo® with its set-top-box does a few things to capture this kind of information as follows:

1. The Tivo® set-top-box monitors for Infra Red (IR) codes from the remote control that are intended for the television set. The Tivo® STB may or may not respond to the IR codes, but receipt of such codes indicates that a subscriber is in the room at the moment.

2. The Tivo® STB may try to automatically change channels (as it is periodically searching for content that might be enjoyable to the subscriber). Before making such a channel change, the STB prompts the subscriber for approval. If the subscriber says, "No", then the Tivo® STB knows the subscriber is both in the room and fully engaged in watching the current television program. Such data points can be captured and used to make the assessment that the subscriber is in the room and engaged in watching the current program being displayed on the screen.

Given a networked system as described above, subscribers can have the option to send commercials to one another in the same way as email works today. If a subscriber sees a product by way of a commercial that might be relevant to the needs or desires of a friend (or associate), or if enjoyment can be derived from the commercial, the subscriber may wish to send it to a friend or associate. In one embodiment, a commercial may be sent to another subscriber by linking it to a buddy so the buddy can watch it using any of the scenarios below:

Transfer a Link (as in a URL) so it can be viewed using browser technologies;
Transfer encoded file to a Digital Video Recording device (DVR);
Transfer encoded file to the television screen in real-time (interrupting current programming);
Transferring encoded file with prompt to DVR or show immediately;
Transfer encoded file using a standard protocol such as SMTP or FTP;
Other methods to transfer an encoded file to another Subscriber or Buddy.

In addition, the receiving party (Subscriber or Buddy) also has the ability to forward the encoded file so such an advertisement can enjoy viral exposure. The middleware for the television service may facilitate the send and receive functions for the subscriber. Once a commercial is transmitted to another subscriber either on the same platform or on a different platform, the information is captured by the TAS Server on system 158 and this information is either transferred back to the local advertiser or the national advertiser.

Another embodiment is to allow a third party to aggregate commercials for the purpose of maximizing the advertising value of such a network for the national and local advertisers. In addition, such an aggregator can also add mechanisms, services and procedures that may help to close a sale.

In another embodiment, pictures may be scanned into a computer, rendered into 3 dimensional images, and then these images may be inserted into commercials (produced with placeholders to ultimately insert these images). An example is as follows: A family takes full body pictures of each member and has them scanned into the family PC. A software application program is then used to render each image into a 3 dimensional (3D) image using the correct scale and proportions (height, width, weight, etc). Such rendering by this software program yields 3D images that all look correct when combined together, and they can be altered in order to show each 3D image either standing, sitting, walking, swimming, and so on. Once these 3D images are created, an ingestion process can take place that appropriately stores (and indexes) these images along with the appropriate meta-data and additional tags (if any). As new commercials are produced, they can be authored in such a way as to allow for the 3D images of the family to be placed into the commercial in place of the actors (hired for the commercial). Therefore, all family members can be placed in a Sport Utility Vehicle as it is seen driving at the bottom of the Grand Canyon. Such an example of the subscriber watching himself and his family in the commercial itself can make commercial viewing more enjoyable and compelling.

Alternatively, the subscriber can download the commercial on to a long-term storage mechanism (such as a hard disc drive) and then insert images of friends and/or family members into the commercial as desired. This edited commercial (now containing still images, motion pictures, or both), can be transmitted to others using the following methods:

Peer-to-Peer sites
Community Web Sites such as MySpace or YouTube
Back to the studio 20 for possible broadcast sometime in the future
Subscriber's Web Site
DVD, Tape, CD, VCD, Flash Memory, or other memory storage device
Any other mechanism, system or device as desired by the consumer.

As advertisers differ from major studios in they want the maximum number of people to view their "brand" (whether these people pay for the motion picture product or not), the process of editing commercials for the purpose of allowing individuals or a community of people to insert their own expressions is a viable model and could become popular as people learn how to operate the various tools and tool sets for such a purpose.

In any of the above embodiments, one or more social networks such as MySpace.com may be connected in the network architecture as a studio 20. For example, a social network could be a source for content that has visibility to subscribers (on a distributor's network) and their buddies.

Similar to the example above in FIGS. 22 and 23 where a subscriber can use either an Affinity Card or a Transactional ID Number to receive a greater discount for an advertised product, social networks (such as MySpace and others) can use the Affinity Card or Transactional ID Number as well. The Affinity Card or Transactional ID Number for a studio comprising a social network may be handled in an on-line mode vs. a face-to-face transaction as would typically transpire in a retail facility. In an alternative embodiment, the Affinity card may have a magnetic strip that can be swiped in order to make the presentation of the card easier for the subscriber and the retailer during a face-to-face transaction.

Figure 25:
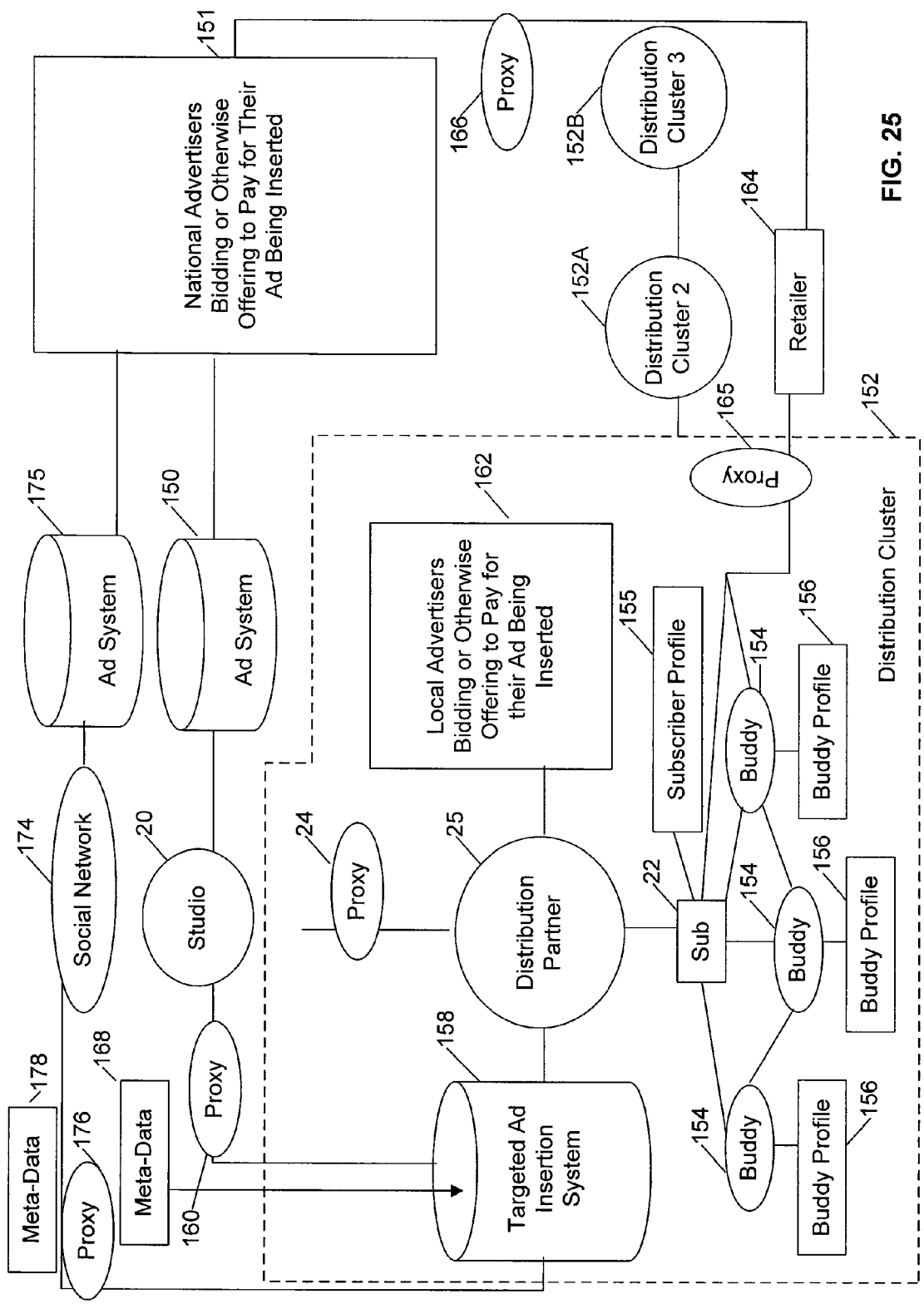
FIG. 25 illustrates a modified content distribution system with targeted advertisement insertion in which a movie studio is linked to one or more social networks.

FIG. 25 illustrates an embodiment in which one or more social networks are combined with content sources such as studios 20 in a content distribution network system similar to those described in the above embodiments. Some modules of the system of FIG. 25 are identical to the system of FIG. 23, and like reference numerals have been used for like modules as appropriate. One example of a social network is a mobile phone network. More complex examples of social networks are the popular MySpace® web site owned by NewsCorp, and other similar social networks. As shown in FIG. 25, a social network 174 is connected to an advertising system 175 which is also connected to a source of national advertisers 151, which may be the same source as used by the advertising system 150 of the studio 20, or a different source. The social network 174 also has its own proxy 176 to verify that no confidential (or private) information is sent to the social network or content source 174 (unless it is expressly provided by the subscriber him/herself). The social network 174 is connected to the studio 20 as the social network may be considered a potential retail outlet for the studio 20. Using this combination approach, the subscriber and his buddies may use the Internet and enjoy the social networks 174, and use the Affinity Card to purchase items at discounted rates. Such activity is reported back to the advertiser. The distribution partner 25 is then included in the sales loop as only the distribution partner 25 can make the linkage between the Affinity Card ID Number and the subscriber (since the subscriber's privacy is protected by the proxy systems).

Another approach is for the subscriber 22 and his buddies 154 to watch content from the distribution partner 25 and then purchase products from the social network 174. The entire eco-system provides the subscriber 22 and his buddies 154 with flexibility and the advertisers (local or national) with data for the delivery of valuable advertisements.

Similar to a bridal registry where a bride selects a retail store (or chain) and supplies information regarding the gifts she would like to receive, in another embodiment a shopping registry can also be created for potential (future) purchases in the network distribution system described above for example at studio 20 or at the distribution partner 25. Such a shopping registry allows a subscriber (or buddy) to select a retail chain and then select the items to be purchased at a later date. Once the subscriber or buddy visits the retail facility, a kiosk can be made available that serves as a reminder of the things that have been placed on the shopping list. In addition, all coupons or special offers (promotions and/or incentives) may be sent to a database within the retail facility so the purchased products are automatically priced with the discounts factored in. Such a Shopping Registry may work as follows:

- Subscribers have the ability to register their favorite retailers within the middleware systems of the Pay-TV service. These retailers can be local "brick and mortar" facilities, or they can be on-line retailers as well (such as Amazon.com).
- Subscribers have the ability to add items to the shopping list for that retailer by typing in the names and/or brands of the products they need or desire.
- In addition, when commercials appear on the TV screen, the subscribers have the opportunity to push a button on the remote control that adds the item to the shopping list.
- Once an item is added to the shopping list, the subscriber may be prompted to indicate "from which retail facility" if more than one retail facility is frequented by the subscriber.
- If a discount (or coupon) is being offered for the purchase of the advertised product, then the discount is automatically be included with the product added to the shopping list.
- As soon as items (and discounts) are added to the shopping list, this data is securely transmitted to the retail facilities frequented by the subscriber.
- When the subscribers come to the retail facilities, they can view and print their shopping lists using a kiosk that is provided by the retail facility.
- When the subscriber reaches the "check-out" stand and the purchased items are scanned into the check-out system, then all discounts are appropriately applied to the final price to be paid by the subscriber.
- Likewise, future returns of products from the subscriber back to the retailer take the discounts (if any) into consideration before determining the refund to be paid to the subscriber.
- If the retail facility is an on-line facility (such as Amazon.com), then the subscriber finds the pre-selected items are already placed in the electronic shopping cart (which can be left "as is" or removed). Likewise, all discounts and/or promotional incentives are appropriately applied at the time of the final "check-out".

Other methods can be used to fulfill a subscriber's desire to click on a product being advertised so that it appears within a "wish list" and/or a "shopping list". The "wish list" indicates products that would be nice to have (along with their promotional incentives and/or discounts). The "shopping list" indicates the products that are more necessary (along with their promotional incentives and/or discounts).

In the above embodiments, targeted advertisements based on subscriber profile information are placed into a content stream delivered over the distribution chain. In an alternative embodiment, emergency information can be sent in place of targeted advertisements. For example, if there is a hurricane that may be in the path of a specific neighborhood, then audio/video information may appear on the screens of the discrete subscribers (and their buddies), who live in that neighborhood. This audio/video information may either appear in a time slot dedicated for a commercial break, or the audio/video information may interrupt the broadcast or VOD session depending on the severity of the potential hazard.

No matter what type of client device is used by the subscribers and his buddies, a facility to identify the exact global coordinates of the client device can be used for numerous applications using the system described in the above embodiments. For example, a commercial may use the physical distance between the subscriber and his buddies in such a way as to make the commercial appear to be more engaging and interesting. Various client devices have global positioning system (GPS) capability today, and more GPS enabled devices may be available in the near future. Triangulation can also be used for mobile devices in a state-of-the-art cell networks to determine the physical location of a subscriber using triangulation means. GeoAuthentication is a process created by the company Verimatrix, Inc., located in San Diego, Calif. GeoAuthentication uses information in Digital Subscriber Line Access Multiplexer (DSLAM) systems in order to determine an exact physical address for a subscriber. Once the physical address is known, then the exact global coordinates can be determined. Such location identifying systems may be used in the content distribution network system of the above embodiments to locate subscriber positions for various purposes.

One possible application is to monitor the global position of children to make sure they are not too far away from home. If they wander too far (or in the wrong direction), then emergency information can be displayed on the television screen either immediately or during a commercial break.

Neural networks may be used in some embodiments to make artificially intelligent decisions using the empirical data that is passed from the subscriber and his buddies up-stream to the distribution partner, local advertisers, studios, and national advertisers. These neural networks may be used to further determine the usage patterns of television viewers and the likelihood of exposure and attraction to different types of television commercials, and the probability they may purchase the advertised product(s).

In another embodiment of a video or digital content distribution system as described above, a gateway on to the open Internet may be provided that effectively treats web pages in a similar fashion as the video content described above. This may allow people who do not have personal computers to use the set top box within the household to surf the web, while also receiving content over the movie studio based content distribution network system as described in connection with the above embodiments. In this embodiment, a top-level domain such as .STB is established. This is similar to ".com, .net, .tv, and others. In one embodiment, all web pages used within such a system end with the same domain suffix (such as .STB) in order for all pages, information and controls to work properly according to predefined specifications within a set-top-box.

This embodiment assumes that no matter whether people have PCs or not, or they have mobile devices or not, they often have a TV set and, most likely, they also have a set-top-box. This set-top-box then can be used as a client to enjoy web pages within a domain that follows rules and policies specifically established for the population of set-top-boxes around the world. In an alternative embodiment, the STB may even be part of the TV set.

In one example, an attempt is made to obtain ".STB" (dot-STB) as its own top-level domain. By having this ability to manage ".STB" domains, an effort can be made to verify that all product developers adhere to an established set of rules and polices specifically defined for the ".STB" domain. For example, it may be determined that all pages within the ".STB" domain are Java-based and a number of meta-tags (or other tags) exist that properly explain the contents that can be found within the web page. It is these meta-tags (or other tags) that are used to search or otherwise filter out the material contained on the web site. Therefore, all web pages used within such a system end with the ".STB" suffix in order for them to work properly within a set-top-box environment.

On the client-side, a library of code is provided that is programmed to properly operate and navigate through a fully operational implementation. Such a library of code (source code or executable code) is programmed to operate within the network framework of FIGS. 2 to 9 and function by way of system-defined APIs.

The ".STB" domain web pages and the client-side code libraries work together in order to present content from a public network (such as the Internet) directly to a television viewer watching a standard television unit and operating a standard remote control. Similar to the I-Mode mobile phones in Japan, developers may be provided with development specifications, APIs and guidelines that enable them to create web pages and associated content that can be offered to consumers over their TV set within the framework of the movie studio-based content distribution system described above.

An alternative embodiment to the ".STB" approach is to create and maintain a registry of domain names that are designed to operate within the frame work of the content distribution system of the previous embodiments. Developers may create customized web pages that work for television access networks. Such a registry can be organized and governed by the sharing of specifications, standards, APIs, and common protocols. As long as these are followed appropriately, the middleware systems for television-based access networks can render the information in such a way as to appear seamless to consumers. This can allow developers an opportunity to design and create numerous "walled-garden" applications. Another approach is to allow meta-tags in the content and allow the browser within the STB to grab these tags and prepare or otherwise format the content coming in to conform to the selected ".STB" conventions.

In some countries and states within countries, it is not possible to collect subscriber profile and purchasing information without the express permission of the subscriber. In addition, such a system as described above may be viewed as being an invasion of subscriber privacy and/or confidentiality unless the subscriber is pro-active in providing information to the network. Therefore, a pro-active approach to collecting profile, event, and purchase information may be provided in the system of the previous embodiments.

In such a pro-active system, subscribers may learn over time that they can receive relevant (tailored) advertisements if they "teach" the network about themselves and the things that are of particular interest. Since subscribers endure advertising within the television experience (as advertising underwrites the business model), they might as well create an environment that facilitates the delivery of advertisements that are relevant and interesting. It is envisioned that the majority of ads in such a system continue to be sent in more of a "shot-gun" style as these ads are designed to promote "brand awareness" over a very large population of subscribers. At the same time, custom (or tailored) ads can enrich the viewing experience as products being displayed are (at least in part) interesting to the potential subscribers.

In one embodiment of a pro-active system for gathering subscriber profile information, a profile entry and maintenance screen may appear on the subscriber device such as TV and prompt the subscriber for numerous relevant pieces of information that can be used to tailor advertisements. Examples of such information can be:
  Number of people in Family
  Ages of Family Members
  Number of cars in Family
  Favorite Sports Activities
  Favorite Restaurants
  Ideal Travel Experiences
  Ideal Leisure Experiences Such profile information is then saved either at the subscriber's client device or at the server side within the data center of the service operator. As described above, the various proxies keep private and confidential information away from entities outside of the service operator's network. It is only the service operator or distribution partner that can link the profile to a specific subscriber (as this is common practice for service operators today).

There may be a warning message indicating the subscriber fully understands this profile information may be used for the purposes of sending specific targeted advertisements in place of other shot-gun style ads. The subscriber then has an opportunity to either allow such information to filter up-stream for the purposes of receiving targeted advertising, or decline this up-stream data passing in order to prevent such targeted advertising to appear. After the subscriber makes a decision, a toggle switch is set for this subscriber. One setting of the switch is "allow relevant information to flow up-stream" and other setting is, "Do NOT allow relevant information to flow up-stream", where the term "up-stream" means from the subscriber's domain into the domain of the service operator, local advertiser(s), studio(s), and national advertiser(s).

In an alternative embodiment, the service operator is also able to overwrite the preference setting (that allows targeted ad insertion) to the "OFF" position so such a subscriber never saves subscriber-related information and targeted advertisements are not sent directly to the subscriber. A service operator is enabled to force such a condition on behalf of the subscriber should the subscriber require it from the service operator (as the subscriber does not want to experiment with middleware or switch setting on the Pay-TV service).

A further embodiment of the pro-active system described above is to allow the subscriber to indicate which types of activities and events can be captured for the purpose of sharing this information (by way of a proxy as described above) with a studio and/or potential advertisers. The subscribers are allowed to toggle a number of switch settings that relate to a specific types of events and/or activities. An example of a list of events and activities is as follows:

Shows being watched
Games being played
Content being recorded (DVR)
Orders for Video-on-Demand "plays"
Purchases made from Pay-TV service
Purchases made from retail stores
Orders for music
Connections made to communities (buddies)
Activities being performed within communities (buddies)
Participation in collective community events and activities
Purchases made from retail stores
Purchases made from web sites
Others.

Each of the items exemplified above may have an associated YES or NO button. If the subscriber indicates YES, then this information is provided to other entities on the network by way of the proxies mentioned above. If the subscriber indicates NO, then this information is not provided to other entities or captured in any way.

If a subscriber using the above list indicates that it is okay to record and transmit information regarding "Purchases made from retail stores" and/or "Purchases made from web sites", that information is captured and used for the ultimate purpose of providing a better experience for the consumer. Links between ads and the ultimate sales can be achieved by way of using credit, debit, affinity cards, coupons or otherwise. Links between ads and ultimate sales can also be provided by the subscriber directly (by responding to various prompts that are provided by the retailer after a purchase has been made). Links between ads and ultimate sales can additionally be provided by the deliberate networking of retail facilities to Pay-TV facilities using networking means (on-line or off-line).

Within the pro-active system described above, the subscriber may want to indicate that all adult activities are to be ignored. Therefore, even though a subscriber may have a proclivity to enjoy adult material, such a subscriber never sees any targeted advertisements with any reference to adult content. Such an indicator can be set by allowing the subscriber to toggle such a setting in one or more ways as follows:

Through the Pay-TV middleware system
Through a web portal provided by the Pay-TV service operator
Through a phone call from the subscriber to the Pay-TV service operator
Through other such means that convey this state for this switch setting.

Figure 26:
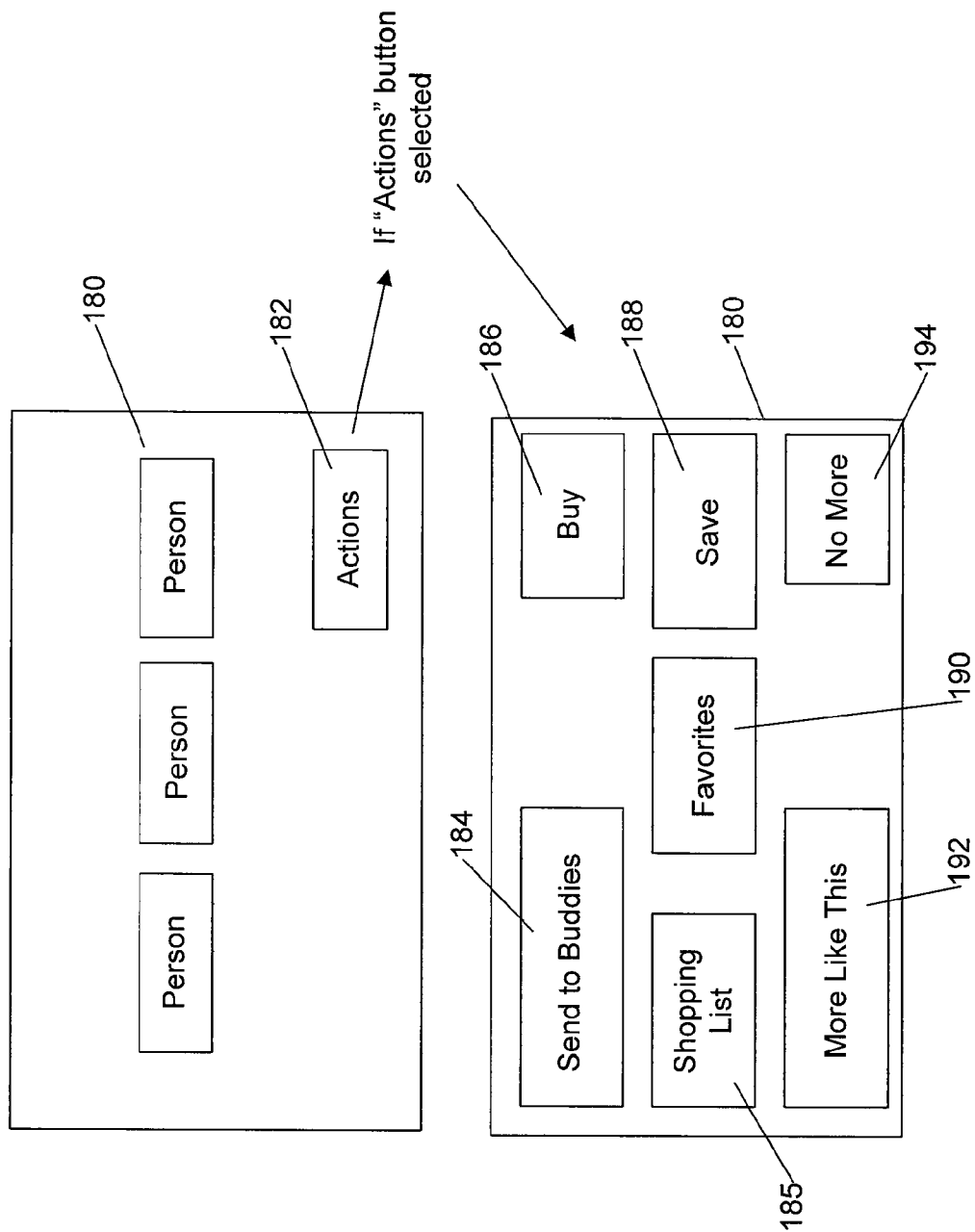
FIG. 26 illustrates an embodiment of an interactive advertisement system.

FIG. 26 illustrates one embodiment in which advanced functions and services are offered to the subscriber at the point when the subscriber is watching an advertisement inserted into content in the manner described in connection with the embodiments of a network distribution system described above. As illustrated at the top of FIG. 26, TV screen 180 displays an advertisement. If a user selects an "Actions" button 182, the TV screen shows a list of advanced functions and/or services that are currently available. By pressing a button on the remote control (or other consumer device), the offerings are made available to the subscriber so one (or more) can be selected. Below is a list of possible functions and services:

Send to Buddies 184
Add to Shopping Lists 185
Buy 186
Save (general) 188
Save for Mashups
Transfer to PC, Mobile or other device
Favorites 190
Available Discounts & Incentives
Additional Information
Cast your vote for the Advertisement
Send more advertisements like this 192
Send NO more advertisements like this 194
Others.

Figure 27:
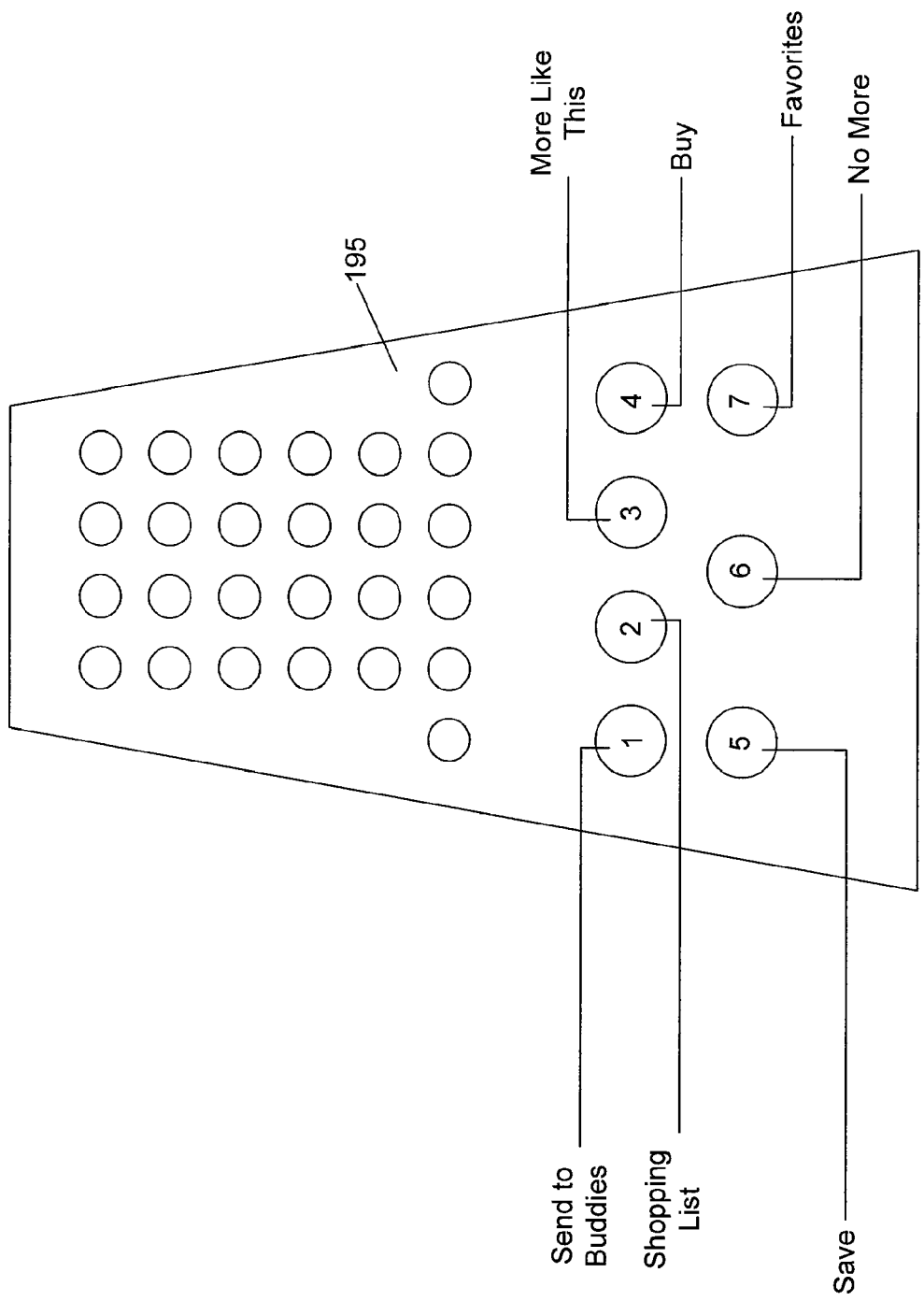
FIG. 27 illustrates a remote control unit for use with the system of FIG. 26.

FIG. 27 illustrates discrete buttons numbered 1 to 7 on a remote control 195. These buttons can be dedicated as illustrated to allow a subscriber to select one (or more) of the options listed above.

Figure 28:
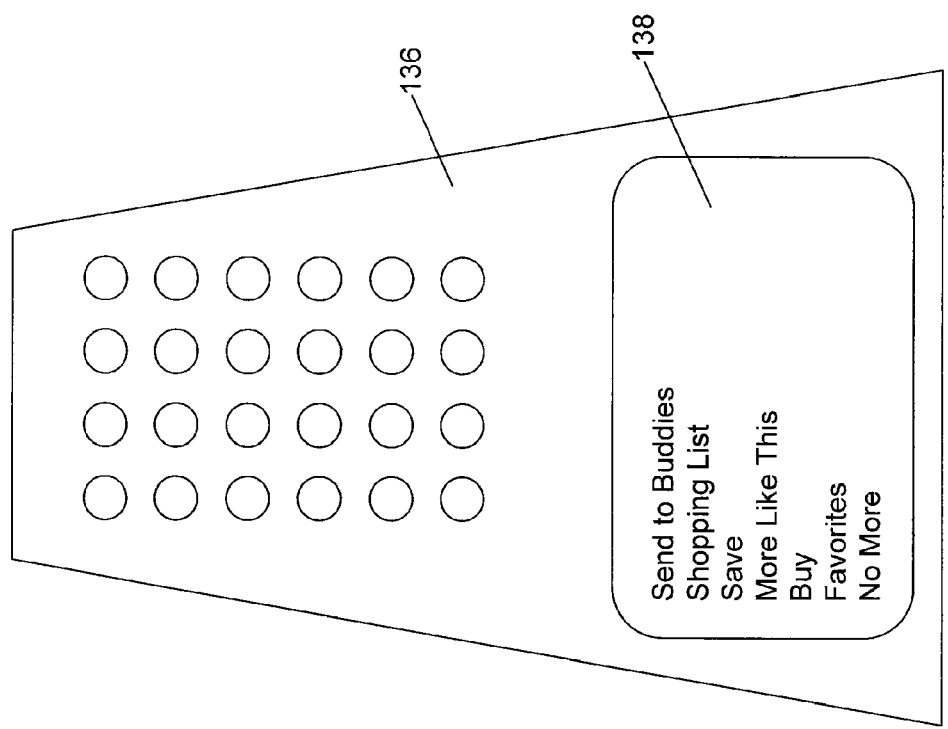
FIG. 28 illustrates an alternative remote control unit.

FIG. 28 shows an alternative embodiment that uses a remote control 136 with a small screen 138 as illustrated in FIG. 23. In this embodiment, the various options (as presented above) are listed on the small screen 138 that is built into the remote control.

Since the setup procedures and parameters can be somewhat complex for a normal subscriber, an alternative web portal can be made available that makes the task of programming the remote much simpler. When the consumer has completed configuring the remote's parameter settings, the parameters are transmitted to the remote (from the web portal) either by wireless means or by way of a fixed-line network connection. The subscriber can also use a software application program designed specifically for a media server (such as Microsoft's Media Server Edition), or the subscriber can use a browser from within the television set or the set-top-box instead of using an Internet-based web portal.

A further extension of such a web portal (initiated on either a PC or through the Pay-TV service), is an application where the subscriber can provide information about purchasing preferences and desires so there is little or no need to gather empirical data for the purposes of finding relevant advertisements. In such a case, the subscriber simply uses a web-based application program to answer numerous prompts designed to extract detailed information about the subscriber's preferences and desires. This information can then be used to send the best possible targeted advertisements to the subscriber.

Furthermore, the subscriber can include information about his or her buddies. The various buddies can then add information about themselves as well. In the end, the buddies are all able to link themselves together using such a web portal so the studios and advertisers all understand the buddy networks (communities) that exist. All of these functions can also be provided by either the Pay-TV middleware system and/or a web browser as provided by the Pay-TV middleware.

One method of collecting empirical data on subscriber preferences using a network distribution system as described above is overt or pro-active in so far as the subscriber is concerned. Such an overt approach allows the subscriber to provide preferences, usage information, community involvements, and other information to the distribution partner or service operator by way of on-line or off-line questionnaires. Examples of questionnaires are as follows:

On-Line questionnaires each with one or more prompts

Physical questionnaires mailed (or otherwise sent) to the subscriber

On-screen indicators (Yes, No, I Like, I Don't Like, More like this, etc.)

Other methods of taking direct responses from subscriber.

A second approach is to gather empirical data using a more covert approach. Such a covert approach gathers data points transparently and then transfers these data points to a system that then performs a series of analytic processes. Although such a covert approach may appear to be ominous to subscribers and possibly raise fears about "Big Brother", the system described above employs one or more proxies to protect the privacy and confidentiality of each subscriber on the network, while allowing the subscriber to receive a potentially more relevant and engaging media experience as a result.

Figure 29:
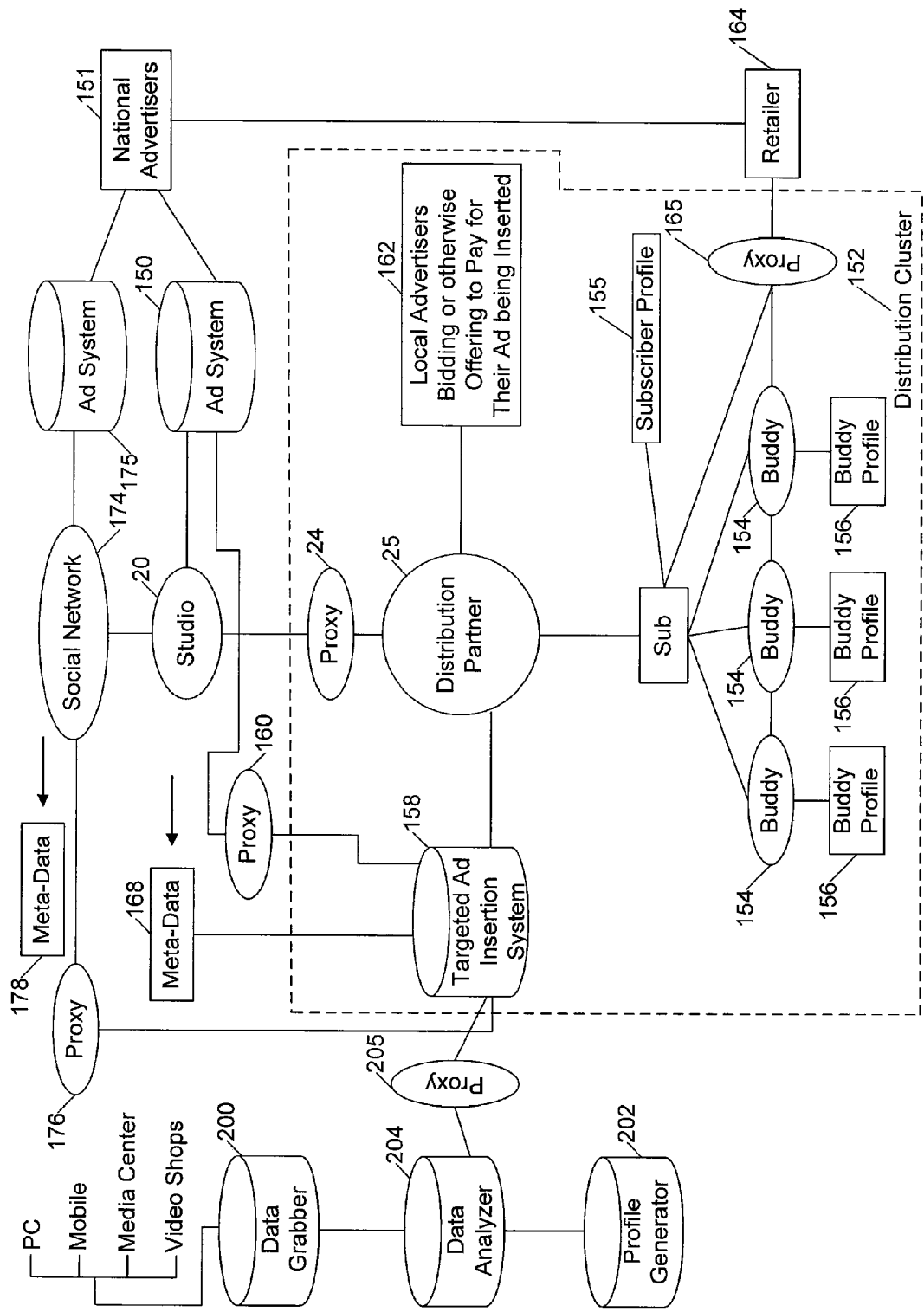
FIG. 29 illustrates a modification of the system of FIG. 25 which includes covert data collection.

FIG. 29 illustrates a modification of the embodiments of FIGS. 23 and 25 for inserting relevant targeted content in digital files directed to specific subscribers or groups of subscribers. Some modules in FIG. 29 are identical to those of FIGS. 23 and 25 and like reference numbers have been used for like components as appropriate. In FIG. 29, a data grabber module 200 and a profile generator module 202 are connected to a data analyzer module 204. Data analyzer module 204 is connected to the TAS system 158 of each distribution cluster 152 through proxy module 205. The data grabber, data analyzer, and profile generator modules or systems are used to capture as much empirical data as possible and begin to analyze this data in such a way as to be meaningful. In addition, steps can be taken to create natural "communities" given the results of the data analysis. These natural "communities" can be used to target advertisements or act as a conduit for people to "flock together". Such communities are based on the subscribers preferences for certain types of media offerings, experiences and events. The data analyzer and profile generator modules may be programmed to analyze data received by the data grabber module 200 and to create groups or communities of subscribers sorted according to various preferences. The generated subscriber profiles and subscriber community data is then provided to TAS system 158 through proxy 205.

The data grabber module 200 of FIG. 29 is designed to capture as much external data regarding the subscriber as possible. In one embodiment, the subscriber belongs to a Pay-TV service that offers broadband connectivity as well. By way of a "trusted" broadband provider, it may be possible for a subscriber to allow a cookie to be placed inside the subscriber's web browser program that captures on-line activities (PC, mobile, TV or otherwise). One way to install such a cookie is to attempt the installation covertly. If the installation is successful, then the cookie can begin to collect usage information from the PC and send this information to the data grabber module 200. If the subscriber has a firewall or other blocking mechanism, the Pay-TV operator may wish to provide instructions for the subscriber to install the cookie without interference from the firewall. In an alternate embodiment where the subscriber does not receive broadband services from the Pay-TV operator, the subscriber may still be provided with instructions regarding how to install the cookie; however, the level of "trust" may be significantly lower. In such a case, the subscriber may decline to install the cookie. If the cookie is properly installed, it captures usage data for the subscriber when he (or she) is on-line and sends this usage data to the data grabber module 200. If the cookie is not installed, then the data grabber module 200 is not able to collect data from on-line sources. In one embodiment, a small message is displayed on the screen of the subscriber's PC, TV or other device showing that a cookie has been installed, in addition to a short blurb explaining that the subscriber's potentially new and expanded media experience.

In addition to the cookie for a PC, an attempt may be made to place the same sort of cookie program into all of the subscriber's mobile devices. As mentioned above, it may be easier to place cookie programs if the subscriber feels a sense of "trust". Therefore it may be easier for a Pay-TV operator offering quadruple-play services (Broadband, Video, Voice over Internet Protocol or VoiP, and Mobile services) to place a cookie into the mobile phone. Once a similar cookie-type program is installed in the mobile device, it likewise captures usage information and sends this information to the data grabber module 200.

An attempt may also be made to install a software cookie into a home media center should the subscriber have one. Since a home media center is effectively a personal computer, the cookie is installed in much the same way that a cookie is installed in other PCs.

The data grabber module 200 of FIG. 29 may also receive empirical data regarding subscriber rentals and purchases of physical media using the system described in co-pending Provisional Application No. 60/863,925 filed Nov. 1, 2006 and entitled "Software Services (or Objects) loaded into Entertainment Media Servers to connect Local Video Shops", the contents of which are incorporated herein by reference.

Therefore, virtually all on-line transactions and even the physical media transactions (videos, games, music, etc.) can be captured and sent to the data grabber module 200. For the most part, data grabber module 200 is simply an ingestion point for a huge amount of empirical data coming from subscriber actions in regards to their media selections and play-out experiences. Although other processes may take place within the data grabber module 200, its primary purpose is to ingest data points so they can be formatted and moved on to other systems within the network. The system of FIG. 29 captures "channel change" information from each television set in the home or office.

If the home or office is using a set-top-box, then the "channel change" information can be captured from within the set-top-box. If the home or office is not using a set-top-box, then "channel change" information is captured directly from the television set.

In one embodiment of the system of FIG. 29, a Pay-TV security vendor (or conditional access vendor) may modify its client-side software code to monitor each channel that is changed and transmit this information back to the data grabber 200. One such Pay-TV security vendor is Verimatrix, Inc., based in San Diego, Calif. In this embodiment, the security vendor's client-side software code and server-side client code is modified so as to coordinate processes with each other. In one embodiment, the vendor's client-side software code receives the "channel change" information and then passes this information to the vendor's server-side software code which then passes it on to the data grabber module 200.

An alternative embodiment is for the middleware vendor or the video server vendor to use either their client-side software code or their server-side software code (or both) to obtain this "channel change" information and send it to data grabber module 200.

Data grabber module 200 may receive empirical data from one or more of the following sources:
  Personal computers
  Home Media Centers
  Mobile Devices
  Video Shops
  Other media devices.

In order for this "channel change" information to be meaningful, additional data points are coupled with the actual "channel change" information itself. Some of the data points are as follows:
  Previous Channel Number
  Current Channel Number
  Date and Time
  Length of time since last "channel change"
  Previous Channel Network Identifier (ABC, NBC, CBS, Fox, etc.)
  Current Channel Network Identified (ABC, NBC, CBS, Fox, etc.)
  Any other bits of meaningful information.

As described in detail earlier in this patent application, all data captured from a subscriber is passed through a proxy so the actual identity of the subscriber is never known past the point of the distribution partner. The only data points of interest are the habits and activities of the subscriber, an ID number that can be used to refer to the subscriber, and the possible "communities" that such a subscriber might naturally belong to. Any attempts to gather data to be passed to a data grabber (200) or other facility in the embodiment of FIG. 29 includes a pass through a proxy in order to remove any direct linkages between the subscriber's true identity and the subscriber's actions.

Data analyzer module 204 parses and organizes the incoming data in such a way that it can be meaningful to the various parties enjoying the benefits of such a network. It may also perform numerous analytical processes on the data captured by the data grabber module 200, and In one embodiment, the data analyzer module 204 is a database system that organizes the incoming data in such a way as it can be easily queried and compared against other data points. Parties enjoying the benefits of this networked system may immediately perform analytic processes on the data once it is received by data analyzer module 204. The data analyzer module takes requests from system operators to provide meaningful analyses of the captured data.

Once the data analyzer module 204 has completed the task of parsing and cataloging the various data points that it receives from the data grabber module, the profile generator module 202 scans the various data points in order to find profiles that are similar. The profile generator module 202 uses start-of-the-art techniques to organize and study the data captured in the data analyzer's database in order to group subscribers within the network who would be considered similar in terms of their likely response to a given targeted advertisement. In fact the groups created can be considered "communities" of their own as the analytics of such a system find people who are similar in their tastes, preferences, and tendencies.

Once these groups (or communities) are created by way of the profile generator module 202, national advertisers can then target advertisements to these larger groups rather than targeting individual subscribers. This capability provides advertisers with an economy of scale to deploy such a relevant targeted advertising system. It should be noted that geography or subscriber location plays little or no role whatsoever in the targeted advertising system as described above. The populations of subscribers who receive a specific targeted ad are all people who share a similar profile. Each subscriber may, in fact, live in a different geographical region. This is because they are grouped together due to "who they are" rather than "where they live".

Figure 30:
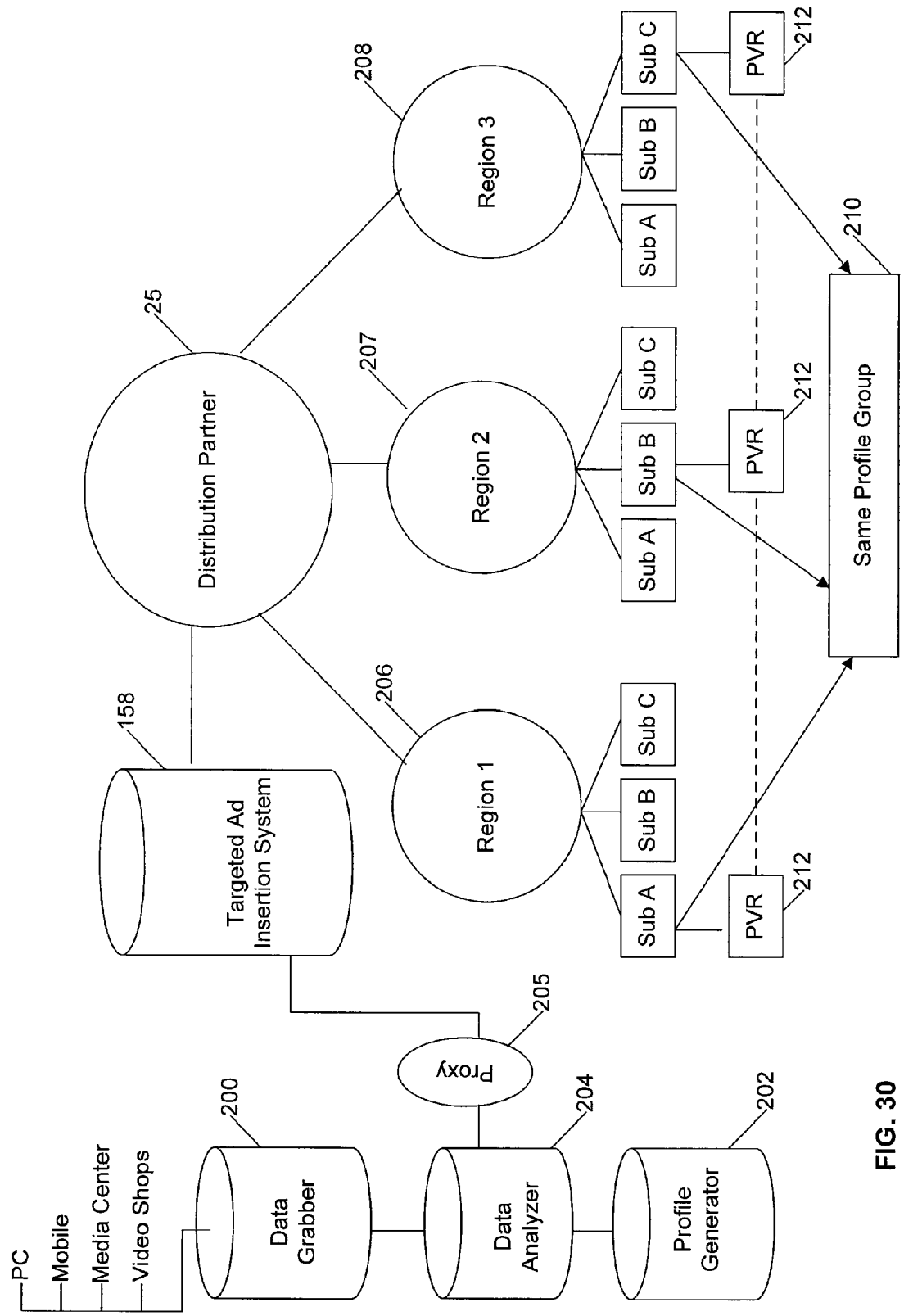
FIG. 30 illustrates use of the profile generator module of FIG. 25 to insert targeted advertisements in content provided to a selected profile group.

FIG. 30 is a block diagram illustrating the operation of the profile generator module 202 of FIG. 29, with other parts of the system not shown. In the system of FIGS. 29 and 30, the data grabber module 200 captures data points for all of the subscribers on a content distribution network, such as the network system illustrated in the previous embodiments. The data analyzer module 204 arranges the data points in a meaningful way. The profile generator module 202 then determines which subscriber's profiles are so similar they should be grouped together. Therefore, the granularity for such a targeted ad insertion system has the ability to discriminate subscribers identified for targeted ads.

In FIG. 30, three different geographical regions 206, 207 and 208 are illustrated. Each region has subscribers A, B, C, . . . and so on which are associated with a distribution partner 25 over an access network. Although these subscribers in different geographical regions are illustrated in a network with one distribution partner in FIG. 30, one or more of these geographical groups of subscribers may be associated with different distribution partners. Based on information received from the data analyzer module 204, profile generator module 202 has assigned subscriber A from the region 206, subscriber B from the region 207, and subscriber C from the region 208, to one profile or community group 210. In other words, profile generator module 202 has recognized that these particular subscribers share a common interest, based on data obtained on each subscriber from the data grabber module 200.

To take things one step further, it is possible for members of a profile group or community such as profile group 210 to share their personal video recorders (PVRs) 212, as illustrated by the dotted line 213 in FIG. 30, so each person in the defined profile group can view saved content material from other PVRs within the group. In one embodiment, a limit is placed on the number of PVRs that could be shared within a group since the Pay-TV operator may otherwise be exposed to legal actions from content owners such as movie studios. A reasonable number of PVRs might be 7 (or so). In addition, other policies and procedures may be to protect the content owners from misuse by people who may want to take advantage of such a system by making it viral.

In such a system where subscribers share PVRs, Digital Rights Management (DRM) schemes and/or watermarking technologies may also be employed in order to insure the rights of the content and the business models are maintained.

Social Networks such as MySpace® can be used to further enhance the capabilities of the relevant targeted ad insertion as described in connection with the above embodiments. In one embodiment, information may flow in two directions between Pay-TV networks and Social Networks as follows:
  From the Pay-TV service to the Social Network
  From the Social Network to the Pay-TV service.

In one embodiment, the subscriber makes the link between his or her Pay-TV service and his or her Social Network. This link may be performed overtly. Some examples of creating this link are:

Subscriber is presented with a prompt on the TV set allowing the entry of an ID or address of the subscriber's social networking address Subscriber is presented with a prompt on a Pay-TV web site (via a PC) allowing the entry of an ID or address of the subscriber's social networking address Subscriber is presented with a prompt on the Social Networks web site (via a PC) allowing the entry of an ID or address of the subscriber's Pay-TV service Subscriber is presented with a questionnaire (on-line or off-line) allowing the entry of ID numbers or addresses of both the subscriber's Pay-TV service and Social Network Subscriber can use a phone service or other means to verbally relate ID numbers or addresses of both the subscriber's Pay-TV service and Social Network to a qualified network operator Virtually any other means to overtly convey this Pay-TV and Social Network information so the proper linkage can be made In an alternate embodiment, cookies or other more concealed mechanisms can be used to covertly determine the ID numbers or addresses of both the subscriber's Pay-TV service and Social Network site.

Once the ID numbers and/or addresses of the subscriber's Pay-TV service and social network site are defined, then the following process take place. First, the Pay-TV service is provided with its own web address on the social network so it can communicate with other users on the social network. This can be accomplished using a one-time registration process where the Pay-TV service is treated like any other user. Next, for each subscriber wishing to link their Pay-TV service with their social network site, a "Friend" relationship is established according to the rules, procedures and policies of the social network. In most cases this requires one party to request the "Friend" relationship and the other party to accept the new "Friend". This may even be performed both ways (set-up a Pay-TV "Friend" and a "Friend" on the subscriber's social network site). In one embodiment, the Pay-TV's social network site requests the "Friend" relationship with the Subscriber's existing social network site. This process can be performed in an automated fashion (once the linking process described above is complete).

Using a targeted ad insertion system as described above, a targeted advertisement may be transferred to a subscriber's social network site and posted in an area that would be appropriate (such as the area named "Friends Comments" on the popular MySpace® network). This is accomplished by having the Pay-TV social network site post the advertisement to the subscriber's social network site acting as a "Friend".

As a "Friend" to the subscriber's social network site, the Pay-TV social network site monitors activities taking place on the subscriber's social network site periodically. Once adequate information is detected on the subscriber's social network site, this information is sent to the data grabber module 200 of FIGS. 29 and 30. In time, the subscriber begins to receive relevant ads that may have been selected due to information found on the social network site. Information found on a subscriber's social network site may often be a very strong indicator of such a subscriber's preferences, personality, and habits. Therefore, information found on social networks may factor strongly within the analytics for that subscriber.

In a typical advertising scenario, it is relatively expensive and possibly inefficient to target a huge base of subscribers for a targeted ad. If the advertiser knows that a target audience and the advertised product are both closely associated with another more focused product (such as a good wine for example), advertisements may be posted to people within a larger group who enjoy a very good wine. Using such a method could reduce the cost of the ads and possibly increase the per-impression value.

In a Digital Cinema (DCI) system, feature-length motion pictures are delivered to theaters in a digital format. Within the DCI specification, there is a requirement that information regarding content "Plays" be aggregated in such a way as they can be sent back to the studio for analysis. It is assumed the aggregation process is now working as specified and the thousand (or so) Digital Cinemas that exist world-wide today all have this capability. It is also assumed that any new Digital Cinemas have this capability as well. In such systems, the theaters tally the movie "plays" and inform the studios by paying them their fair share of the revenue.

The network distribution system described in the above embodiments may also collect, analyze, and process aggregated data coming back to the studio from any digital cinemas in the studio's network, which may be linked to the network system as illustrated in FIG. 10. Some of the data that can be captured and analyzed for the benefit of the studio in the digital cinema tracking module 221 is as follows:

Movie "Plays" within regions of the country

Movie "Plays" over the weekend

Movie "Plays" during the week

Movie "Plays" during the day

Movie "Plays" in one city vs. another

Movie "Plays" in one country vs. another

This data can be valuable to the studio when they decide which new projects to initiate ("Green Light"), which companies may be good targets for "Ad Placements", and which companies may be good for other forms of advertising and promotional campaigns. As movies and television are often seen as requiring advertising subsidies, any data which can help to capture new and additional advertising revenues may be helpful.

Similar to Digital Cinema movie "Plays" as described above, a studio in the content distribution network system described in the above embodiments may keep track of when targeted or customized advertisements were sent to subscribers and the likelihood that subscribers watched the advertisements. Although it may be impossible to know for sure if a subscriber actually watched a commercial, there are metrics available that can help to make a logical prediction. For example, if a subscriber was turning channels in a slow but steady fashion and then stopped at a program that had a few commercials and then began changing again, it would be logical that the subscriber saw the commercials, indicating that the subscriber was actively engaged and the commercial "played" during a time frame when the consumer was not changing channels. In any case, the studio in the embodiments described above may therefore gather and store information on which commercials were sent to subscribers, if there is a good chance they were "watched", and whether or not the subscriber purchased any products or services linked to the advertisements. This information may be provided in a report or a spreadsheet as follows:

Date: Feb. 1, 2007

Time: 6:55 pm

Targeted Ad: Buy New Ford Truck (#16235)

Probability Ad was Watched: 78%

Was Purchase Made: No

---

Date: Mar. 9, 2007

Time: 7:30 pm

Targeted Ad: Buy a Cookbook at Bookstore (#43216)

Probability Ad was Watched: 100%
Was Purchase Made: Yes
Was Coupon (or Card) Used: Yes Date: Apr. 3, 2007
Time: 3:30 pm
Targeted Ad: Go to McDonald's
Probability Ad was Watched: 31%
Was Purchase Made: No This type of data (and more) may be used to capture the interest and attention of advertisers looking for better performance metrics in order to maximize their investment.

E-Bay and other on-line services use an established reputation of a user today as a way to provide a certain level of comfort to people who are looking to transact business with others in a virtual world. Although television-based communities as described in the above embodiments do not necessarily suggest financial transactions, there is always the chance that people might be fooled regarding the character of the people with whom they are communicating in a defined profile group or community in the system. One example is a young girl may think she is talking to a peer when, in fact, she is talking to an old man. The system of the above embodiments may be modified to include additional members within the network architecture in order to provide a means for members of a community group to establish trust or "Reputation".

One company involved in providing "Reputation" is Opinity.com. Opinity offers network users the opportunity to provide opinions about other network users. By reading these opinions, a network user can gain a level of trust in an on-line relationship. No information or bad information may reflect badly on a user's reputation. Good reputation information coming from people who can be easily authenticated (and are in fact good themselves) can provide the needed level of comfort to everyone. In one embodiment of the network distribution system of the above embodiments, one or more of the many systems that provide "Reputation" information on network users is connected to the system in order to further enhance the community experience.

GeoAuthentication (as described above), is also a method that can be added within a networked community environment for the purpose of offering another layer of "Trust". Since a network user (by way of the Service Operator) can know the exact physical location of a buddy within the community, then it is much harder for crafty individuals to attempt to deceive or otherwise harm others within the community. As described above, community works best when there is "Trust." The GeoAuthentication technology or other GPS related technologies serves to enhance the level of trust by adding a biometric element, i.e. the address of the physical structure where the network user is currently occupying. Such a biometric test may also enhance the process of determining the network user's identity.

A guided search system may be provided to pay-TV subscribers in the network distribution system of any of the above embodiments. One embodiment of such a guided search system is an automated system that prompts the subscriber with Yes and No questions until the proper answers are found. Another example is a person who appears on a screen "live" asking relevant questions until the proper answers are found.

Another function that may be provided to consumers who purchase content originally produced by a movie studio or other content source in the systems described above is to provide a "Rights" locker 218 at the studio. The term "Rights" locker suggests that each consumer has their own storage area (similar to a locker in a gymnasium) and this storage area holds all of the content "Rights" that have been purchased from the studio or content source to date. This "Rights" locker may serve the consumer in following ways:

1. Allow the consumer the ability to play content from virtually any platform or device as the studio itself knows if the consumer has made the original purchase of the content and if this content should then be made available to the consumer upon demand.

2. Allow the consumer to re-download or stream the content upon request in the case a consumer has experienced unexpected loss or damage (or otherwise).

3. Allow the consumer to view the assets that have been licensed or purchased for his own informational needs. In such a case, the consumer may want to know which content titles have been purchased or licensed as this may help to answer accounting questions, or this information may simply be of interest to the consumer.

4. Allow consumers to move services from one provider to another without disruption.

5. Allow consumers to use multiple platforms or services seamlessly.

In one embodiment, the "Rights" locker simply logs information about a consumer's purchase into an appropriately configured database. An example of a database entry for a discrete consumer may be as follows:
Consumer ID: ABC 123
Consumer Name: John Doe
Address: 123 Street, San Diego, Calif. 92121
Phone Number: +1-619-111-2222
Alternative Address: (None)
Alternative Phone: (None)
Content Selections:
Desperate Housewives Episode 50
Television Show
DVD
Purchased
Dec. 1, 2007
James Bond goes to the Moon
Movie
VOD
Play (Licensed)
Dec. 2, 2007
Learn Japanese
Documentary
iPod Video
unlimited Play (Licensed)
Dec. 3, 2007
2007 Superbowl Game
Television Show
Television Broadcast
(Free to Air)
Jan. 30, 2008

When a "Rights" locker has been established at the studio level, consumers can gain access to information and request valuable services that provide them with greater customer satisfaction. The "Rights" locker may be accompanied by some type of (physical) security device or secret that would help to keep the information away from pirates, hackers, and/or looters. Such a security device or secret could be one of the following: Affinity Card; Password; Near Field technologies; Biometric; Trusted component on Player Device; Smart Card; GeoAuthentication means or methods (as described above); Public/Private Keys; Symmetric keys; Other cryptographic means; or other security means to accomplish the purpose.

One possible problem with the idea of a "Rights" locker is it needs to be maintained by the movie studio or content originator 20. This is due to the fact that the movie studio is the highest entity in the distribution supply chain of the embodiments described above. Therefore, the movie studio can help the consumer to move from one service provider to another while still maintaining the integrity and accuracy of the "Rights" locker. If the "Rights" locker was a service provided by the consumer's current service operator 25, then it is unknown what might happen should the consumer decide to switch services. The "Rights" locker information may be transferred to the new service operator, however, numerous problems and failures may exist. If the movie studio maintains the "Rights" locker, application program interfaces (APIs) may provided to allow the various service operators to gain access to the "Rights" information regarding the purchased (or licensed) content for a given consumer. This may be similar to the technique used by mobile phone operators to allow consumers to keep the same phone number after they switched from one service to another.

As new video platforms proliferate and studios create new models with which to distribute their valuable content, consumers often do not know the "Rights" associated with their purchased content. For example, can they use a Digital Video Recorder to record the Video on Demand (VOD) session that is currently taking place? Can they sell a recently downloaded MPEG file on EBay? Can they give an MPEG file they recently purchased over the Internet to a friend? It is not the specific answers to these questions that are important. Rather, it is simply the case that normal consumers do not know the answers to these relatively simple (often YES or NO) questions. The licensing terms, policies, and conditions are far too complex when a consumer is simply trying to watch a movie or play a song. In addition, new laws are constantly being introduced that may change (or otherwise influence) the consumer's "Rights" at any given moment in time. Therefore, the studio 20 described in the previous embodiments may also provide a service where a consumer can query for the "Rights" of virtually any content file (including the conditions for Play-Back), and the studio then provides the consumer with up-to-date information regarding the "Rights", policies, rules, restrictions, and other terms for the media asset being identified.

Movie and television studios typically have a great deal of information relating to the production of any piece of content. In the network distribution systems of the above embodiments, studios 50 may make this data available to subscribers for added enjoyment. For example, it is common for the studio to maintain the following information for their productions:
 Shot Lists
 Decision Changes
 Script Elements
 Notes
 Takes
 All types of Meta-Data
 Data files left over from editing (and other processing) machines (AVID)
 Other information.

By making this information available to subscribers, along with any or all necessary tools needed to understand and potentially leverage this information, subscribers can enjoy making new and different versions of the movies and television shows for added enjoyment. Subscribers may simply want to know how the movie or television show was produced. They may not necessarily want to alter the content. In addition, in some cases producers may not provide the "Rights" for the content to be altered in any way. In this case, the information provided to the subscriber may only be used to better understand the production process for such an asset.

Figure 31:
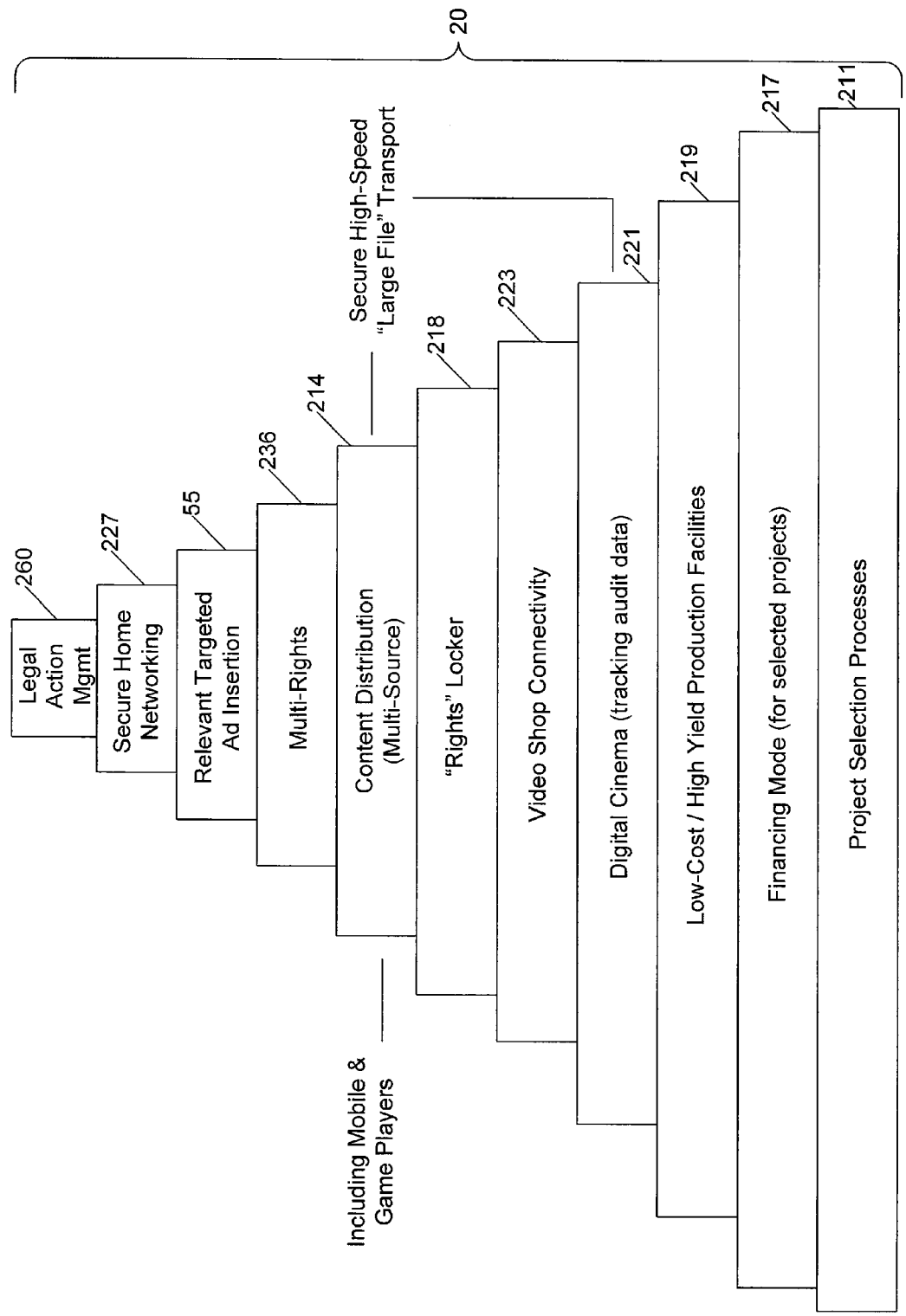
FIG. 31 illustrates a schematic pyramid block diagram of functions executed by one embodiment of a studio in the network systems of the previous embodiments.

FIG. 31 illustrates a number of functions that may be executed by a studio 20 in any of the preceding embodiments in the form of a pyramid. This list is not necessarily meant to be all encompassing, and other functions may also be provided by studio 20. The bottom of the pyramid is the function 211 of selecting projects to be made into movies. The next stage is a financing model 217 for obtaining or estimating funding or financing for the selected projects. In the next stage, a production facility 219 for the project is selected. A low-cost, high-yield facility such as a production on an Indian reservation may be selected for this purpose. In the next stage 221, the digital content files created for each production are stored, indexed and tracked by the studio for auditing purposes. Video shop connectivity 223 may also be provided for the files as indicated. The next stage is the digital rights locker 218 for subscribers as described above. In the next stage, content is distributed to requesting subscribers, distribution partners, and others over the network distribution system described in the above embodiments. The pyramid also included a multi-rights function (DRM) 236, relevant targeted ad insertion 55 as described above, secure home networking 227, and a legal action management function 260 which may be concerned with digital piracy or theft of digital content from the studio.

Figure 32:
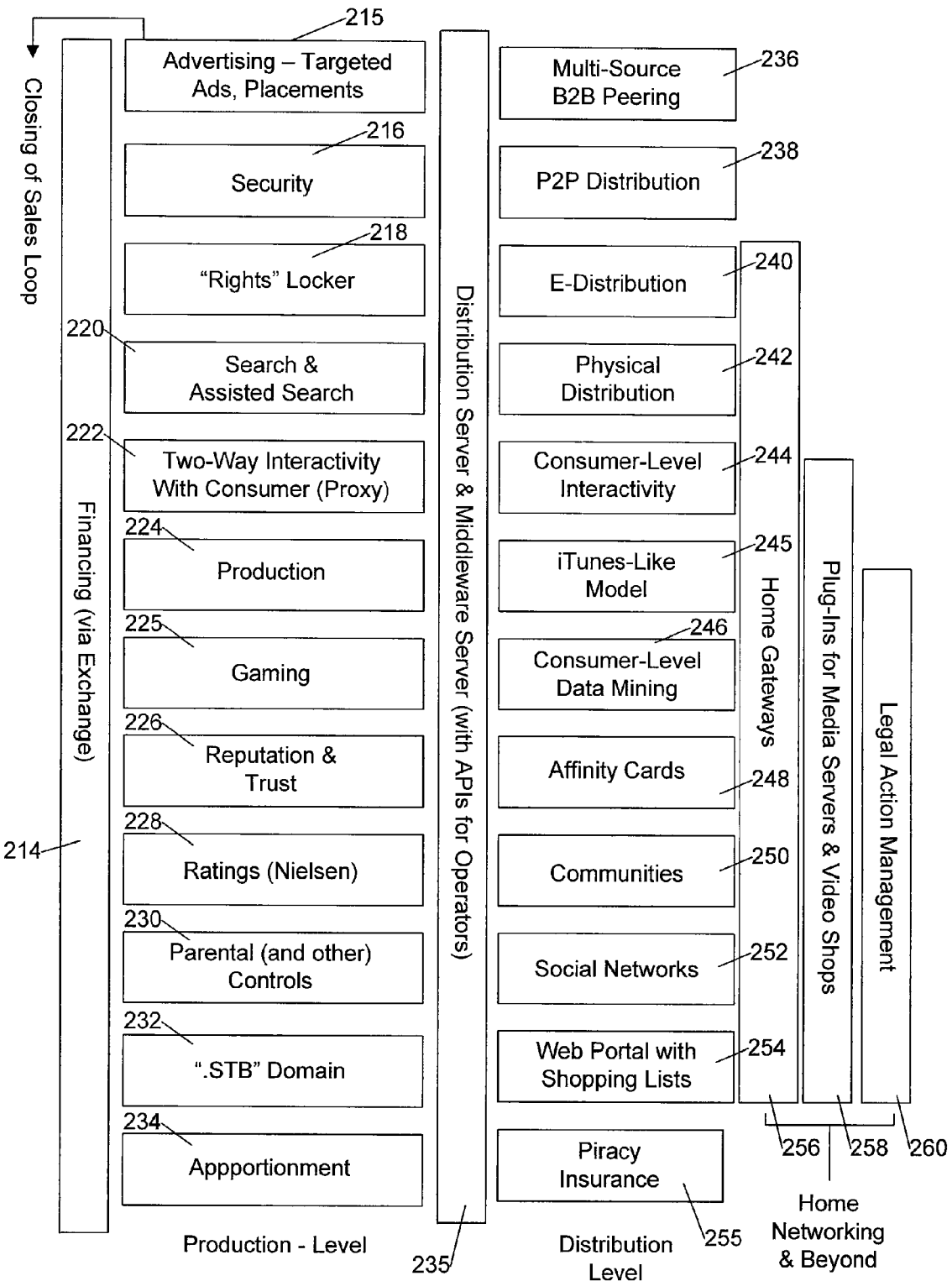
FIG. 32 is a block diagram of network functions in the network distribution system of any of the previous embodiments.

FIG. 32 illustrates the functions which may be provided in connection with creation and distribution of a digital content file in an embodiment of the network distribution system as illustrated in FIGS. 2 to 31. The network functions are illustrated in both columns and tiers. At the bottom of FIG. 32 is a financing model or platform 217 for motion picture financing. Any suitable financing platform may be used, such as a futures-based financing model as described below in connection with FIGS. 37 to 40.

On top of the financing platform are a number of columns that define operations at the production level for the studio. The various columns on top of the financing platform represent the following functions:
 Targeted, Relevant Advertising from the studio to an individual subscriber or community group of subscribers (55).
 Security (encryption, key-passing, cryptography, scrambling, obfuscation, watermarking, and others) (216)
 A manageable "Rights Locker" (as described above) for subscribers (218)
 Search & Assisted Search module (220)
 Two-way interactivity or communication channel with subscriber-level proxy (222)
 The production or digital content file to be distributed (224)
 Gaming (225)
 Reputation & Trust (helping consumers to identify parties at the other end of the network connection, as described above) (226)
 Ratings (228)
 Parental Controls (230)
 ".STB" domain (232)
 Apportionment (234)

The next level is the distribution server and middleware server layer or platform 235. On top of the distribution and middleware platform are a number of boxes that define the operations at the distribution level for the studio 20. The various boxes represent the following functions:
 Multi-Source (million channel network with B2B "peering") (236)
 Consumer or subscriber-level peer-to-peer distribution (238)

Various kinds of electronic distribution (CDs, DVDs, HD-DVD, BluRay, memorabilia, other types of products) (240)

Physical distribution means (of all kinds) (242)

Consumer-level Interactivity (voting, messaging, setting preferences, "Thumbs-up", "Thumbs-down", and others) (244)

iTunes®-Like Model (which may be a complete eco-system that runs independently) (245)

Consumer-level Data Mining (for relevant, targeted advertising insertion) (246)

Affinity Cards awarded to subscribers (like frequent-flyer or other awards points cards) (248)

Communities (250)

Social Networks (252)

Shopping Lists (by way of Web Portal) (254)

Piracy Insurance (255)

On top are the three platforms that define the functions of the system in a subscriber's home, as follows:

Home Gateway systems, technologies, solutions, API's and other (256)

Plug-ins for Media Servers & Local Video Shops (258)

Legal Action Management Systems that monitor and identify unauthorized leakage so the NGMS can monetize its assets to the highest degree possible (260).

In one embodiment, the security function 216 of FIG. 32 may employ both finger printing and watermarking technologies as part of studio's strategy to account for and protect its valuable assets once these assets are distributed. In a finger printing security system, a unique hash number (or otherwise a very large number) for each digital asset is created. This unique hash number can be calculated quickly and yields the name of the asset file (as well as other specific information accessed from a database entry where the hash number is the "Key"). An example of a finger print and how it can be useful is described below.

A peer-to-peer sharing site has a large number of digital files that are being downloaded constantly. A movie studio may want to see if any of these files belong to the studio and if there are any copyright violations. The problem is it may take too long for a person to download each file and then view each file in order to make a correct determination. In such a case, finger printing technology is a much more efficient solution. The movie studio 20 can download part or all of the files they believe are infringing and then run a software application program designed to generate the appropriate hash number. Once the hash number has been generated, this number can be checked against a database that uses the hash number as an index to the data fields containing the title name, the studio that owns most (if not all) of the "rights", and other information that might be useful. This process provides the studio with a vehicle for determining if violations were occurring on this peer-to-peer sharing site.

In an alternative embodiment, the studio can provide this finger printing software application program to the operators of such a peer-to-peer network (or other file sharing facility). This would allow the peer-to-peer network (or other file sharing facility) to check its own list of digital assets in order to find occurrences of copyright infringement.

Another benefit of finger printing is it allows for some market-viable applications at the consumer or subscriber level. For example, the studio may provide a small downloadable software program that a consumer can download on a PC, Mobile Device, STB, Media Center, or other terminal device. Once a hash number is generated for a specific digital asset, the consumer device can efficiently locate the necessary network resources that find and play the appropriate digital asset (using the hash number as the "Key" to the digital asset). Other value added services can also be offered from the studio once they can easily generate these types of hash numbers generated from properties within the digital assets themselves.

One application that may be offered to PCs, Mobile Devices, STBs, Media Centers and other terminal devices in one embodiment is called the "Shuffle Movie Trailers Application". This application creates (or otherwise gains access to) hash numbers created by way of a finger printing technology. These hash numbers are transmitted to the movie studio by way of an Internet connection. The movie studio then downloads the movie and/or television trailers for all of the digital assets found on the consumer's device. These trailers can additionally be shuffled in such a way as to insure the trailers are displayed randomly. The benefit to the subscriber is that they can see which motion picture titles are available on their terminal device. The consumer or subscriber can then select the title of interest and start watching by pressing the appropriate button during the play of a trailer.

Where finger printing (described above) is useful to efficiently determine the identity of a digital asset for the purpose of building relevant applications (security-related or non-security related), watermarking is different in that it is used to embed information directly into the file. The watermarking process is described above in connection with the encryption/security module 56 and VCAS server 58 of FIG. 6.

The movie studio 20 may have on-line and off-line systems that have the capability of detecting acts of digital looting and/or piracy in order to discourage people from engaging in further acts of piracy (the legal action management function in FIGS. 31 and 32). In one embodiment, legal action management is performed with the use of on-line, networked systems operating in conjunction with specialized software programs. These specialized software programs scan network sites looking for watermarked content and other evidences of content files located in unauthorized places. Once unauthorized content files are detected and verified, the software program(s) may take a number of actions such as:

1. Send a first notification to the unauthorized party
2. Send a notification to the studio
3. Send a notification to the appropriate law enforcement agency
4. Send a second notification to the unauthorized party
5. Send a second notification to the studio
6. Send a second notification to the appropriate law enforcement agency
7. Send other notifications as may be effective in preventing future problems
8. Other actions.

At some point, a human operator becomes involved. The operator may be an attorney (or paralegal) working to remove unauthorized content files from networked sites. The legal action management system may operate to locate and contact the people responsible for digital looting and/or piracy and send messages to these people to stop any further acts of digital looting and/or piracy. On-Line legal action management software systems and tools may also monitor network sites that are highly likely to engage in acts of digital piracy and apply the use of filter or network traffic "shapers" in order to further detect acts of digital looting and/or piracy of digital content files created by the movie studio 20.

Off-Line legal action systems may also be provided in the functions of movie studio 20. These off-line actions may utilize trained personnel to write emails, letters, notifications, blogs, newsletters, and other forms of written documentation intended to alert people to the studio's intent to prosecute when occurrences of digital piracy are found.

Off-Line legal actions can also include phone calls, VoIP calls, and person-to-person meetings or appearances that help to further spread the message that the studio does not tolerate acts of digital looting and/or piracy. Such actions may also be designed to show people where legal copies of valuable content can be found.

The apportionment function 234 of FIG. 32 represents a studio 20 providing partners, bankers, investors, key talent, and select employees with better visibility into the apportionment of their own back-end participation (if any). In years past, individuals who negotiated or otherwise earned a percentage of back-end participation for a motion picture project were often confused by the studio's accounting methods. In a the movie studio network distribution system of the above embodiments, such calculations may be much simpler with far better visibility and may be offered to personnel entitled to enjoy back-end participation (of any kind).

As illustrated in FIG. 32, a movie studio 20 in the above embodiments may also host a "Shopping List" service 254. With this service, subscribers (and other networked consumers) may place orders for the motion pictures they would like to either see on a "per-play" basis or own (such as an optic disc). Such a "Shopping List" service may show movie trailers to people making their lists so they have an idea as to the nature of the motion picture before they add it to their list.

Such a service can be expanded to allow a service operator to offer this shopping service as a "Walled Garden" application. The appropriate API's can be offered to such a service operator so the system works within the confines of the service operator's middleware system. At the same time, the service operator can place his own brand on this shopping service in order to present consistent branding impressions on the subscriber.

The movie studio 20 may also provide the ability for consumers to register their electronics devices and associate these electronic devices with both the consumer's terminal device, and the consumer's account number. By navigating through the middleware system on their terminal device, or by accessing a designated web site using an appropriate web browser, a consumer can create a unique ID for each electronics device. An example of such a unique ID for a consumer's electronics device may be as follows:

Device Type ID Number: ABC-001 (Apple iPod)
STB MAC Address: 123ABC
Customer Account Number: ROSSCOOPERACCOUNT The concatenated ID for this particular consumer device for this consumer's account is:

ABC-001123ABCROSSCOOPERACCOUNT

If the consumer attempts to play content on an unregistered terminal device (or an unregistered STB or PC), then the consumer needs to update his or her account accordingly so the content plays without any problems. Otherwise, the studio 20 assumes either the terminal device or the consumer is not authorized to play the content. Other techniques may alternatively be used by the movie studio 20 to register devices in order for content to play appropriately.

Within the movie studio-based network of the previous embodiments, a "Device Capabilities Profile" may be available. Such a "Device Capabilities Profile" contains a list of terminal devices and their capabilities. In one embodiment, a given terminal device and its capabilities can be found supported within the movie studio's database 54. An example is as follows: MP4 player from Atheros, which supports Windows Media DRM, H.264, and native MPEG4. The screen format is 320×240 QVGA, soundtrack is stereo, largest video file is less than 25 GB, connection is by USB or wireless, SD cards are supported, etc. This is assigned a device registry number of ABC-001. The movie studio can revoke content to that device or class of devices as needed, or limit the type of content available depending on the device's security scheme.

The movie studio 20 may also have a multi-rights system 236 for transcoding digital content files into the various Digital Rights Management (DRM) schemes of different consumer terminal devices according to the needs and specifications of the terminal devices being used in the field. FIGS. 33 to 36 illustrate one embodiment of a multi-rights system which may be provided at a studio 20 in order to transcode various digital assets into secured data packages. These data packages can then be "played" by consumers as long as these same consumers comply with the policies as defined within the DRM schemes.

The multi-rights system of FIGS. 33 to 36 may help to alleviate the problems associated with moving content from one terminal device to another having a different DRM system. Content files downloaded onto one manufacturer's playing device may often not be usable on devices of other manufacturers with a different DRM scheme. The multi-rights system as described below detects the DRM system that exists on the terminal device and transcodes the content file into the appropriate DRM system for that terminal device maintaining all of the necessary entitlements.

FIGS. 33 to 36 describe the processes that take place in the multi-rights system prior to the content being sent to the terminal device. In the end, the appropriate DRM system for the terminal device is determined. The digital asset file is then transcoded into the appropriate DRM system (if it is not already transcoded) maintaining all of the intended entitlements. Once the content reaches the terminal device, it is packaged to allow the consumer to enjoy the content and to protect the movie studio (and other content owners).

Figure 33:
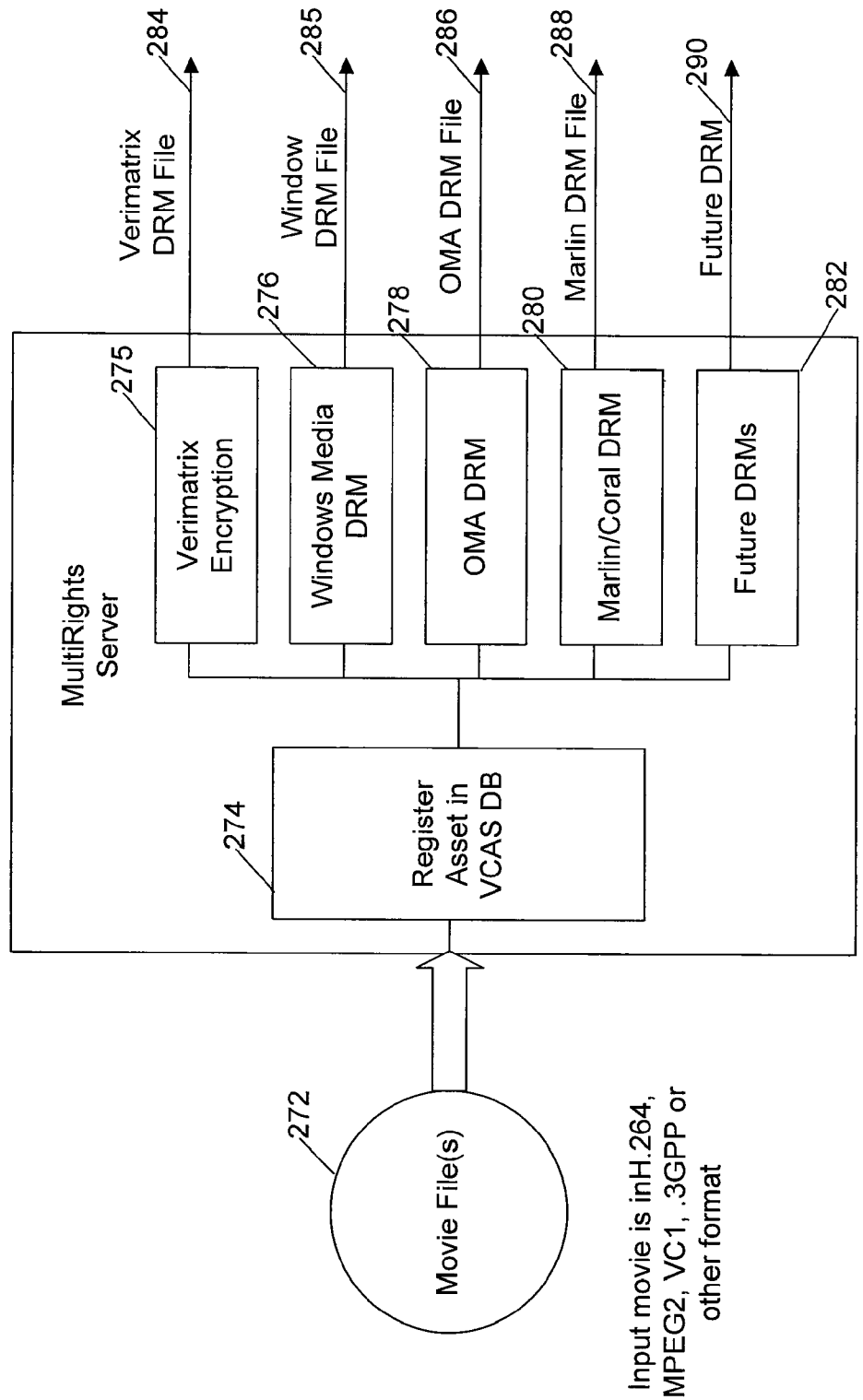
FIG. 33 is a block diagram of a multi-rights system which may be provided as part of a movie studio in any of the previous embodiments.

As illustrated in FIG. 33, a multi rights processor or server 270, which may be provided as part of the movie studio 20 of FIG. 6, is designed to ingest movie files 272. Ingested files are registered in a security server or CAS data base 274. The movie files 272 input to the system may be in various different formats, such as those listed in FIG. 33. Copies of the files are converted to various different DRM file formats in file conversion modules 275, 276, 278, 280, 282. For example, one module 275 may convert the movie file into an encrypted DRM file 284 using the VCAS encryption system of Verimatrix, Inc. located in San Diego, Calif. The second file conversion module 276 converts files into Windows DRM media files and the converted files are provided at output 285. A third conversion module 278 converts digital files into Open Mobile Alliance (OMA) DRM files provided at output 286. Conversion module 280 converts digital files into Marlin/Coral DRM files provided at output 288. Other conversion modules 282 may be provided with output 290 for other DRM format files.

Figure 34:
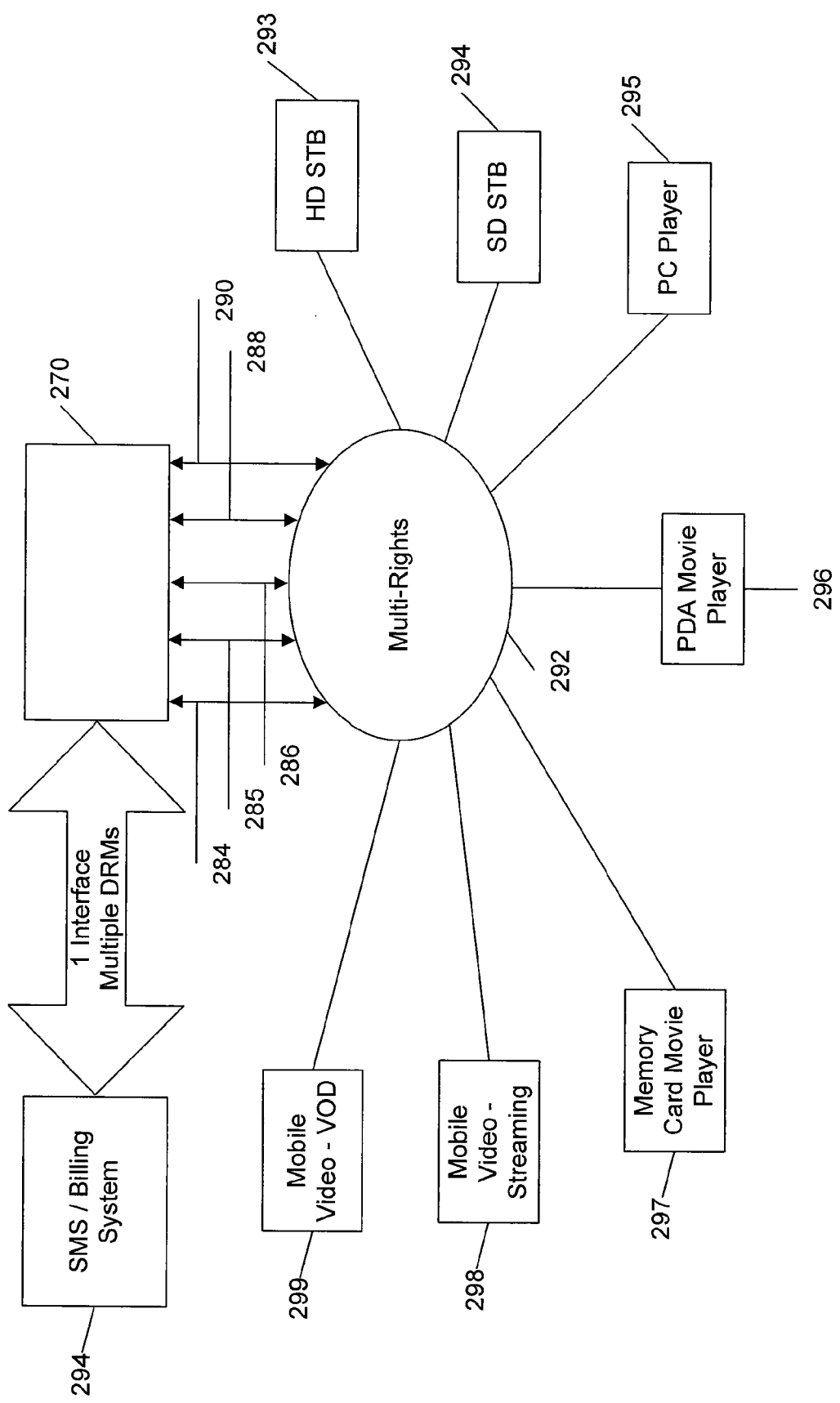
FIG. 34 is a block diagram illustrating operation of the multi-rights system of FIG. 33.

FIG. 34 is a schematic block diagram illustrating transfer of files in the various DRM formats to various different subscriber terminal devices. The various DRM outputs of multi-rights server 270 are provided to a multi-rights data base 292. When a copy of a digital file is requested for a particular terminal device, the appropriate DRM format file may be retrieved from data base 292 and provided to the terminal device. As illustrated in FIG. 34, the terminal devices may include a high definition set top box 293, a standard definition set top box 294, a personal computer 295, a personal digital assistant (PDA) movie player 296, a memory card movie player 297, a mobile device 298 receiving video streaming, and a mobile device 299 receiving VOD. A billing system 291 may also be associated with the multi rights server 270.

Figure 35:
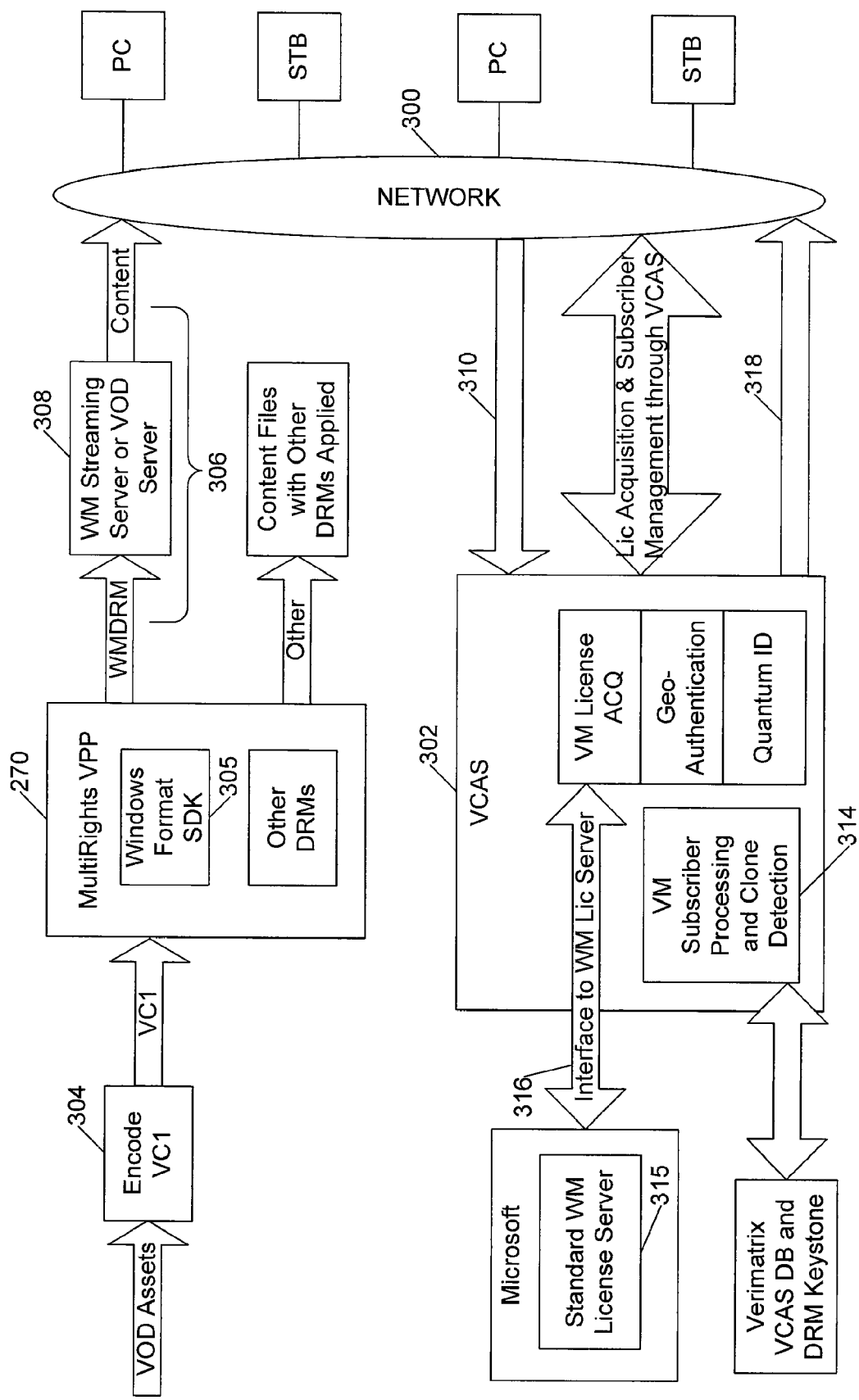
FIG. 35 is a flow diagram illustrating the steps in creating a Windows media digital rights management file in the system of FIG. 34.

FIGS. 35 and 36 illustrate the steps in creating a windows media (WM) DRM format file for delivery to terminal devices such as STBs or PCs over one or more networks 300. In FIG. 35, a content authority server 302 such as the video content authority server (VCAS) described above which is available from Verimatrix, Inc. of San Diego, Calif. is associated with the multi rights server 270 of FIG. 33. In the first step 304, a video content file is encoded with the VC-1 code. The multi-rights server 270 then applies WM DRM to the file via a Windows Media Software Design Kit (SDK) (step 305). Other digital rights management formats are also processed in this step. In the next step, the content is distributed to a WM DRM client or subscriber device over network 300 (step 306), using a WM streaming server or VOD server 308.

The subscriber or client device then contacts the VCAS server 302 in step 310 in order to process a client license request to enable the client device to decrypt the file. The VCAS server authenticates the client and performs a clone detection process and verifies entitlements in step 312, using a subscriber processing and clone detection module 314. If the client is entitled, the VCAS server passes a license key request to a Microsoft WM license server 315 (step 316). The VCAS then delivers the license to the client device (step 318). The WM DRM client in the client device then decrypts the WM DRM file and plays the content (step 320).

With the network distribution system as described in the above embodiments, various applications may be provided by a studio to the consumer or subscriber, such as:

Relevant Targeted Advertising Insertion
Long-Tail Content Distribution
"Rights" Locker
Powerful Search & Assisted Search Capabilities
Interaction (voting)
Gaming
Parental Controls
Social Networking
Peer Recommendations
"Trust" and "Reputation"
New Time-Shifting Applications (record and movie and receive a pristine DVD)
New Place-Shifting Applications (resolve territorial and other legal issues)
Other applications not listed above may also be provided.

In addition to supplying new applications as described above, a movie or TV studio 20 can begin to deploy new production methods and distribute additional data streams and downloads to consumers efficiently. For example, a football game may capture the feeds from all of the cameras and make each camera angle available for the consumer's enjoyment. Therefore, a consumer may wish to mimic the experience of being at the game by instructing his television system to maintain a constant feed from the camera located at the 50 Yard Line with no switching to be performed to any other camera. This may be too much data to be stored at the service provider's location, however, it can be stored with the movie studio and distributed to those who want it over a high-speed network.

In addition, multiple mixes of music can be aggregated and transferred to specific consumers for their added enjoyment. For example, a consumer may want to arrange his speakers to match the location of each musician within a music video. If he were to stand at one extreme end of his entertainment system, he would hear the musician at that end of the video screen. The music mix relevant to that physical position would be transferred directly to that speaker. If the consumer were to stand at the extreme other end of his home stereo system, he would hear a different mix with the musician located at that end being more pronounced. Once again, the movie studio 20 may send that particular mix to that particular service operator in a just-in-time basis in order for the consumer to enjoy the added benefits of this feature. If the consumer were to stand somewhere in the middle of his home stereo system, he might hear a perfectly balanced mix (due to the fact that the speakers playing their own streams are mixed by virtue of physical location of the consumer). These are more examples of how the system of the above embodiments may increase the service operator's offerings and increase the consumer's satisfaction.

Some things may be more suitably handled at the studio level rather than the level of a service operator. This is primarily due to the fact that consumers may use multiple services of different service operators or distribution partners. These services may have no visibility outside of their own domain. An example might be a consumer who uses Comcast as a Pay Television service provider, however, also uses iTunes for all music selections. Comcast has no visibility regarding the purchases of music and iTunes has no visibility into the purchases of video-on-demand selections. If both Comcast and iTunes were connected to a studio-based network, the studio could know about a consumer's taste in music and video-on-demand selections across both platforms. Therefore, peer recommendations for future media selections may be provided by a studio rather than from the service operator, as the studio has a superior vantage point. An analogy in the telephone company (Telco) world might be the ability to keep a telephone number when a consumer changes telephone services. This application handled one level above the service operator offers consumers significantly more choice and may enable numerous new and potentially lucrative applications.

In another embodiment, similar network architecture may be used for broadcast radio including Radio-on-Demand. Music videos continue to increase in popularity. Most or all music may soon available with an accompanying video (even if the video is comprised of a carousel of still images.), and music distribution may be handled more like video distribution (or broadcast television including Video-on-Demand or VOD).

By using wireless networking technologies such as WiMax (and others) in such a system may enjoy a personalized radio experiences comprised of unicast or multicast streams that transmit personalized content, services and applications such as relevant targeted ad insertion, peer recommendations, interactivity, device sync-ing, and others. In addition, consumers may have their own music files and playlists stored in such a way that they can access these files easily in order to enjoy the on-demand music experience as delivered by a high-speed wireless network.

Radio broadcast delivery in such a network environment is one possible alternative embodiment based on the movie studio based network distribution system described in the above embodiments, with the difference being the end-user experience mirrors the radio experience more than it mirrors the television viewing experience. In this embodiment, the movie studio 20 of the previous embodiments is replaced by a record label or record company, and the distribution partners 25 of the previous embodiments are IP radio stations.

In one embodiment, a broadcast radio network architecture may comprise a plurality of subscribers each using a PC connected to the Internet in order to securely upload their content, playlists, preferences, pictures, videos, lyrics, and other information to their own dedicated locker designed to be used by the IP Radio Station, which is equivalent to the movie studio 20 of the previous embodiments. Such personalized information can alternatively come from one or more of a subscriber's social networks (such as MySpace or others). When such a subscriber uses an IP-based radio or television device and selects the IP Radio Station, the subscriber may hear the news, weather reports, traffic updates, commercials and relevant commercials as is normal for radio, however, the music (during the music segments) may come from the consumer's own library of music (or playlists). In addition, relevant targeted advertisements and other services and applications as described in the above embodiment may also be provided to subscribers in such a system as well.

Some of these applications or services which may be provided to subscribers in this system are shuffle songs; arranging songs in order based on specific criteria; playing songs according to one or more playlists; receiving song recommendations from peers; receiving song recommendations from the IP Radio Station or content source; purchasing new songs or videos (or both); syncing one or more terminal devices with the consumer's media library; sharing music and videos with peers (securely); and other services and applications.

In an alternative embodiment, new broadcasting means and technologies designed specifically for mobile devices including Digital Video Broadcasting-Handheld (DVB-H) and the MediaFLO™ system created by Qualcomm, Inc. of San Diego, Calif. may be used to further increase the enjoyment of such a system for consumers. The MediaFlo™ or DVB-H mobile media broadcasting systems and services can allow a simultaneous third generation (3G) mobile connection to a wireless network for media to be transmitted to the consumer using either a unicast or a multicast model so the consumer can enjoy the combination of the mobile broadcasts and the user-specific media experiences as described above.

As illustrated in FIGS. 13 and 18, major studios may peer with one another in a network distribution system in order to share valuable resources and provide more choices for consumers. By allowing as few as six major studios to peer in order to offer valuable two-way applications to consumers, a large number of major Hollywood movies and television shows can be searched, viewed, stored, and shared globally.

In the foregoing embodiments, relevant targeted magazine may be created for consumers in a similar way as creating relevant targeted advertisements for insertion in digital content delivered to the consumer. Instead of advertisements arriving at specific points in time during the play of a motion picture, data that defines a page arrives at specific points in time as a consumer is performing a function such as the turning a page. Such a targeted magazine could be viewed on a standard television set. Alternatively, it could be displayed on a mobile device, PC, or even a tablet-style PC. These devices (other than the TV set) are more apt to be used by people when they have time to burn and they are not in a situation that offers them the luxury of watching a full size TV screen.

The studio 20 in any of the above embodiments may also implement a financing system for funding of projects accepted by the studio. One embodiment of such a financing system is illustrated in FIGS. 37 to 41. There are a number of capital markets world-wide focused on providing avenues for people (and corporations) to invest their money. In some cases there are entities that wish to invest in the production of motion picture projects for certain reasons. Reasons can be as follows:

Interest in a particular project
    Interest in a particular actor
    Interest in a particular studio
    Interest in a particular director
    Directive from entity (for political reasons)
    Enjoyment within the process of making motion pictures
    Strategic reasons
    For fun
    And many others . . .

Financial burden on the studio may be reduced if the studio makes its projects available to certain capital markets. Projects may be bundled into packages of motion pictures, or may be a single motion picture project only.

Figure 37:
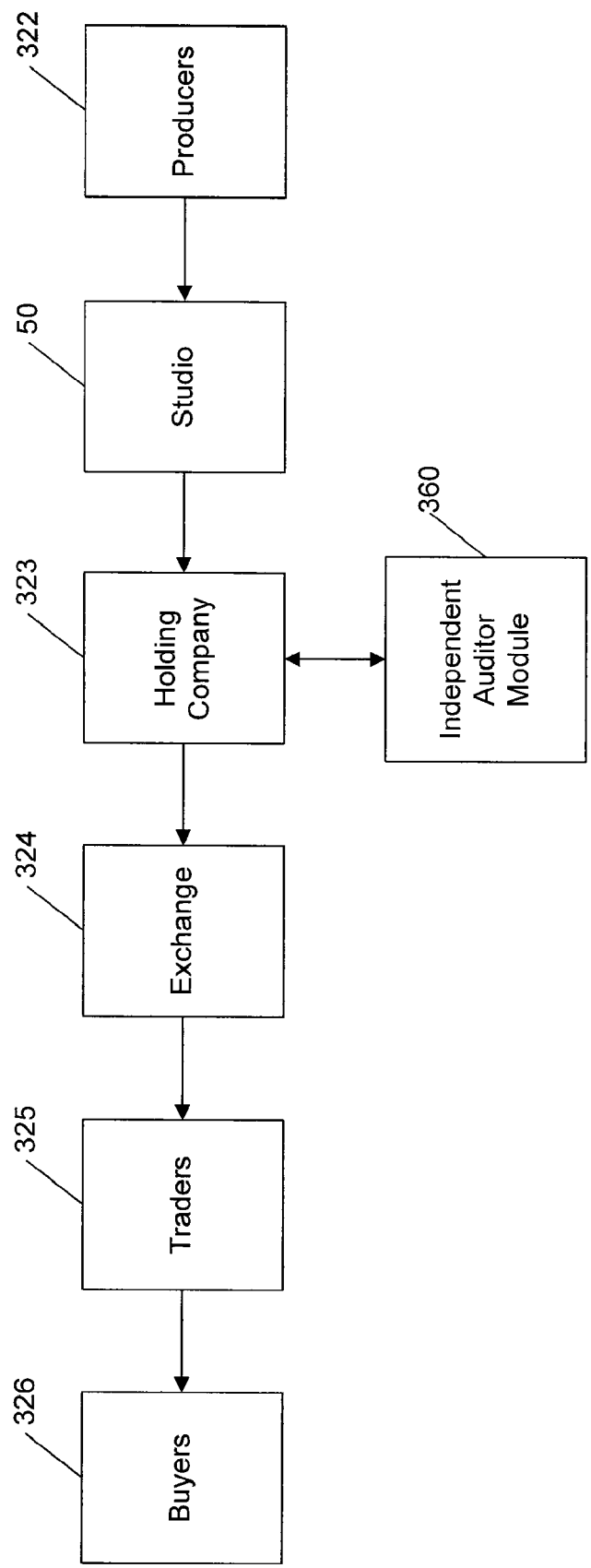
FIG. 37 is a block diagram of an embodiment of a financing system for funding of projects created under the direction of the studio in any of the preceding embodiments.

Once again, the need for a "proxy" arises. There needs to be a disinterested and "trusted" entity that can make projects available to capital markets and then allow for the legal and proper transfer of ownership of the project in exchange for cash (needed to finance the project). In FIG. 37, the holding company 323 acts as a proxy.

In one embodiment, the financial "exchange" through a proxy is separate from the "exchange" or proxy 24 between the content owner and the distribution partner (as described above in connection with FIG. 3). However, the financial and distribution proxy or exchange may be one and the same in an alternative embodiment.

In one embodiment, a financial "exchange" takes motion picture projects and make them similar to commodity trading opportunities. One way to do this is to create a "contract". Such a contract may comprise shares in a project that has the following components:

Script
    Business and marketing plan (including a plan for prints and advertising)
    Attached director
    Attached lead actors
    Distribution agreements (if any)
    Other important items (depending upon whether the project is a movie for broadcast television project).

An example can be as follows: A project looking to raise $10 million dollars may wish to issue a total of 10 million shares. A contract consists of 1000 shares each. Since the target amount is $10 million, each contract is worth $1000 (which represents a value of $1 per share). The project may have sufficient funding to begin production when 10,000 contracts are sold.

These contracts can be offered to virtually any potential investor. However, the investors may be professionals (rather than small investors). Since these contracts can be bought and sold like commodities, they can likewise be optioned as well. "Calls" and "Puts" along with numerous option strategies can be used similar to the world of commodity trading. If there is not enough money collected to fully finance the project, then the money is returned to all investors, or the money can be transferred to other contracts. At that time, the project is put on hold and may even be cancelled completely. If the project is fully financed, then the money is used for production, post-production, prints, advertising, and distribution costs. During the production and post-production process, contracts can still be traded or optioned. Once the project is released to the public, it is expected that trading of shares may increase. After the project has been provided to all of the major release windows (world-wide), the investors (who still own contracts) may be paid at an agreed exchange date according to the sum total of revenues generated from the project.

In the case of a Television episodic production (or similar), the revenues returned to the investors as profits are shared among those holding contracts. These revenues may potentially be received by the owners of contracts for a very long period of time.

The movie studio working with such a commodity-style financing "exchange" may receive a fee and a royalty for distributing the product. The movie studio may wish to trade "contracts" if indicators point to very strong reactions to its projects (one way or the other). A group named "Silver Screen Partners" was established years ago to act as a venture capital group for the purpose of funding movie projects. In one embodiment, a similar model may be used for a movie financing system for the movie studio or studios 20 in the network distribution system described in the above embodiments. Alternatively, such a financing system may be adopted by studios using other techniques to distribute media projects.

Such a financing mechanism can serve as advance promotion for the projects. The people trading these "contracts" have advance knowledge of the projects and they may be more inclined to watch them once they are available for public consumption. With this system, people within the distribution supply chain may have the necessary liquidity and the ability to hedge their bets. Traders outside of the distribution supply chain may also have the ability to profit from their predictions (based on volatility).

There are many similarities to the movie futures financing system illustrated in FIGS. 37 to 41 and commodities-style trading. The description below outlines the steps in commodities trading using grain futures:

1. Farmer grows wheat
2. Farmer sells future crop to Grain Elevator
3. Grain Elevator "Hedges" against price fluctuations between purchase date and the date of delivery
4. Wheat gets delivered
6. Grain Elevator is restored financially (as "Hedged" positions provide adequate insurance against price fluctuations)
7. Grain Elevator profits from fees that were assessed during the process A narrative for the example above is as follows: The farmer prepares for his spring wheat crop. It is easy to understand that the farmer has no crop unless he can leverage the "future" benefit of his crop so he can pay his immediate bills. In fact, the farmer not only needs to feed himself and his family, he should buy seed, fuel, machinery, and employ labor to help him to farm the crop to a point where it is ready for market. The farmer knows he can strike one of two deals with the local Grain Elevator as follows: The Grain Elevator can purchase his entire harvest immediately, or the Grain Elevator can guarantee the purchase of his entire harvest in such a way as the farmer can go to his local bank and get a bank loan using the Grain Elevator's guarantee as collateral. In either scenario, the farmer has adequate access to cash so he can perform his farming functions and he can bring a valuable crop to market.

Once the Grain Elevator has made a deal with the farmer, the Grain Elevator sells the "Futures" he owns and controls on an open exchange (like the Chicago Board of Trade or similar). Since the wheat has not been delivered, the Grain Elevator does not receive any cash. The Elevator simply has a guarantee that a buyer has stepped-up and guaranteed to purchase the "Futures" once they arrive at the designated market for a designated price.

The Grain Elevator then moves to "Hedge" its position against any price fluctuations (should there be any). The Grain Elevator does this by appropriately buying or selling contracts (or options on contracts) as is necessary to be appropriately "Hedged". Therefore, if the price should go up or down, then the Grain Elevator profits from the financial vehicles that are in place that allow it to "Hedge" the bet on the farmer's future delivery.

The difficulty in this scenario is when the price for wheat goes up. Since grains on exchanges are typically settled on a cash basis at the end of each day, the Grain Elevator may be in a position to wire cash funds directly to the Exchange by the end of the working day. This is because the Grain Elevator's position as being "Short" in the market is now compromised because the pricing is increasing in an opposite direction. For a Grain Elevator, this is an everyday situation that is considered to be common. The Grain Elevator wire transfers the necessary funds knowing full well that the wheat "Futures" from the farmer yield the exact same cash benefit to the Grain Elevator upon settlement. Therefore, the Grain Elevator is not be left with any losses as price fluctuation is "Hedged" and price differences are settled at the expiration date of the "Futures Contract". The only issue for the Grain Elevator was the function of acting as a bank when the prices moved against the "Short" position. Even though any and all bank-style loans from the Grain Elevator are eventually retired, there is a cost of loaning money and a cost in valuable time and resources that should be shouldered by the Grain Elevator. These costs are then transferred to the farmer within the guidelines of the current "deal" that was struck, or it is taken into consideration during the next "deal" between the Grain Elevator and the Farmer.

A similar scenario may be used in financing production of motion pictures, with the movie producer being equivalent to the farmer in the previous example, and the movie studio 20 being equivalent to the grain elevator. The basic steps in the financing method are as follows:

1. Producer sells Media Project to movie studio.
2. Producer sells project "Futures" on an open Exchange.
3. Movie studio "Hedges" against price fluctuations.
4. Motion Picture project is delivered.
5. Movie studio is fully restored financially.
6. Movie studio profits from fees that were assessed during the process.

Using the scenario presented above where the farmer sells to the Grain Elevator and the Grain Elevator "Hedges" and conducts the necessary procedures to manipulate cash as is necessary, the producer is responsible to create the product and the movie studio is responsible for the financial dealings with the exchange. In an alternative embodiment, as illustrated in FIG. 37, the movie studio engages a holding company 323 to engage in financial dealings with the exchange. In the illustrated embodiment, the holding company 323 acts as a grain elevator would act for a farmer, as described in more detail below.

The commodities trading model for grain is different for that for movies, television shows, and similar entertainment productions or media projects. The difference in the two models resides in the fact that media projects have a life after consumption. After the theatrical release of a movie, for example, the residuals from the same movie can be enjoyed for extended periods of time, possibly decades or longer. Therefore, these residuals can be offered to a number of important entities in order for them to have adequate incentives to involve themselves in the process. Some of these entities are (but are not limited to):

The Exchange
Producer(s)
The Director
The Talent
The Market-Maker
The movie studio
The Bank
Advertisers
The Clearinghouse
Others as is necessary.

A standard commodities contract for pigs, cotton, gold, crude, and all other typically traded commodities experience 100% consumption by the ultimate buyer. In the commodities-style trading system and method for media projects as described herein, a percentage of the royalties from these media projects can also be offered to the entities involved in the process in order to provide them with adequate incentive to become involved. Residuals and royalties from media projects are considered to be highly lucrative, particularly when it comes to big-budget projects. It is common for the value of a movie in a large library to be worth $20 million or more based on its ability to generate on-going residual revenues.

The movie studio 20 may additionally avail itself with new insurance models to protect itself from production-related problems. For example, if the production is delayed and a remedy to the damage is required, the movie studio may handle the problem from the proceeds of its insurance policy (or policies). For example, if the production process experiences unacceptable delays, the movie studio may use cash collected from the insurance policies to pay the people who consider themselves to be harmed. Insurance policies may also be used to cover unforeseen financial problems that might arise for the movie studio as well. The holding company may also acquire insurance to insure itself against serious production-related problems.

New analysis and reporting techniques can be used to further assist potential traders in the media project trading system of this embodiment, different from the analyzing and reporting of traditional commodities. For example, movie or TV "trailers" can be filmed first so they can be provided to potential traders very early on. These "trailers" allow potential traders to make their prediction of the success of the media project. Press releases can also be provided on a routine basis to report on the state of production including critical reviews and the current demand for content within the international media exhibition community.

In addition to studios and buyers having a reason to hedge, advertisers also have their own reasons to hedge. An advertiser may decide to pay a large amount of money for a product placement in a certain movie. As long as this movie experiences reasonable success in the box office (and further down the distribution stream), the advertiser should be happy with the investment. If the movie does not perform well and it is apparent the audiences are significantly smaller than that which was anticipated, then the advertiser may experience a sense of loss of investment and/or opportunity.

In this model for media project financing over a commodities-style "futures" exchange, an advertiser can hedge by betting on a negative outcome for the movie. If the movie does not realize its projected success, the advertiser may recover some cash (in the same way as if an insurance policy paid-off).

In the embodiments of the content distribution network system described above in connection with FIGS. 2 to 32, an advertiser has more visibility into the content distribution network for the purpose of inserting relevant, dedicated advertisements to the level of a set-top-box, PC, mobile device, or television set. Working from the other extreme end of the distribution supply chain, a subscriber also has more visibility upstream into the workings of the movie studio. For example, a subscriber may want to see which movies are currently available, along with a list of movies that are available next moth. Furthermore, this same subscriber may want to see a list of movies to be offered in 3 months, 6 months and even a year from that point in time. If the studio 20 allows for this visibility, subscribers can further enjoy their content experiences as they anticipate these new releases that eventually make their way to the subscriber's terminal device. In addition, subscribers are able to see which actors, producers, directors and other artists are engaged by the studio to produce content designed to ultimately entertain audiences at large. In addition, subscribers are able to see trailers for these movies and TV shows to be made available by the movie studio. Providing trailers for movie projects in their formative stages of development is yet another example of how the subscriber can have visibility (up-stream) into the production queue itself. In one embodiment, the subscriber may be allowed to engage in the trading of the motion picture "Futures" contracts as this could also further increase the enjoyment of the overall experience.

Figure 38:
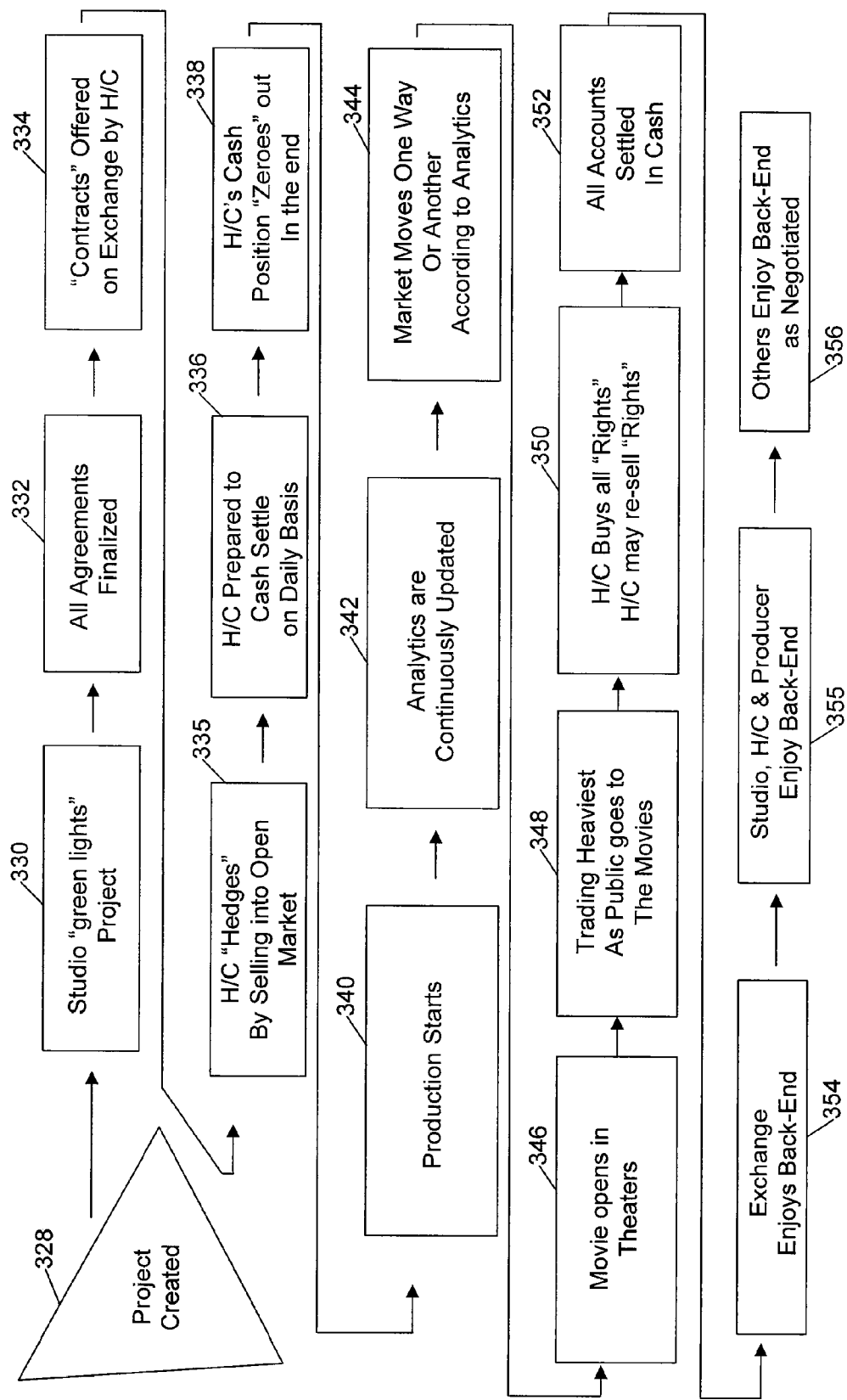
FIG. 38 is a flow diagram of the steps in a movie financing method using the system of FIG. 37.

As illustrated in FIGS. 37 and 38, in one embodiment of a futures trading system for movies or other media projects, producers 322 create a project or proposal for a media project, and approach the studio with the concept (step 328 in FIG. 38). The studio evaluates projects in order to find which projects have the most potential for success. A project is then selected for production, i.e. the studio "green lights" the project (step 330). In the next stage, all agreements are finalized (step 332). In this step, contracts are signed with the producer, screen writer, director, and major talent such as actors. At the same time, the studio engages the holding company 323 to act as its representative in trading futures contract on a commodities style exchange 324.

In the next step, commodities-style contracts are created for the project, based on pre-defined specifications, and these contracts are offered for trading to traders 325 on the exchange 324 by the holding company 323. The contract pricing may be based on the estimated value of the finished product, which is based on some or all of the criteria illustrated in FIG. 39, and may also include other factors, such as residuals. In one possible example, a movie is estimated to be worth $100 million, and each contract has a notional value of $1/100$ of ownership, i.e. $1 million. A margin requirement may be set at 5%, and cash required to leverage one contract may be $50,000. Smaller, mini-contracts could be offered to retailers.

An estimated value for a working movie in a Hollywood library may be of the order of $20 million or more, based on the movie's potential revenue from residuals. A residual is the payment made for a subsequent screening of a movie or other media project, such as a TV show, after the initial release period. In one embodiment, a standardized back-end residual percentage is set. Part of the residual is dedicated to the studio and producer, and another part is dedicated to the holding company. Other parts may be held by buyers 326 over the commodities style exchange in the system of FIG. 37.

As illustrated in FIG. 38, the holding company hedges by selling contracts for the project into the open market over exchange 324 (step 335). A market maker or trader may assume the risk by agreeing to purchase contracts sold by the holding company. The holding company is prepared to cash settle by the end of each trading day (step 336) should the project value go up. The holding company's cash zeros out in the end, as the hedge protects on the down-side and any increase in value is ultimately captured (338). Once adequate funding is ensured through futures contracts, production starts (step 340). The holding company maintains close links to banks as loans may be required from time to time. Costs for fees and interest on such loans may be factored into the project. During production, analytics (FIG. 39) are constantly updated (step 342), and market reports are generated and distributed to all parties. The market may move one way or the other according to the analytics (step 344). Trading is likely to increase as the preview of the media project approaches. The movie then opens in theaters (step 346), and trading becomes heaviest as the public goes to the movie and critics provide their expert opinion (step 348). Although the flow diagram of FIG. 38 is for a movie project, the steps are similar for a TV show project, with step 346 in this case comprising the first showing or premier of the TV show.

Just prior to the contract expiration or settlement date, the holding company purchases all rights to the project based on the last traded price (step 350), and all accounts are settled in cash (352). The holding company may choose to keep the rights, re-sell the rights to another entity or entities, auction the rights, or otherwise. At this point, any revenues received during exhibition of any kind would belong to the new owner or owners. At the same time, back-end residuals are received by the exchange (354), studio, holding company, and producer (355) and others (356). For example, the talent may receive a percentage of the pre-negotiated back-end participation.

This method of funding media projects may provide more liquidity and therefore the option of more productions being made. Since nobody has been able to predict the success of a motion picture or TV show with great accuracy, the futures trading method with mechanisms to hedge on the up-side as well as the down-side results in a more predictable return for studios. The movie studio 20 can have the potential for both big-budget hits and a library of many titles in order to attract subscribers to the content distribution network systems described above. Reporting on media projects in various ways can enhance interest and thus trading in the project contracts. Reporting in venues such as newsletters, web sites, blogs, and other reporting media can provide moment-by-moment information for traders 325 on commodities-style exchange 324.

In one embodiment motion picture or media project "futures" may be traded as Binary Contracts. It is well known that these "Binaries" are used to define a trading threshold. If the defined threshold is achieved, then the trader wins. If the defined threshold is not achieved, then the trader loses. This win or lose scenario can be very effective for hedging, however, it may not work well when the exchange is needed for other purposes. In addition, the traders have no access to the motion picture assets ("rights" or securities) themselves. They are simply trading against a defined threshold. This would be similar to binary contracts that trade against the weather. This allows the hedging against a bad season of business due to weather. The trader does not own or control any property, however.

The metric used for trading a motion picture or other media project may be the appraised value of the project itself. In the case of a motion picture, the metric for trading may be the US and Canada Box Office Receipts (typically referred to as Domestic Box Office or DBO). In the case of a television show, Nielsen ratings for the show may be used.

DBO as a metric has the advantage that it is well known by virtually everyone who has access to sources of news. Everyone from the most sophisticated studio representative to the ordinary consumer understands this metric as it is highly publicized in newspapers, magazines, journals, web sites, television, and other publicly available sources. The problem with the DBO is that it can be manipulated. This does not necessarily mean that manipulation is always a negative thing. It may simply be the case that estimation is performed because data from all of the theaters is not readily available. Therefore, a studio uses their best efforts to guess as to the proper number in order for a best-guess estimate to be disseminated to the various publishers (such as the popular magazine, Variety).

From time to time it has also been asserted that certain data linked to the DBO has been manipulated in order to provide an advantage (or perceived advantage) to a particular group or studio. In other words, it is possible that one studio may inflate the DBO in order to show that their movie is #1 in the box office when, in fact, another movie is #1 and they have the #2 movie. No matter if the manipulation is performed in an attempt to guess the actual DBO number or if manipulation is performed to gain an unfair advantage, the fact is this data can and is manipulated as a common practice in Hollywood.

Some people within the motion picture industry might think the actual DBO number is eventually revealed as all theater data captured for a given movie eventually finds its way to audited financials submitted by the various studios (who have publicly traded stock), however, this is not a valid assumption. The audited financials submitted by the major studios do not typically break out individual movies as separate line items. Therefore, the manipulation of DBO numbers can be maintained as the accountants can fudge the numbers among the various movie projects so the totals are accurate, however, the actual DBO for a particular project may never publicly known or made available.

One way of dealing with this problem is to have a qualified and disinterested third-party verify the accuracy of the DBO data, i.e., perform a third-party audit. Such an audit process would make all of the data points available to the auditor so the final DBO numbers can be checked and verified. Therefore, in one embodiment, each studio 20 that offers its motion picture products on an exchange provides the raw DBO-related data to an independent auditor 360 (FIG. 37) over a network, so the data can be verified before it is used for purposes of settling a "futures" contract. Alternatively, each studio may instruct the entities that collect DBO data (such as Nielsen or Rentrak) to provide this raw data to the independent auditor.

An alternative embodiment is to have a senior executive for each studio sign a document that guarantees the accuracy of the DBO data. Such an approach may not be as good as having a disinterested auditor verify the data, however, this might be sufficient for the Commodity Futures Trading Commission (CFTC) and others.

Another alternative embodiment is for the publicly traded studios to use their reported DBO data in their audited financial statements. This may also provided the necessary accountability that could be required by the CFTC.

Major studios often make decisions and implement strategies in an atmosphere of secrecy. It is this secrecy that provides them with needed leverage to conduct their business in such a way as to maximize their profitability. For example, a studio may keep secret the opening date of a certain blockbuster movie in the theaters. This keeps the other studios (and distributors) guessing. Once the studio learns of an opportunity to maximize its blockbuster movie (due to other relatively weak offerings being made available at the time), the studio can order thousands of film prints to arrive at the theaters disrupting the projected revenues from the competing studios. Studios often prefer to maintain a very high level of secrecy in order to gain necessary advantages over competitors and sentiments expressed by the public at large.

When a major studio considers the proposition of using a "futures" exchange, it may be concerned by the potential loss of secrecy and the direct exposure to a large number of traders (and the legal implications). For these reasons, a major studio cannot be a party to a normal trade as a speculator could. The studios, like producers, are natural sellers into the open market. Therefore, the most likely position for them to take is "going short". If anyone should find out that a major studio is "shorting" one of its movies, this could set off alarms in the press and damage the success of the DBO for that movie. The public at large may (incorrectly) interpret this position as having no confidence in the movie or that it might be bad. Such information, even if it is a rumor, could have catastrophic effects on the movie's performance.

A person trained in the art may suggest that a qualified trading advisor or trading partner of the studio can provide adequate secrecy necessary to protect the studio. The fact is, however, that such a trading advisor or trading partner still needs to maintain records of the studio's transactions in order to report the trading activities to the government. Therefore, the threat of information leakage or exposure still exists. Since movies are so prohibitively expensive to produce, such a leak, if it should occur at any level, and for any reason, could cost the studio huge sums of cash and lost opportunity.

Figure 40A:
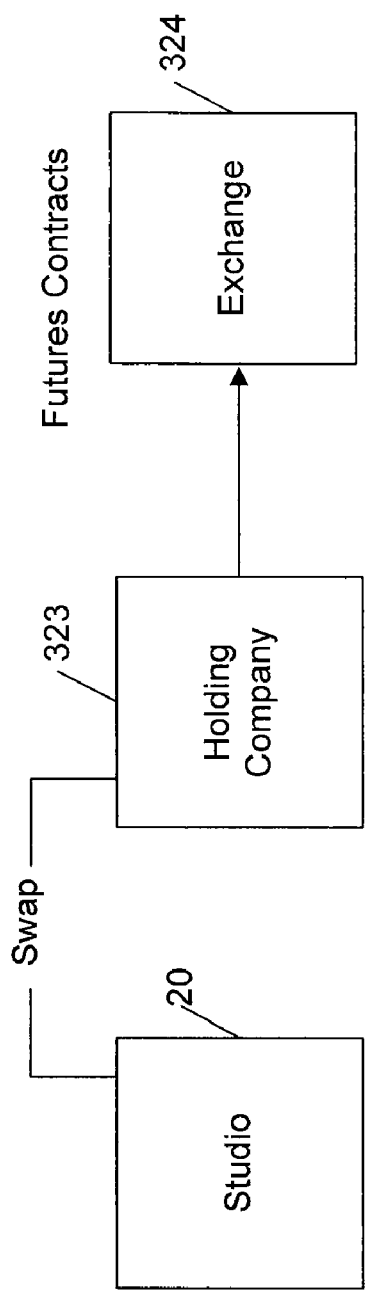
FIGS. 40A and 40B illustrate modifications of the system of FIG. 37.
Figure 40B:
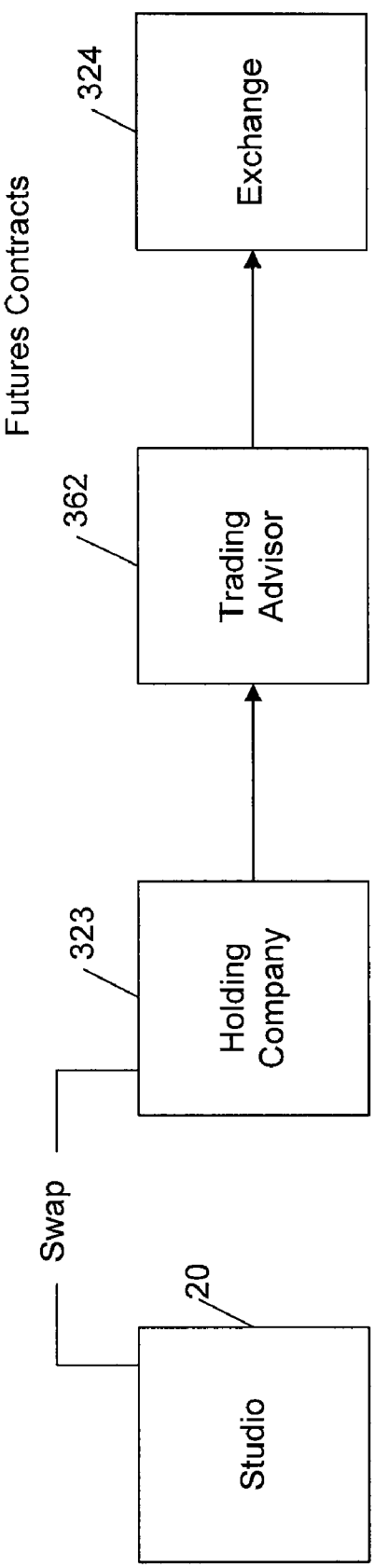

One alternative embodiment which may reduce the risk of leaks in a futures financing method for media projects is illustrated in FIGS. 40A and 40B. This is a modification of the system of FIG. 37 and like reference numerals are used as appropriate. In this embodiment, the studio 20 enters into a "swap" agreement with the holding company contingent on the holding company being able to place parallel positions on the exchange. The holding company may expect to "zero-out" in this transaction, however, it can charge a fee for providing this service. The holding company 323 may do business over the exchange through a trading advisor or partner 362 for added security, as illustrated in FIG. 40B.

A "swap" transaction is simply a private transaction between at least two parties and such a transaction does not need to be disclosed to anyone (unless there is a court order to do so). Therefore, there is no visibility (intentional or incidental) to the studio's trades due to the fact that the studio is not a direct party to any position on the exchange. The "swap" transaction may be kept as a tightly held secret until such time as the information can no longer be harmful to anyone. The holding company may include state-of-the art physical and data security means for securing the studio's confidential data, and may be a company actively engaged in the business of physical and data security or it can be a company that has adopted state-of-the-art physical and data security measures.

In an alternative embodiment, the holding company identified in FIG. 40 can sell the movie studio an insurance policy contingent upon the holding company's ability to successfully place parallel positions on the exchange. In this scenario it may be a more difficult procedure and it could be more expensive to the studio as the holding company would need to be qualified as an insurance company and would need to comply with all local, state, federal, and international regulations that might apply.

In some cases an insurance company may not desire a parallel position on an exchange. They may choose to hedge their risk to some degree. However, they may be comfortable with some level of financial exposure. If they are correct in their calculations, such a method may yield them a profit for most of the insurance policies they issue (as they would tend to keep the insurance the majority of the premiums without the need to pay anything to the studios). In the case where a pay-out is required, they are hedged to some degree using the exchange and they are still profitable based on the majority of policies being profitable for the insurance company.

In the same way, the holding company as shown in FIG. 40 may alternatively decide not to place parallel trades on the exchange. Likewise, they may decide to take a gamble and hedge only a portion of their risk. They may do this as they may find it more profitable to take some risks in the market rather than simply zero-out each time.

In the financing system described in the above embodiment, a "futures" contract is offered as a Binary that uses the audited DBO as the baseline for settlement. In addition, a holding company provides a "swap" contract to the major studio contingent on the holding company being able to place corresponding trades on the exchange.

In another embodiment, a producer or movie studio uses the guarantee of the sale into the open market (once the motion picture is delivered) as part if not all of the collateral for a bank loan for the production of the motion picture. Once the motion picture is delivered, then the exchange cash settles and the producer (or studio) repays the bank loan.

The trading metrics for television shows in a futures-style exchange may be simpler than for movies, due to the fact that the well known company Nielsen collects data regarding the number of types of people who view certain television shows and makes this information available to anyone who desires to purchase it. Where the studios own the DBO receipt data and are not necessarily obliged to make it available to anyone, the Nielsen data belongs to Nielsen alone and this data is made readily available to anyone who desires to pay for it. The Nielsen data can be used to settle certain trades in TV shows offered on an exchange based on data collected in the field which is not readily subject to manipulation.

When trading motion picture "futures" using DBO as the trading metric, final DBO numbers are transferred from the studio to the exchange. Accuracy of the final numbers is important to everyone in the trading paradigm. In some cases, the numbers may be so close to the trader's actual positions that the difference of a single dollar could be significant. In an exemplary embodiment, this data is handled securely and is transferred from the studio to the exchange in such a way as to reduce or minimize exposure to alteration. On one end of the spectrum, an innocent mistake can be made such as transposing one digit to another digit. Although there was no intention to do so, it could affect the outcome for thousands of traders. On the other end of the spectrum, a thief could break into the computer room where the server (holding the DBO data) is stored and alter the data in such a way as to inappropriately make himself a winner. In the middle of the spectrum virtually anything can go wrong and the traders may ultimately not receive the actual data they need to settle all trades. In order to reduce these risks, standard security practices may be used to protect the data when it is fully tabulated at the studio, after it has been audited by the disinterested third party, when it is being transferred from the studio to the exchange, and after it has been received by the exchange. The standard security practices include (but are not limited) to the following:

Physical security for the computer systems at the Studio

Passwords, smartcards (or similar physical devices) and/or Biometric devices allowing access to authorized personnel (only)

A secure network connection (such as virtual private network connection) from the exchange's computer system to the studio's computer system.

A secure network connection that contains rules, policies and procedures that insure the appropriate people are operating the systems and only the relevant data fields can be accessed on a predetermined date and time.

Once the exchange's computer system is securely connected to the studio's computer system by way of a virtual private network (or similar secure networking facility) and the appropriate data fields are isolated, and it is determined the appropriate people are operating the systems (or all functions are performed in an automated fashion), then the data is transferred using security techniques as described below.

A Secure Socket Layer (SSL) connection (or similar) is made to create temporary encryption keys and pass them to both parties so this particular session is fully encrypted, helping to keep the data secret.

A File Transfer Protocol (FTP) session (or similar) commences where the bits and bytes of data are transferred from the studio's computer system to the exchange's computer system. The FTP not only transfers the data from one computer to the other, but also performs periodic checks of the data to insure there has been no alteration of either bits or bytes. If any alterations do occur during the transmission, the FTP re-transmits the bits and bytes yet again until the checks indicate that the data has been successfully transferred and is a perfect copy.

The period checks of the bits and bytes (or packets) is performed using a technology called a checksum (or similar). This checksum adds a bit of data to the transmission that is computed based on the data itself. Both the sender and the receiver are responsible to compute the same checksum number. At certain predefined intervals, these checksum numbers are compared. If they do not yield a perfect match, then the data is re-transmitted until the there is a perfect match of the checksum numbers. If these checksum numbers match, the probability of the data being perfectly intact may be high enough to satisfy most financial institutions.

Physical security for the computer systems at the Exchange

Passwords, smartcards (or similar physical devices) and/or Biometric devices allowing access to authorized personnel (only) from the exchange side Other security means, systems, devices, and approaches can be used to further protect the integrity of this data as it is being transferred from the studio to the exchange.

The futures trading system and method as described in the above embodiments does not require the trading to be based upon securities. In fact, the mixing of "futures" and securities could result in the government regulators such as the CFTC withholding their approval. In addition, futures contracts based on securities may not work as it is possible that a trader may end up being in a negative position. Does such a person then owe movie securities to the other traders? If so, does the negative trader use securities from another movie or TV show? Thus, the trading method described above is not based on motion picture securities. This method uses an independently audited DBO as a metric for the exchange, and takes steps to reduce the risk of manipulation of box office receipts. This may enhance the chances for the exchange gaining necessary approvals from the CFTC to allow futures trading of contracts for movies and similar media productions. A secure method can be provided for transferring the final results of the DBO from the studio to the exchange so as to better protect the various parties involved with the exchange, and increase the chances of gaining the necessary approvals from the government regulators (CFTC).

In the method described in the above embodiments, major studios are at least one step removed from the trading paradigm so knowledge of their actions can be concealed. In one embodiment, a separate entity such as a risk intermediary or holding company takes the studio's position on the exchange and provides the studio with an equal amount of protection by way of a private transaction.

The futures trading method described above may be used for all other media types in addition to movies and television. For example, music, music videos, e-books, and books may be financed in a similar manner. Music and music videos can use trading metrics such as data collected from the popular magazine, Billboard. Books and E-Books can use trading metrics such as "Best Seller Lists".

When a motion pictures "futures" exchange system as described above in connection with FIGS. 37 to 40 begins operation, the buyers of content may use software tools to utilize the exchange. For example, buyers may want to see trailers of the motion picture before they place their trades. In addition, they may want to view the historical data that exists for the genre, the lead actors, the director, and other metrics that might help them to predict the success of the motion picture. A software application program may be developed for buyers to allow them to view virtually any data element regarding: old motion pictures, new motion pictures, or motion pictures currently in production including trailers (if they exist and can be found). There could be several high-level programs within the overall application software system. These high-level programs may include some or all of the following:

Data from old and new motion pictures and data about motion pictures currently in production that might be helpful to the buyers from placing their trades on the exchange.

Movie trailers and artwork to help the buyers to better understand the overall look and feel of the motion picture.

"Buy" and "Sell" data about each open contract coming from the exchange so the buyers can place their positions on the exchange electronically.

Information relating to comparable motion pictures that can be used by the potential traders to predict the likely outcome of the motion picture.

Other applications as are appropriate.

The above high-level programs and others may be used by the buyers of motion picture content to better understand how to place the trades on the exchange. When the buyers have the (software) tools they need, this may increase their interest in trading, and the increased trading volume may help to add liquidity to the overall market.

To make such an application system work, the studio and the exchange may work together to collect the data elements and distribute these elements. Policies and procedures can be put in place so that the data being disseminated is non-biased.

The functions of a movie or television studio 20 as described in connection with the network distribution systems of the above embodiments may include some or all of the following standard functions:

1. Obtain steady flow of potential projects (treatments and scripts)
2. Select the projects that appear to be most rewarding
3. Make decisions regarding the funding of these projects (percentage of internal funding/percentage of external funding, and extent of any "hedged" positions)
4. Engagement of qualified production companies
5. Licensing of studio's assets with appropriate partners within the distribution supply chain
6. Make "authorized" copies of the (edited and authored) assets
7. Manage an efficient balance between the various production and post-production services that need to be in-sourced (for security reasons) as opposed to those that should be out-sourced
8. Distribute assets as per the license agreements
9. Initiate focused and individualized advertising and promotional campaigns
10. Commission technical, legal, and back-office personnel to protect the movie studio's assets to a high degree.

11. Maintain Asset Management Systems for existing assets as well as new assets that are either in-production or have been "green lighted" and are waiting for production to begin
12. Provide physical security means for facilities and personnel
13. Provide content security means to protect the content against rampant piracy (and to enable existing as well as new business models)
14. Other functions.

In addition to the above functions, the movie studio 20 in the network distribution system of the above embodiments has hardware and software to carry out some or all of the following new functions:

1. Engage in two-way communications activities with consumers
2. Collection of consumer-level empirical data
3. The use of artificially intelligent systems that can help to predict the trends, desires, and usage patterns (and other relevant information) at the consumer or subscriber level (and furthermore, to the level of an individual consumer)
4. Engage in the process of determining, packaging and delivering relevant advertisements to discrete consumers based on empirical data collected from such consumers
5. The collection, storage, and indexing of consumer-level empirical data by way of a proxy which conceals personal information
6. The processes and methods for high-speed, two-way interactivity to take place for the purposes of allowing consumers to engage in interactive participation (e.g. gaming, voting, collaborating, customizing) experiences in addition to the more passive (television viewing) experiences.
7. Aggregating, analyzing, and acting upon data received from the field that belong to the studio by way of contract negotiation or license agreement (Digital Cinema movie "plays", Targeted Commercials being "Shown", etc.)

Other processes and methods may be provided at the studio 20 to foster the growth of the transactional content distribution business. Given a fully digital and electronic supply chain as in the embodiments described above, the studio may deliver its assets (securely) to the point of ultimate retail consumption along with any customization as a result of analyzed subscriber profile information. Customization may include advertisements inserted into specific locations and products placed within the content so as to promote these products (generally referred to as "product placements"). Other customization such as localization including dubbing and/or subtitling, and editing are also good examples of such customization. Also, the level of granularity is to an individual consumer. The studio 20 in the above embodiments is able to engage in a digital "dialogue" with the ultimate consumer.

Security systems may be deployed as described above to protect the privacy and confidentiality of consumers. At the same time, the studio receives empirical data in real-time from the various points of consumption throughout the supply chain including the ultimate retail point of consumption. In one embodiment, the studio may also have the ability to communicate with consumers within the distribution supply chain (including retail), without going through the distribution supply chain. In one example of such external communication, the studio may wish to send free movie tickets by mail directly to a consumer watching a television show by way of postal mail or email (or other), or the consumer may request and the studio may grant the consumer's wish to "play" or "own" a "derivative work" such as an audiovisual file suitable for playback on a small screen handheld device.

The studio 20 may be built with state-of-the-art security means, methods, solutions, technologies, and the like. This may include state-of-the-art cryptographic and steganographic (watermarking) means and methods used to protect the content on its path and to flag, isolate, detect and prosecute hackers and pirates engaged in acts of digital piracy directed at the studio or the studio's assets. The studio may also be pro-active in resolving "rights" issues along the distribution path for various content offerings. For example, a digital asset may be protected using the studio's own internal security solution, however, the end-consumer may be using a client devices protected by a completely different security solution with another unique approach to assigning "rights". The studio may be designed to monitor and take into account these different network and security architectures, protocols, APIs, and related issues in order for content to flow properly and securely.

Studios 20 in the embodiments described above may be built as secure facilities where mission-critical functions can take place while reducing the threat of the digital assets being released prematurely to the outside world. For example, a great deal of the post-production work may be performed internally to the studio versus being outsourced to groups that have inferior security infrastructures, or outsourced only to trusted groups with properly certified security infrastructures.

In the two-way network distribution system described in the above embodiments, the studios have much more visibility farther into the distribution chain, and have the ability to assign relevant advertisements to targeted households. The service operators can also assign relevant advertisements to targeted households. Service operators can receive consideration from the studios for giving them the visibility into their network and allowing them to assign relevant advertisements to targeted households. The consumer may have an improved television experience as relevant advertisements appear and as the cost of television may be lowered. In some of the above embodiments, communities can be established between subscribers of similar interests, potentially increasing enjoyment of a viewing experience. The studio in the above embodiments has the ability to create and distribute its products on two-way connectivity, enhancing its ability to deliver meaningful (just-in-time) and community advertising, and satisfying the consumer's requirements for a-la-carte programming and increased viewing enjoyment.

Those of skill will appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A network distribution method of distributing digital video content files from at least first and second movie studios to subscribers, comprising:
    storing a plurality of digital video content files at first and second movie studios, the digital video content files comprising video entertainment media in the form of movies or television shows created under the control of the respective movie studio;
    receiving digital video content file requests at the movie studios from subscribers associated with at least one distribution partner connected to the associated subscribers through an access network;
    transmitting each requested digital video content file from the movie studio which holds the requested digital video content file to the requesting subscriber in a network distribution path comprising at least a first network, the distribution paltrier, and the access network;
    creating a unique subscriber identification code (ID) for each subscriber associated with the distribution partner at a proxy module located in the distribution path between the distribution partner and each movie studio, the subscriber ID containing no subscriber-identifying private information;
    associating each subscriber ID with subscriber-identifying private information;
    creating a subscriber profile package containing subscriber preference data for each subscriber and no subscriber-identifying private information;
    associating each subscriber ID with the corresponding subscriber profile package; storing the associated subscriber IDs, subscriber-identifying private information and subscriber profile packages at the proxy module;
    after receipt, of a digital video content file request from a subscriber associated with the distribution partner, transmitting the subscriber profile package of the subscriber requesting the digital video content file along with the subscriber ID associated with each subscriber profile package from the proxy module to the movie studio which holds the requested digital video content file, whereby no subscriber-identifying private information, is transmitted to the movie studio; and
    storing the subscriber profile packages and the associated subscriber IDs at the movie studio which holds the requested digital video content file;
    connecting the first and second movie studios through an intermediary modulo which controls communications between the movie studios, the intermediary module having a first communication path to the first movie studio and a second communication path to the second movie studio, and comprising part of the network distribution path from each movie studio to the subscribers;
    monitoring information received from one of the movie studios at the intermediary module;
    communicating subscriber profile packages and subscriber IDs between the movie studios via the intermediary module; and
    blocking communication of sensitive movie-studio related information between the movie studios via the intermediary module, the sensitive movie-related information comprising at least information on movie price and release dates;
    wherein at least one of the foregoing steps is performed using a processor.

2. The method of claim 1, further comprising using the subscriber preference data in the subscriber profile package associated with a selected subscriber to create customized, individualized advertising for the selected subscriber, and inserting the customized, individualized advertising into digital content files requested by at least the selected subscriber prior to delivery to the subscriber.

3. The method of claim 2, wherein the customized, individualized advertising is inserted into digital content files at the movie studios.

4. The method of claim 2, wherein the customized, individualized advertising is inserted into digital content files at the distribution partner.

5. The method of claim 1, further comprising transmitting new digital content files from the movie studios to a movie theater over at least one network.

6. The method of claim 5, further comprising offering new digital content files received from the movie studios for transmission from the movie theater for viewing by subscribers in a selected subscriber group in their homes simultaneously with showing of the new digital content files to audiences in the movie theater.

7. The method of claim 1, further comprising offering digital content files comprising games to subscribers through at least part of the same network distribution path between the movie studios and subscriber.

8. The method of claim 1, wherein the step of receiving requests from subscribers comprises receiving requests from subscribers associated with a plurality of distribution partners, the method further comprising sharing profile packages of subscribers associated with different distribution partners through a platform linkage between proxy modules in the paths from the movie studios to the distribution partners.

9. A network distribution method of distributing digital content files from a plurality of content sources to subscribers, comprising:

storing a plurality of media projects as digital content files at a plurality of content sources, at least some of the content sources comprising movie studios, each movie studio having stored digital content files comprising original movies created under the control of the respective movie studio;

linking the content sources to a plurality of distribution partners through an application service provider;

receiving digital content file requests at the content sources via the application service provider from subscribers associated with the plurality of distribution partners connected to the associated subscribers through respective access networks;

transmitting the requested digital content files from the content sources to the requesting subscribers in a network distribution path comprising at least a first network, the application service provider, the distribution partners; and the access networks;

creating a unique subscriber identification code (ID) for each subscriber associated with the distribution partners at a proxy module located in the distribution path between the distribution partners and the content sources, the subscriber ID containing no subscriber-identifying private information;

associating each subscriber ID with subscriber-identifying private information;

creating a subscriber profile package containing subscriber preference data for each subscriber and containing no subscriber-identifying private information;

associating each subscriber ID with, the corresponding subscriber profile package;

storing the associated subscriber IDs, the subscriber-identifying private information and the subscriber profile packages at the proxy module;

after receipt of a digital content file request from a subscriber associated with at least one of the distribution partners, transmitting the subscriber profile package along with the subscriber ID of the subscriber requesting the digital content tile from the proxy module to the respective linked content source via the application service provider, and transmitting no subscriber-identifying private information to the respective linked content source;

storing the profile packages and associated subscriber IDs at the respective content sources from which files are requested;

whereby content files from any linked content source are available to a subscriber of any one of the distribution partners;

controlling communications between the movie studies through an intermediary module comprising part of the network distribution path from each movie studio to the subscribers, the intermediary module having a separate communication path to each movie studio;

monitoring information received from one of the movie studios at the intermediary module;

communicating the subscriber profile packages and the subscriber IDs between the movie studios via the intermediary module without sharing any subscriber-identifying private information; and blocking communication of sensitive movie-studio related information between the movie studios via the intermediary module, the sensitive movie-related information comprising at least information on movie price and release dates;

wherein at least one of the foregoing steps is performed using a processor.

10. The method of claim 9, wherein at least one content source comprises a web site.

11. The method of claim 9, wherein at least one content source comprises a peer-to-peer network.

12. The method of claim 9, wherein at least one content source comprises a web-based social network site having a plurality of social network users, each social network user being connected via the social network site to a selected community of other social network users.

13. The method of claim 12, wherein each content source shares the subscriber profile packages with the other content sources, and each content source provides meta data for inserting targeted advertisements in content provided from the respective content source to a subscriber.

14. The method of claim 9, further comprising creating community groups of subscribers having common interests based on the subscriber preference data in the subscriber profile packages and inserting the same customized advertising in digital content tiles transmitted to all subscribers in a community group.

15. The method of claim 14, further comprising linking subscribers in a community group together and allowing communication between subscribers in the same community group.

16. The method of claim 9, further comprising using the subscriber profile packages to create subscriber customized content and adding the customized content to content files prior to delivery to the associated subscriber.

17. The method of claim 16, further comprising analyzing the subscriber profile packages and creating profile groups of subscribers based on common preferences in the profile packages.

18. The method of claim 17, wherein the step of adding customized content comprises adding the same customized content to content files delivered to all subscribers in a subscriber profile group.

19. The method of claim 16, further comprising connecting the plurality of content sources to the distribution partners, distributing digital content files from any of the content source to a requesting subscriber and distributing subscriber profile packages associated with subscribers to each of the content sources.

20. The method of claim 9, further comprising converting a content file to a predetermined digital rights format for a subscriber device before distributing the converted content file to the subscriber device over the communication path.

21. A content distribution network system for distributing movies from movie studios to subscribers, comprising:

at least first and second movie studios each having a library of digital content files comprising original movies created under the control of the respective movie studio;

a plurality of distribution partners linked to the first and second movie studios, each distribution partner associated with a respective group of subscribers and having an access network over which content is distributed to the subscriber group for the distribution partner;

at least one content source network which links the first and second movie studios to each distribution partner;

the access networks, distribution partners, and content source network comprising a two way communication path between the subscribers and each movie studio;

an intermediary module which controls communications between the movie studios, the intermediary module having a first communication path to the first movie studio and a second communication path to the second movie studio, and being located in a first content source network path from the first movie studio to the respective distribution partners and in a second content source network path from the second movie studio to the respective distribution partners, and comprising part of the two way communication path from each movie, studio to the subscribers;

each movie studio having a title request management module which receives subscriber requests for digital content files over the two way communication path and distributes requested digital content files to a requesting subscriber over the two way communication path;

at least one proxy module in the two way communication path between each movie studio and the distribution partners, each proxy module having a proxy management module which creates a unique subscriber identifier (ID) for each subscriber of the respective distribution partner and associates the subscriber ID with an access network location of the subscriber, and which substitutes the corresponding subscriber ID for any subscriber personal information in any communication from a subscriber forwarded from the proxy module to a respective movie studio;

each proxy module having a data base which stores subscriber identifiers and corresponding subscriber-identifying private information including subscriber locations along with subscriber profile packages containing collected preferences for each subscriber, the subscriber profile packages containing no subscriber-identifying private information, and a communication module which forwards subscriber profile packages along with the corresponding subscriber identifiers to the respective movie studio without the subscriber-identifying private information;

each movie studio having a subscriber profile data management module which receives subscriber profile packages from the proxy module, a data base which stores subscriber profile packages along with the associated subscriber IDs, and a targeted advertisement module which uses the subscriber profile packages to select targeted advertisements for insertion in digital content files transmitted to one or more subscribers having the same preferences; and the intermediary module having a communication monitoring module which monitors information received from one of the movie studios for passing to the other movie studio, the communication monitoring module permitting communication of the subscriber profile packages and the subscriber IDs between the movie studios via the intermediary module and blocking communication of sensitive movie studio-related information between the movie studios via the intermediary module, the sensitive movie studio-related information comprising at least information on movie price and release dates.

22. The system of claim 21, wherein each movie studio has a first billing system, the intermediary has a second billing system, and each distribution partner has a third billing system, and the billing systems are linked together, at least one of the billing systems having a bill aggregating system which provides an aggregated bill for supply of content files from the movie studio, and services of the intermediary and a distribution partner for any content files distributed to a subscriber, whereby the subscriber receives only one bill.

23. The system of claim 21, further comprising a targeted advertisement insertion module which inserts subscriber-targeted advertisements in digital content files distributed to requesting. subscribers.

24. The system of claim 21, further comprising
a movie theater which exhibits movies to audiences, the movie theater being linked to at least the first movie studio, a network which links the movie theater to a selected distribution partner through the proxy module between the selected distribution partner and the first movie studio, the movie theater having a movie distribution module which distributes copies of new movies received from the first movie studio and exhibited at the movie theater to subscribers of the selected distribution partner through the proxy module and selected distribution partner.

25. A network distribution method of distributing digital content files from a plurality of content sources to subscribers, comprising:

offering a catalog of digital content files contained in the libraries of a plurality of associated content sources to subscribers of at least one distribution partner, the content sources comprising at least two movie studios having catalogs of digital content files comprising original movies created under the control of the respective movie studios;

creating a unique subscriber identification code (ID) for each subscriber associated with the distribution partner at a proxy module located in a distribution path between the distribution partner and the content sources, the subscriber ID containing no subscriber-identifying information;

associating each subscriber ID with subscriber-identifying private information;

creating a subscriber profile package containing subscriber preference data for each subscriber, the subscriber profile packages containing no subscriber-identifying private information;

storing the associated subscriber IDs, the subscriber-identifying private information and the subscriber profile packages at the proxy module;

transmitting a requested digital content file from the library of a selected content source which holds the requested file to a requesting subscriber in a network distribution path comprising at least a first network path directly from the library of the selected content source, the distribution partner, and a second network;

after receiving each request for a digital content file from a respective subscriber, transmitting the subscriber profile packages and the associated subscriber IDs from each subscriber requesting files to the content source holding the requested file without any subscriber-identifying private information;

receiving and storing the subscriber profile packages and the associated subscriber IDs of each subscriber requesting files from a respective content source at the respective content source without any subscriber-identifying private information;

controlling communications between the movie studios through an intermediary module comprising part of the network distribution path from each movie studio to the subscribers, the intermediary module having separate communication paths to the movie studios;

monitoring information received from one of the movie studios at the intermediary module;

permitting communication of the subscriber profile packages and the subscriber IDs between the movie studios via the intermediary module without sharing any subscriber-identifying private information;

blocking communication of sensitive movie-studio related information between the movie studios via the intermediary module, the sensitive movie-related information comprising at least information on movie price and release dates;

creating communities of subscribers having similar preferences using the subscriber profile packages collected at each content source; and using the subscriber preferences of each community of subscribers to create customized information based on the associated subscriber preferences for insertion in digital content files transmitted to the community of subscribers;

wherein at least one of the foregoing steps is performed using a processor.

26. The method of claim 25, further comprising offering the catalog of digital content files to subscribers of a plurality of distribution providers, creating unique subscriber identification codes for the subscribers of each distribution provider and associating each subscriber ID of each distribution provider with the subscriber-identifying private information, creating a subscriber profile package for each subscriber which contains subscriber preferences and no subscriber-identifying private information, associating each subscriber ID of each distribution provider with the subscriber profile package containing subscriber preference data for the associated subscriber, linking the billing systems of the content sources and distribution partners, aggregating the billing of each content source and the associated distribution partner for a digital content file received from the content source through the distribution partner, and sending an aggregated bill for the service to the subscriber which requested the digital content file.

27. The method of claim 26, further comprising linking, the billing systems of the movie studios and distribution partners with a billing system of the intermediary, the step of aggregating the billing further comprising aggregating the billing of the intermediary with the billing of the respective movie studio and the associated distribution partner for a digital content file transmitted via the respective movie studio, the intermediary, and the associated distribution partner to a subscriber.

28. The method of claim 25, wherein the content sources further comprise at least one additional content source selected from the group consisting of television studios, web sites, peer to peer networks, and social networks.

29. The method of claim 25, further comprising at least one additional content source which is a record label.

30. The method of claim 29, further comprising an additional distribution partner associated with the record label and comprising a radio station.

31. The method of claim 30, wherein the radio station is an Internet protocol radio station.

32. The method of claim 9, further comprising aggregating the billing of a first billing system associated with the application service provider with the billing of a second billing system associated with a respective content source transmitting a requested digital content file to a requesting subscriber and the billing of a third billing system associated with the distribution partner associated with the requesting subscriber, and providing a single aggregated bill to the subscriber which aggregates billing of the respective content source, the application service provider, and the associated distribution partner in connection with the requested content file.

33. The method of claim 9, further comprising linking an auction system to the proxy module, providing at least one subscriber profile package from the proxy module to the auction system, allowing advertisers to bid for insertion of customized advertisements into content files provided to The subscriber associated with the subscriber profile package, determining a winner firm the bids received for a respective subscriber profile package, and placing the advertisement of the winning advertiser into the content file provided to the subscriber.

* * * * *